United States Patent [19]

Okabe et al.

[11] Patent Number: 4,806,001

[45] Date of Patent: * Feb. 21, 1989

[54] OBJECTIVE FOR AN ENDOSCOPE

[75] Inventors: Minoru Okabe; Akira Yokota; Kimihiko Nishioka, all of Tokyo, Japan

[73] Assignee: Olympus Optical Co., Ltd., Tokyo, Japan

[*] Notice: The portion of the term of this patent subsequent to Jun. 23, 2004 has been disclaimed.

[21] Appl. No.: 7,941

[22] Filed: Jan. 28, 1987

[30] Foreign Application Priority Data

Jan. 28, 1986 [JP] Japan .................................. 61-14673

[51] Int. Cl.$^4$ ........................ G02B 23/00; G02B 9/60; G02B 9/62
[52] U.S. Cl. ...................................... 350/432; 350/469
[58] Field of Search ................................ 350/432, 469

[56] References Cited

U.S. PATENT DOCUMENTS 2,781,695  2/1957  Klemt .
3,209,646  10/1965 Appeldorn et al. .
4,037,938  7/1977  Yamashita et al. .
4,176,915  12/1979 Mori .
4,674,844  6/1987  Nishioka et al. .................... 350/432

Primary Examiner—John K. Corbin
Assistant Examiner—Rebecca D. Gass
Attorney, Agent, or Firm—Cushman, Darby & Cushman

[57] ABSTRACT

An objective for an endoscope comprising, in the order from the object side, a first lens unit I having negative refractive power, a second lens unit II having positive refractive power, a third lens unit III having positive refractive power, an aperture stop S arranged between the front end of the second lens unit and rear end of the third lens unit and a fourth lens group IV comprising a lens component which has a concave surface on the object side, the four unit objective for an endoscope being arranged so that the overall length is short, outer diameter of the objective is small, angle of view is wide, intensity of light in the marginal portion is high, and distortion is corrected favourably.

30 Claims, 24 Drawing Sheets

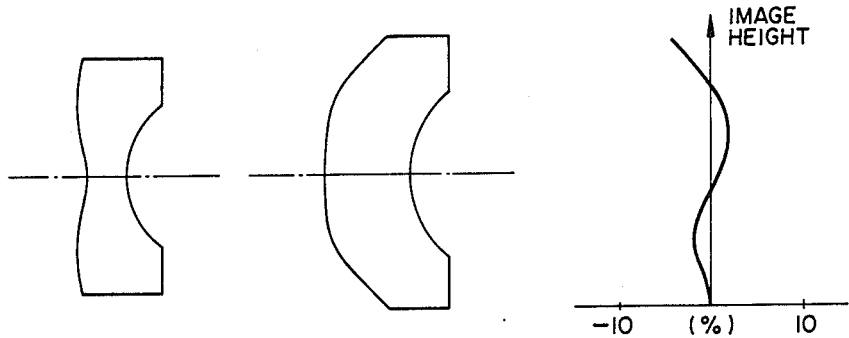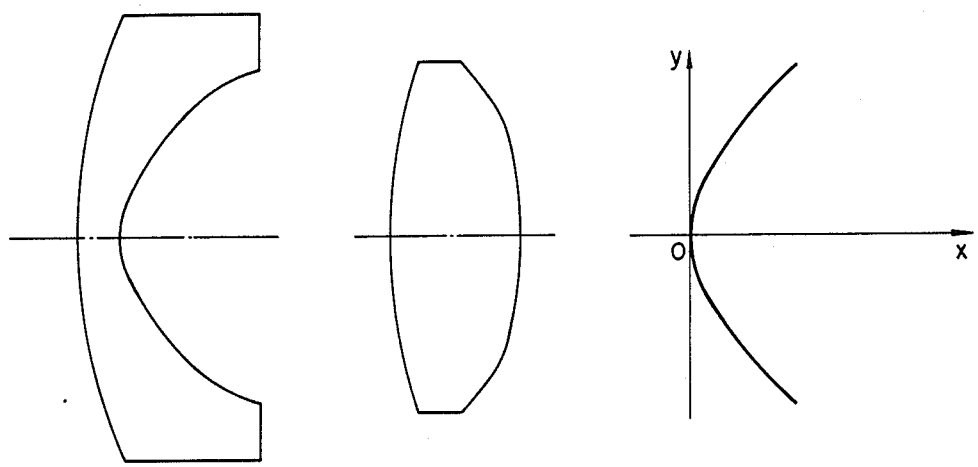

OBJECTIVE FOR AN ENDOSCOPE

BACKGROUND OF THE INVENTION (a) Field of the Invention

The present invention relates to an objective for an endoscope.

(b) Description of the Prior Art

A retrofocus type lens system disclosed in U.S. Pat. No. 4,037,938 and having a lens configuration as shown in FIG. 1 is known as an objective for an endoscope. Said known objective comprises a front subsystem F having negative refractive power, and a rear subsystem R having positive refractive power, and the lens system as a whole is arranged as a telecentric type lens system by providing a stop S at the front focal point of the rear subsystem. Said known objective has a strong point that the loss of light to be caused in the image guide fiber bundle 1 is small because the prinicpal ray 2 vertically enters the light entrance surface of the image guide fiber bundle 1. However, as said objective is composed in such lens type that is considerably asymmetrical in respect to the stop S, distortion occurs largely. Moreover, as said objective is arranged as a telecentric type lens system, the outer diameter of the lens system is large compared with the image height.

On the other hand, a symmetrical type lens system disclosed in U.S. Pat. No. 2,781,695 and having a lens configuration as shown in FIG. 3 is known as a lens system whose distortion is very small. Said known lens system is arranged to be perfectly symmetrical in respect to the stop S as it will be understood also from FIG. 3 and, therefore, distortion to be caused is very small. However, due to the fact that the lens system is symmetrical, the incident angle on the first lens component $L_1$ is equal to the emerging angle from the fourth lens component $L_6$ and, therefore, the incident angle of the principal ray with a large angle of view which is incident on the image surface becomes considerably large. As a result, the intensity of light in the marginal portion decreases due to the $\cos^4$ law.

Furthermore, modified symmetrical type lens systems are also known as disclosed in U.S. Pat. No. 3,209,646 and U.S. Pat. No. 4,176,915. Said known lens systems have the basic power distribution similar to that of the lens system shown in FIG. 3, i.e., a negative and positive lens components are arranged in front of the stop and a positive and negative lens components are arranged in rear of the stop. Besides, shapes of individual lens components arranged in front of the stop are substantially the same as those of individual lens components arranged in rear of the stop.

SUMMARY OF THE INVENTION

It is, therefore, a primary object of the present invention to provide an objective for an endoscope arranged that distortion is comparatively small, the lens system as a whole is compact and, at the same time, the decrease in the intensity of light in the marginal portion is small.

The objective for an endoscope according to the present invention has a basic four unit lens configuration as shown in FIG. 2 and comprises a first lens unit I having negative refractive power, a second lens unit II having positive refractive power, a third lens unit III having positive refractive power, an aperture stop S arranged at a position between the front end of said second lens unit II and rear end of said third lens unit III, and a fourth lens unit IV comprising a lens component having a concave surface on the object side, said objective for an endoscope being arranged to comprise at least three positive lens components, including a cemented doublet, which are respectively located at positions between the front end of said second lens unit II and rear end of said fourth lens unit IV. In FIG. 2, reference symbol 3 represents, for example, a solid-state image pick-up device.

In case of the basic four unit lens configuration described in the above, it is possible to reduce distortion to be caused compared with the retrofocus type lens systems by providing the fourth lens unit IV comprising a meniscus lens, which is convex toward the image side, on the image side of the aperture stop and thereby increasing the symmetry of the lens system as a whole in respect to the aperture stop. Moreover, as the aperture stop is arranged at a position between the front end of the second lens unit II and rear end of the third lens unit III as described in the above, the aperture stop comes to a position on the image side of the front focal point of a total system which is formed by the second, third and fourth lens units (II, III and IV). As a result, the four unit lens system as a whole does not become a telecentric type lens system and, therefore, it is possible to make the outer diameter of the lens system small compared with the image height.

Furthermore, when the aperture stop is located between the second lens unit II and third lens unit III as shown in FIG. 2, a positive lens unit comes to a position in front of the aperture stop. Consequently, the asymmetry of the four unit lens system is reduced, and this is preferably also for correction of distortion and coma.

Besides, by arranging at least three positive lens components at positions between the front end of the second lens unit II and rear end of said fourth lens unit IV, the incident angle of the principal ray on the image surface is made small so as to thereby prevent the decrease in the intensity of light in the marginal portion to be caused due to the $\cos^4$ law.

As described so far, by combining the strong points of the retrofocus type lens systems and those of the symmetrical type lens systems, the present invention materializes an objective for an endoscope which is arranged favourably from all of the view points of correction of distoration, compactness of the lens system, and intensity of light in the marginal portion.

To attain the object of the present invention, it is more preferable to arrange that the objective for en endoscope according to the present invention having the above-mentioned basic four unit lens configuration fulfills the condition (1) shown below:

$$|h_1/f_5| < 1.15|h_4/f_4| \qquad (1)$$

where, reference symbol $h_1$ represents the mean value of heights of principal rays on respective surfaces of the first lens unit I, reference symbol $h_4$ represents the mean value of heights of principal rays on respective surfaces of the fourth lens unit IV, reference symbol $f_1$ represents the focal length of the first lens unit I, and reference symbol $f_4$ represents the focal length of the fourth lens unit IV.

The condition (1) shown in the above defines the ratio between the refractive power of the first and fourth lens units in order to arrange that the available incident angle of the principal ray on the first lens unit I becomes wider, the principal ray is adequetely refracted by the fourth lens unit IV, and distortion is thereby eliminated in the range where the intensity of light in the marginal portion does not decrease so much, and in order to arrange that the overall length (length from the first surface of the lens system to the image surface) becomes short and outer diameter of the objective becomes small. To attain the above-mentioned purpose, the focal length $f_1$ of the first lens unit I and focal length $f_4$ of the fourth lens unit IV should be selected so as to fulfill the condition (1) shown in the above. When the condition (1) is not fulfilled, distortion cannot be corrected and, moreover, the lens system becomes large.

In addition to the condition (1) described in the above, it is preferable to arrange that the objective for an endoscope according to the present invention further fulfills the condition (2) shown below:

$$f_2 < 9f \quad (2)$$

where, reference symbol $f_2$ represents the focal length of the second lens unit II, and reference symbol f represents the focal length of the lens system as a whole.

When the lens system is arranged to fulfill the condition (2), it has such effect that the positive refractive power thereof is shifted toward the front portion of the lens system. As a result, the principal point of the lens system as a whole is shifted toward the object side, and it is possible to make the overall length of the lens system short. Besides, it is possible to correct coma to be caused by lower rays at the first lens unit I which has negative refractive power.

When the condition (2) is not fulfilled, it is difficult to correct coma.

In addition to the conditions (1) and (2), it is preferable to arrange that the objective for an endoscope according to the present invention further fulfills the conditions (3), (4), (5) and (6) shown below:

$$|f_1| < 5f \quad (3)$$

$$|f_{23}| < 4.5f \quad (4)$$

$$|f_a/f_b| < 30 \quad (5)$$

$$R_2 > 0 \quad (6)$$

where, reference symbol $f_{23}$ represents the total focal length of the second lens unit II and third lens unit III, reference symbols $f_a$ and $f_b$ respectively represent the largest value and smallest value out of the focal lengths of said at least three positive lens components including a cemented doublet which are respectively arranged at positions between the front end of the second lens unit II and rear end of the fourth lens unit IV, and reference symbol $R_2$ represents the radius of curvature of the foremost surface (surface on the object side) of the second lens unit II.

In a four unit lens system which fulfills the conditions (3) and (4) shown in the above, the negative refractive power of the first lens unit I and positive refractive powers of the second lens unit II and third lens unit III become comparatively strong, and this is preferable especially for making the overall length of the lens system short. However, if the above-mentioned refractive powers are made too strong, the overall length of the lens system becomes too short. As a result, the incident angle of the principal ray on the image surface becomes large, and the intensity of light in the marginal portion decreases considerably. Therefore, it is preferable to arrange that $|f_{23}|$ is selected in the range of $f < |f_{23}|$. When the conditions (3) and/or (4) is not fulfilled, it is difficult to make the overall length of the lens system short.

When refractive powers of the above-mentioned lens units are made strong so that the conditions (3) and (4) are fulfilled, it becomes difficult to correct aberrations. Especially, in case that the field angle is wide and the aperture stop S is located at a position between the foremost surface of the second lens unit II and rearmost surface of the third lens unit III, correction of aberrations becomes more difficult. To eliminate the above-mentioned difficulty, it is preferable to fulfill the conditions (5) and (6).

The condition (5) defines the power distribution of positive refractive power in the lens system. When the positive refractive power is alloted, as defined by the condition (5), to at least three positive lens components including a cemented doublet, which are respectively arranged at positions between the front end of the second lens unit II and rear end of the fourth lens unit IV, it becomes possible to correct aberrations. When the condition (5) is not fulfilled, it becomes difficult to correct aberrations.

The condition (6) defines the radius of curvature of the foremost surface (surface on the object side) of the second lens unit II. By making said radius of curvature positive, it is possible to prevent incident angle of offaxial rays on said surface from becoming excessively large and to thereby prevent the astigmatic difference from occurring. When the condition (6) is not fulfilled, the astigmatic difference becomes large.

To obtain an objective for an endoscope which is more suitable for attaining the object of the present invention, it is preferably to further fulfill the conditions (7) and (8) shown below:

$$-R_2' \leq 15f \quad (7)$$

$$R_3 \leq 30f \quad (8)$$

where, reference symbol $R_2'$ represents the radius of curvature of the rearmost surface (surface on the image side) of the second lens unit II, and reference symbol $R_3$ represents the radius of curvature of the foremost surface (surface on the object side) of the third lens unit III.

When either the condition (7) or the condition (8) is not fulfilled, spherical aberration will be undercorrected.

Furthermore, when an aspherical surface is adopted in the objective for an endoscope according to the present invention, it is possible to correct distortion and curvature of field satisfactorily favourable. The reason thereof is as described below.

The known objective for an endoscope shown in FIG. 1 causes remarkable negative distortion. This is because, when the principal ray is traced inversely from the image side, the principal ray is refracted as described below. That is, when it is supposed that the lens system as a whole is divided into a front subsystem located in front of the aperture stop S and a rear subsystem located in rear of the aperture stop S, the principal ray traced inversely is refracted by the front subsystem located in front of the aperture stop S and rear sybsystem located in rear of the aperture stop S in such direction that the angle of view is widened as the image height increases. Therefore, it is possible to correct said remarkable negative distortion when the lens system is provided with an aspherical surface whose refractive power for the principal ray is made weaker toward the portions farther from the optical axis.

For this purpose, the lens system may be so arranged that either the surface on the object side of at least one of lens components constituting the front subsystem located in front of the aperture stop S has such portions whose curvature becomes gradually stronger as they are farther from the optical axis or the surface on the image side of at least one of lens components constituting the front subsystem located in front of the aperture stop S has such portions whose curvature becomes gradually weaker as they are farther from the optical axis or the lens system may be so arranged that either the surface on the object side of at least one of lens components constituting the rear subsystem located in rear of the aperture stop S has such portions whose curvature becomes gradually weaker as they are farther from the optical axis or the surface on the image side of at least one of lens components constituting the rear subsystem located in rear of the aperture stop S has such portions whose curvature becomes gradually stronger as they are farther from the optical axis. Thus, it is possible to correct distortion and curvature of field favourably.

As examples of the above-mentioned curved surface having portions whose curvature becomes gradually stronger as they are farther from the optical axis, shapes as shown in FIGS. 4 and 5 are also effective. The word "curvature" used herein should be interpreted as a term including a positive or negative sign. Speaking correctly, curvature at an arbitrary point on a lens surface should be considered as negative when the center of curvature of a spherical surface, which is in contact with said lens surface at said arbitrary point, is located on the object side of said lens surface or as positive when said center of curvature is located on the image side of said lens surface. Accordingly, the shape shown in FIG. 4 is an example of a curved surface whose curvature including the sign increases toward the portions farther from the optical axis (increases from negative curvature of concavity on the object side to positive curvature of convexity on the object side), while the shape shown in FIG. 5 is an example of a curved surface whose curvature once increases and then decreases toward the portions farther from the optical axis.

The reason why the aspherical surface with a shape as shown in FIG. 5 is also effective for correction of distortion is that, even when the distortion curve has an unduration as shown in FIG. 6, it causes no problem in practical use and that the marginal portion of the aspherical surface shown in FIG. 5 has no relation to correction of distortion since the principal ray does not pass through the marginal portion though the lower rays pass.

Shapes as shown in FIGS. 7 and 8 may be included as examples of the curved surface which has the portions whose curvature becomes gradually weaker as they are farther from the optical axis and which may be used for a surface on the image side of a lens component.

As described so far, the aspherical surface to be provided in the front subsystem of the objective for an endoscope according to the present invention is to be formed, when it is used as a surface on the object side of a lens component, as a surface whose curvature becomes gradually stronger at least at portions thereof including such surfaces as shown in FIGS. 4 and 5 and is to be formed, when it is used as a surface on the image side of a lens component, as a surface whose curvature becomes gradually weaker at least at portions thereof including such surfaces as shown in FIGS. 7 and 8.

On the other hand, the aspherical surface to be provided in the rear subsystem of the objective for an endoscope according to the present invention is to be formed, when it is used as a surface on the object side of a lens component, as a surface whose curvature becomes gradually weaker at least at portions thereof including such surfaces as shown in FIGS. 7 and 8 and is to be formed, when it is used as a surface on the image side of a lens component, as a surface whose curvatrue becomes gradually stronger at least at portions thereof including such surfaces as shown in FIGS. 4 and 5.

When an objective includes at least one of the aspherical surfaces described in the above, it is possible to correct distortion favourably.

In case that it is desired to correct distortion only, it is sufficient when one of the above-mentioned aspherical surfaces is provided on only one side of the aperture stop. In that case, however, swelling of meridional curvature of field at the intermediate image height becomes large and, consequently, the quality of image at the intermediate image height decreases considerably. This problem can be solved when the above-mentioned aspherical surfaces are arranged in both of the front and rear subsystems. That is, when so arranged, it is possible to eliminate the above-mentioned swelling of meridional curvature of field because the sign of the swelling of meridional curvature of field to be caused by the aspherical surface arranged in the front subsystem, i.e., the "minus" sign, is inverse to the sign of the swelling of meridional curvature of field to be caused by the aspherical surface arranged in the rear subsystem, i.e., the "plus" sign, and the meridional curvature of field caused in the front subsystem is offset by the meridional curvature of field caused in the rear subsystem.

Now, the shape of the aspherical surface required for correction of distortion is quantitatively described below.

An aspherical surface can generally be expressed by the following formula (9):

$$x = \frac{Cy^2}{1 + \sqrt{1 - PC^2y^2}} By^2 + Ey^4 + Fy^6 + Gy^8 + \ldots \quad (9)$$

where, reference symbols x and y respectively represent values of coordinates in the coordinate system where the optical axis is traced as the x axis taking the image direction as positive and the y axis is traced perpendicularly to the x axis taking the intersecting point between the aspherical surface and optical axis as the origin O, reference symbol C represents the inverse number of the radius of curvature of the spherical surface which is in contact with the aspherical surface at a position near the optical axis, reference symbol P represents a parameter representing the shape of the aspherical surface, and reference symbols B, E, F, G, . . . respectively represent the coefficients of aspherical surface of the second order, fourth order, sixth order, eighth order and so on.

When P=1 and all of B, E, F, G, ... are zero in the formula (9) shown in the above, the surface expressed by the formula (9) is a spherical surface.

Besides, Seidel aberration coefficients are defined as expressed by the formulae (10) and (11) shown below. These are the same as those used in the universal lens design program ACCOS-V. However, in case of ACCOS-V, the height of paraxial ray $H_0$ incident on the first surface of the lens system is determined by the following formula where the object distance (distance from the object point to the first surface of the lens system) is represented by reference symbol OB, numerical aperture of marginal ray is represented by reference symbol NA, and refractive index of the medium existing on the object side of the first surface of the lens system is represented by reference symbol $n_0$.

$$H_0 = OB \times \tan\left\{\sin^{-1}\left(\frac{NA}{n_0}\right)\right\}$$

On the other hand, in the present invention, said height of paraxial ray $H_0$ is determined by the following formula.

$$H_0 = OB \times \frac{NA}{n_0}$$

Therefore, in the present invention, aberration coefficients are obtained by performing ray tracing based on the paraxial theory by using the value of $H_0$ which is determined by the latter formula shown in the above.

For the meridional ray ($\overline{X}=0$)

$$\Delta Y = (SA3)\overline{Y}^3 + (CMA3)\overline{Y}^2\overline{H} + \{3(AST3) + (PTZ3)\}\overline{Y}\overline{H}^2 + (DIS3)\overline{H}^3 + (SA5)\overline{Y}^5 + (CMA5)\overline{Y}^4\overline{H} + (TOBSA)\overline{Y}^3\overline{H}^2 + (ELCMA)\overline{Y}^2\overline{H}^3 + \{5(AST5) + (PTZ5)\}\overline{Y}\overline{H}^4 + (DIS5)\overline{H}^5 + (SA7)\overline{Y}^7 \quad (10)$$

For the sagittal ray ($\overline{Y}=0$):

$$\Delta Z = (SA3)\overline{Z}^3 + \{(AST3) + (PTZ3)\}\overline{Z}\overline{H}^2 + (SA5)\overline{Z}^5 + (SOBSA)\overline{Z}^3\overline{H}^2 + \{(AST5) + (PTZ5)\}\overline{Z}\overline{H}^4 + (SA7)\overline{Z}^7 \quad (11)$$

The formula (10) shown in the above is formulated by arranging that the difference between the paraxial image point (image point when there exists no aberration) of meridional rays and actual image point of meridional rays is represented by reference symbol $\Delta Y$. In the formula (10), reference symbol $\overline{Y}$ represents the incident height of paraxial principal ray on the image surface normallized by the maximum image height, and reference symbol $\overline{H}$ represents the incident height of marginal ray on the pupil surface normalized by the pupil diameter. The formula (11) shown in the above is formulated in the same way as above but for the sagittal rays. Besides reference symbols SA3, SA5 and SA7 respectively represent spherical aberrations of the third, fifth and seventh orders, reference symbols CMA3 and CMA5 respectively represent tangential comae of the third and fifth orders, reference symbols AST3 and AST5 respectively represent astigmatisms of the third and fifth orders, reference symbols PTZ3 and PTZ5 respectively represent Petzval's sums of the third and fifth orders, reference symbols DIS3 and DIS5 respectively represent distortions of the third and fifth orders, reference symbol TOBSA represents skew tangential spherical aberration of the fifth order, reference symbol ELCMA represents elliptical coma of the fifth order, and reference symbol SOBSA represents skew sagittal spherical aberration of the fifth order.

Swelling of meridional curvature of field, which occurs when an aspherical surface is provided in a lens system, is caused by the deviation of the aspherical surface from the spherical surface and is caused due to the fact that the ratio of the value of the coefficient of astigmatism A of the third order to the coefficient of astigmatism of the fifth order in the formulae (10) and (11) of Seidel aberration coefficients shown in the above is large compared with that of the spherical surface. Therefore, the astigmatism caused by the aspherical surface provided in the front subsystem should be offset by the aspherical surface provided in the rear subsystem.

That is, when the sums $A_F$ and $A_R$ of the coefficients of astigmatism is expressed by the formulae (12) and (13) shown below, where reference symbol $A_{Fi}$ represents the value obtained when the coefficient of astigmatism A to be caused by deviation of the aspherical surface, which is formed on ith surface out of respective lens surfaces in the front subsystem, from the spherical surface is divided by F number, and reference symbol $A_{Rj}$ represents the value obtained when the coefficient of astigmatism A to be caused by the deviation of the aspherical surface, which is formed on jth surface out of respective lens surfaces in the rear subsystem, from the spherical surface is divided by F number, $$A_F = \sum_i A_{Fi} \quad (12)$$

$$A_R = \sum_j A_{Rj} \quad (13)$$

it is necessary to arrange that the value of $A_{FR}$ given by the following formula (14) becomes a value close to zero.

$$A_{FR} = A_F + A_R \quad (14)$$

When the content shown by the formula (14) is expressed by other formulae, it is possible to express said content as shown by the following formulae (15) and (16).

$$A_F A_R < 0 \quad (15)$$

$$|A_F/A_R| \approx 1 \quad (16)$$

When the values of $A_F$, $A_R$ and $A_F/A_R$ shown in the formulae (15) and (16) are calculated by using the lens system shown in FIG. 26 as an example, they become as shown below.

$$A_F = -0.01851$$

$$A_R = 0.01024$$

$$A_F/A_R = 1.808$$

As it will be evident from preferred embodiments shown later, it is possible to correct aberrations satisfactorily favourably for practical use even when the value of $|A_F/A_R|$ is not exactly 1. That is, it is allowable as far as said value comes into the range defined by the following formula (17)

$$0.01 < |A_F/A_R| > 20 \tag{17}$$

In other words, when the shapes of the aspherical surfaces are decided so as to fulfill the formulae (15) and (17), it is possible to obtain an objective for an endoscope whose curvature of field is corrected favourably and distortion is small.

The coefficient of astigmatism $A_i$ of the third order to be caused by the deviation of the aspherical surface, which is formed on ith surface, from the spherical surface is expressed by the formula (18) shown below when $P=1$:

$$A_i = 8h_a^2 h_b^2 \cdot E(N_i - N_{i+1}) \tag{18}$$

where, reference symbols $h_a$ and $h_b$ respectively represent heights of paraxial ray and paraxial principal ray on ith surface, reference symbol E represents the coefficient of aspherical surface of the fourth order of ith surface, and reference symbols $N_i$ and $N_{i+1}$ respectively represent refractive indices of media existing on the object side and image side of ith surface.

Here, an aspherical surface may be provided to a cemented surface between two lens elements. In that case, when the lens element with the lower refractive index is regarded as the air side, the shape of the aspherical surface can be decided in the same way as described in the above, and it is possible to obtain an aspherical surface that serves to attain the object of the present invention.

Furthermore, in case that aspherical surfaces are provided respectively in the front subsystem located in front of the aperture stop and rear subsystem located in rear of the aperture stop and, moreover, each of them is formed as an aspherical surface expressed by the formula of aspherical surface which includes the coefficients of aspherical surface of the sixth and higher orders, said coefficients of aspherical surface of the sixth and higher orders can also contribute to elimination of curvature of field.

When ith surface is formed as an aspherical surface and the height of principal ray on that aspherical surface is represented by reference symbol $\bar{h}_i$ and when $B_i=0$ and $P_i=0$, the value of $Q_i$ expressed by the formula (19) shown below is approximately proportional to the value of curvature of field to be caused by the aspherical surface on ith surface.

$$Q_i = (N_i - N_{i+1})\{E\bar{h}_i^2 + F\bar{h}_i^4 + G\bar{h}_i^6 + \ldots\} \tag{19}$$

To arrange that the curvature of field caused by the aspherical surfaces provided in front of the aperture stop and curvature of field caused by the aspherical surfaces provided in rear of the aperture stop offset each other, when the sum of $Q_i$ in the front subsystem is represented by reference symbol $Q_F$ and sum of $Q_i$ in the rear subsystem is represented by reference symbol $Q_R$, the formula (20) shown below should be fulfilled.

$$Q_S = Q_F + Q_R \approx 0 \tag{20}$$

This means that, when either $Q_F$ or $Q_R$ which has the larger absolute value out of them is represented by reference symbol $Q_M$, the value of $Q_h$ given by the formula (21) shown below is satisfactorily small.

$$|Q_S/Q_M| = Q_h \tag{21}$$

In other words, it is preferable to arrange that the value of $Q_h$ becomes a value close to zero as in cases of Embodiments 20 through 22 shown later. For practical use, it is allowable when $Q_h$ fulfills the condition (22) shown below.

$$0 \leq Q_h < 4 \tag{22}$$

Generally, distortion occurs largely at a surface where the height of principal ray is large. Therefore, for correction of distortion, it is preferable to provide an aspherical surface to a surface where the height of principal ray is large. In other words, it is preferable to provide the aspherical surface in the first lens unit I and/or fourth lens unit IV which are far from the aperture stop, especially, at a position near the first lens component and/or a position near the rearmost lens component.

For the manufacturing of an aspherical surface, it is preferable to adopt plastic molding or glass molding from the view point of the cost. Especially, lenses manufactured by glass molding are more preferable because they are more excellent in chemical resistance and the like compared with lenses manufactured by plastic molding.

BRIEF DESCRIPTION OF THE DRAWINGS

FIGS. 4 and 5 respectively show sectional views illustrating examples of aspherical lenses applicable to the objective for an endoscope according to the present invention;

FIG. 6 shows a graph illustrating an example of distortion;

FIGS. 7 and 8 respectively show sectional views illustrating other examples of aspherical lenses applicable to the objective for an endoscope according to the present invention;

FIG. 9 shows a coordinate system for illustrating the formula which expresses the shape of an aspherical surface;

DETAILED DESCRIPTION OF THE PREFERRED EMBODIMENTS

Figure 1:
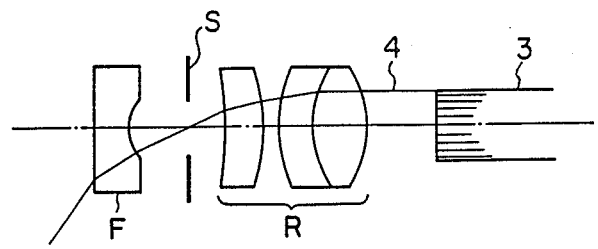
FIG. 1 shows a sectional view of a known objective for an endoscope.
Figure 2:
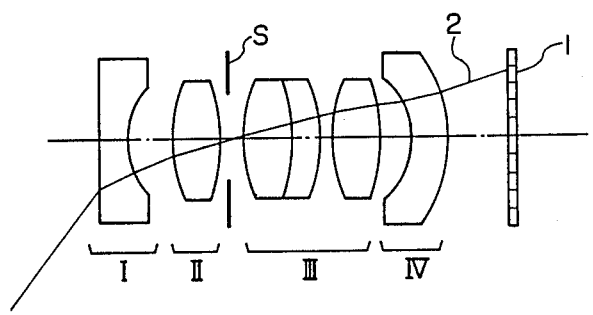
FIG. 2 shows the basic four unit lens configuration of the objective for an endoscope according to the present invention.
Figure 3:
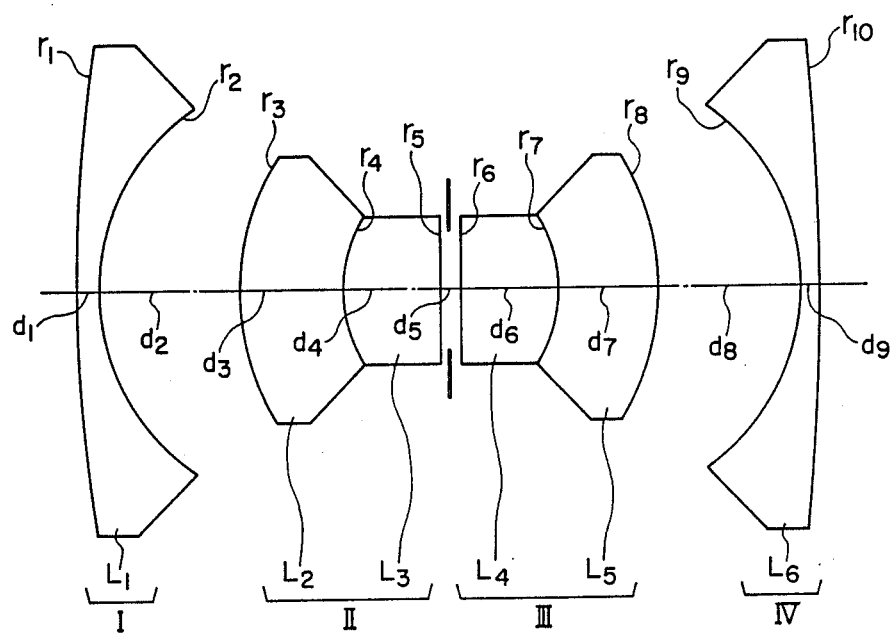
FIG. 3 shows a sectional view of a symmetrical type lens system.
Figure 10:
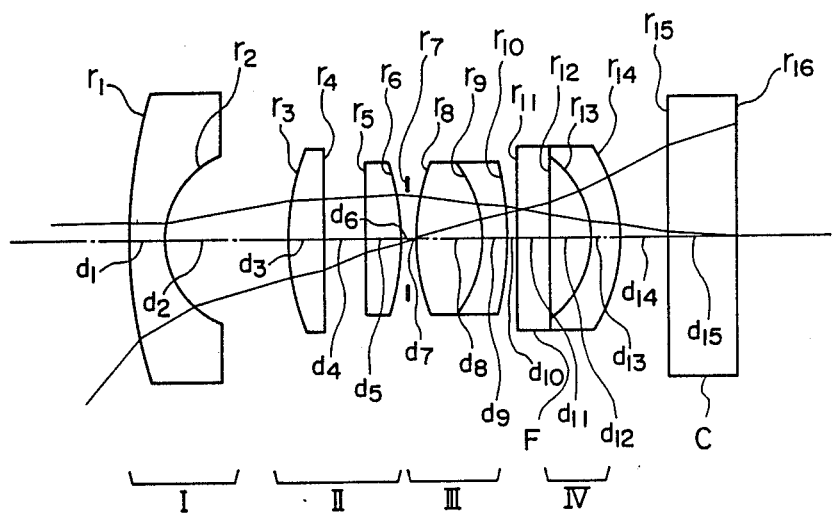
FIGS. 10 through 31 respectively show sectional views of Embodiments 1 through 22 of the objective for an endoscope according to the present invention.
Figure 11:
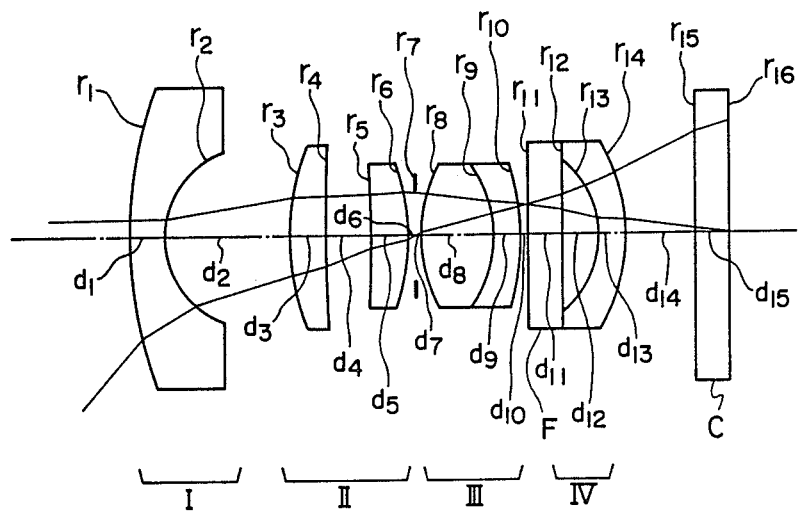
Figure 12:
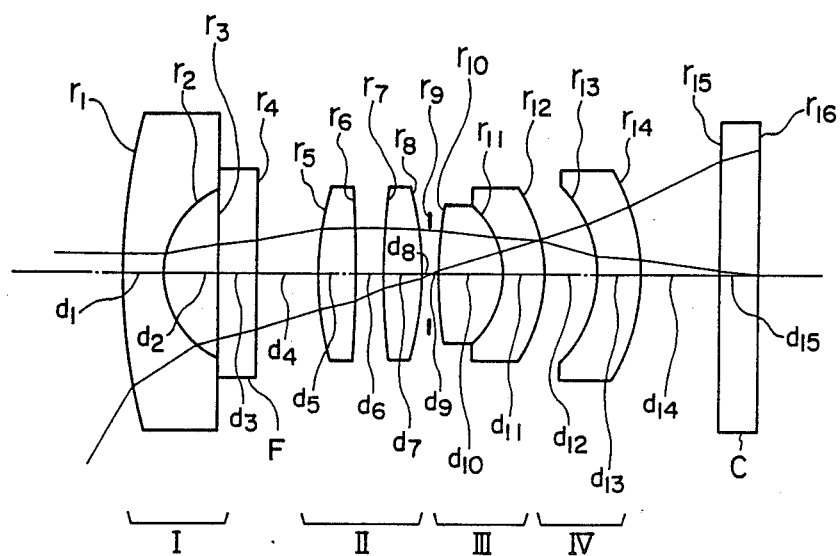
Figure 13:
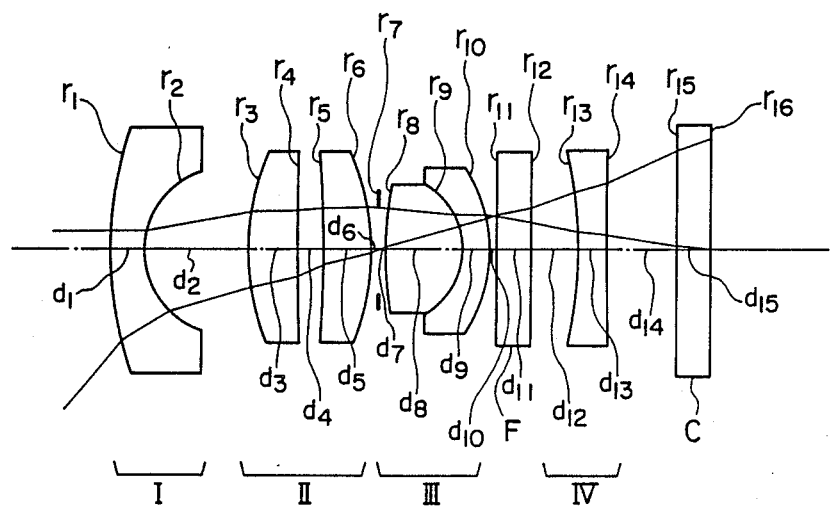
Figure 14:
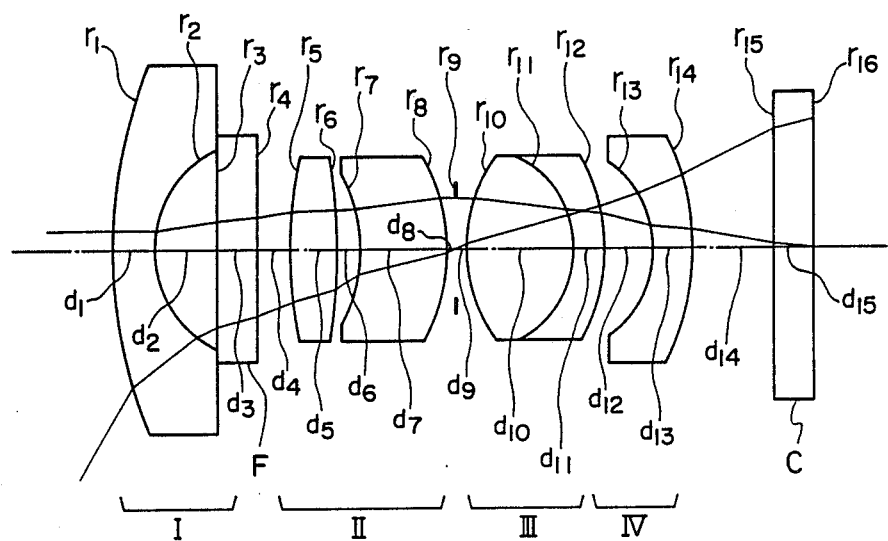
Figure 15:
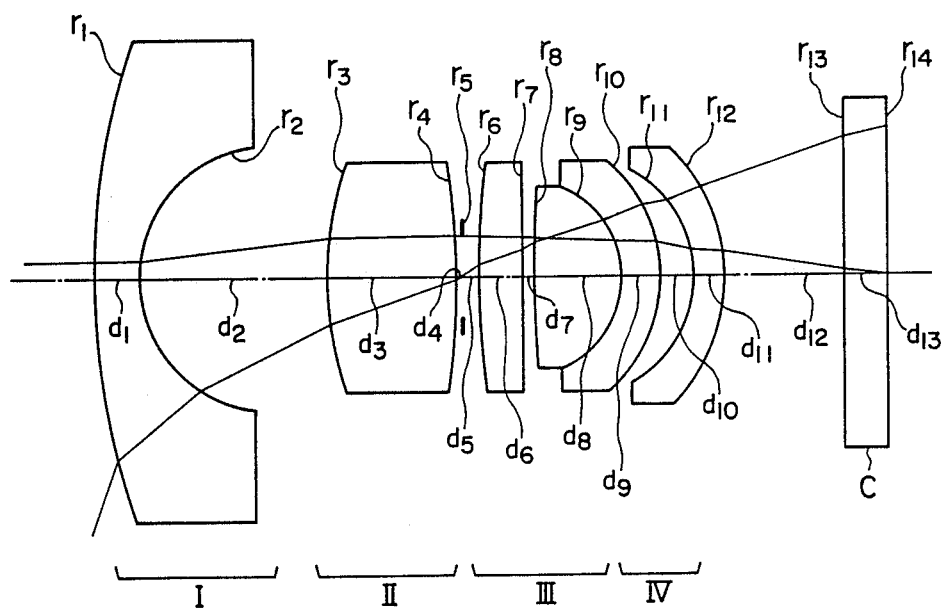
Figure 16:
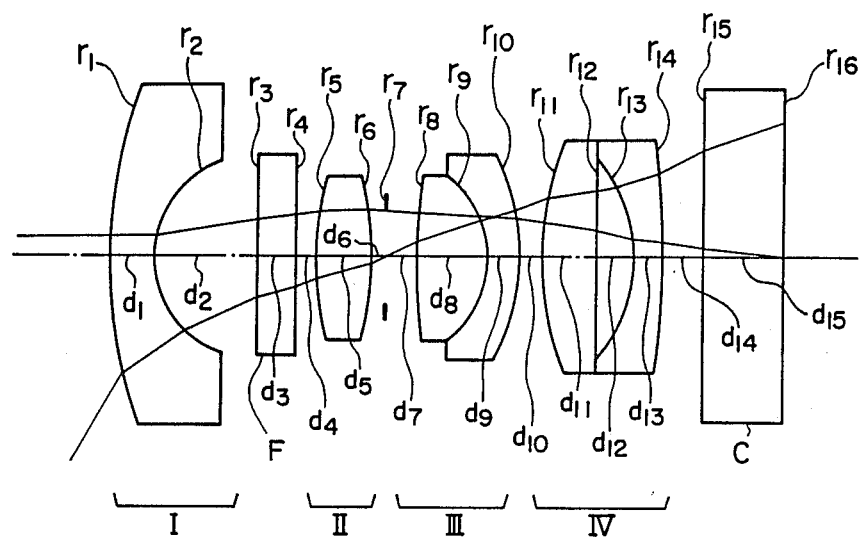
Figure 17:
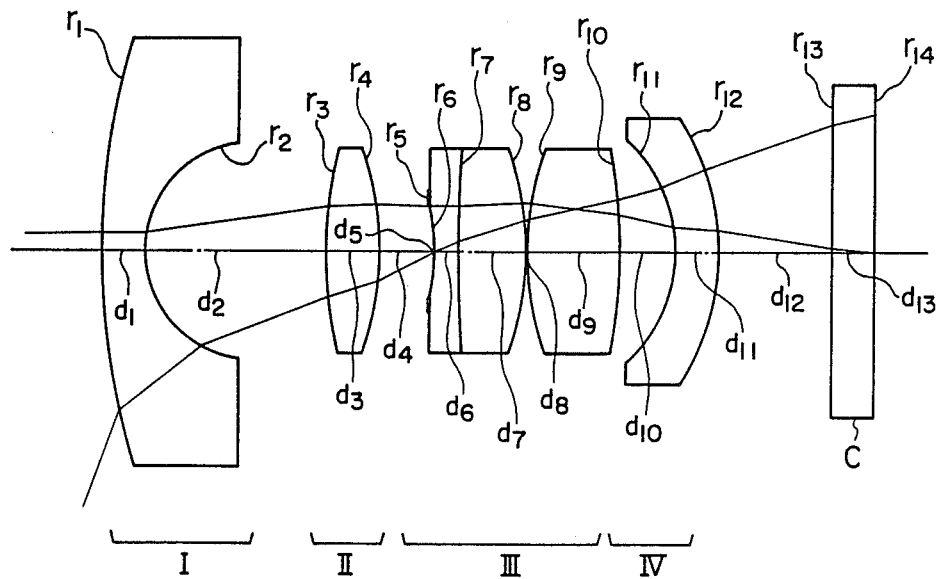
Figure 18:
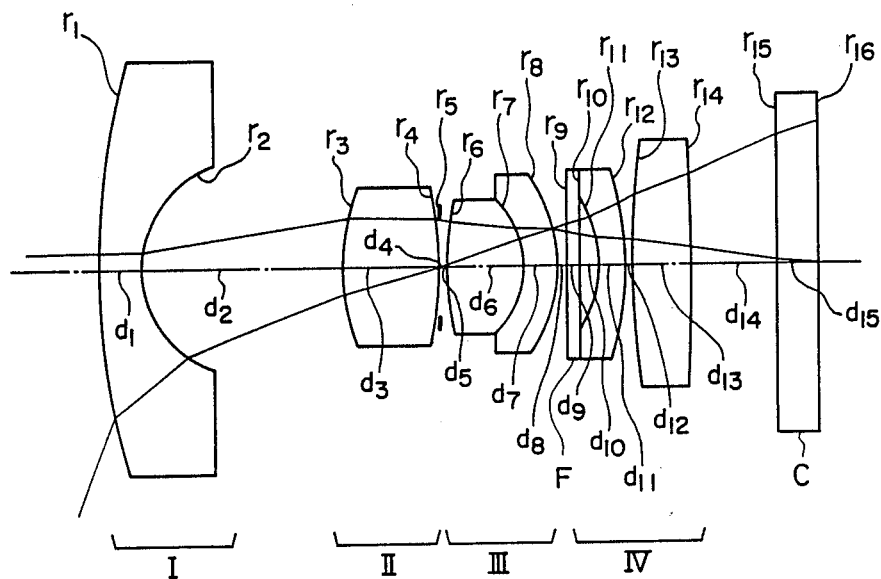
Figure 19:
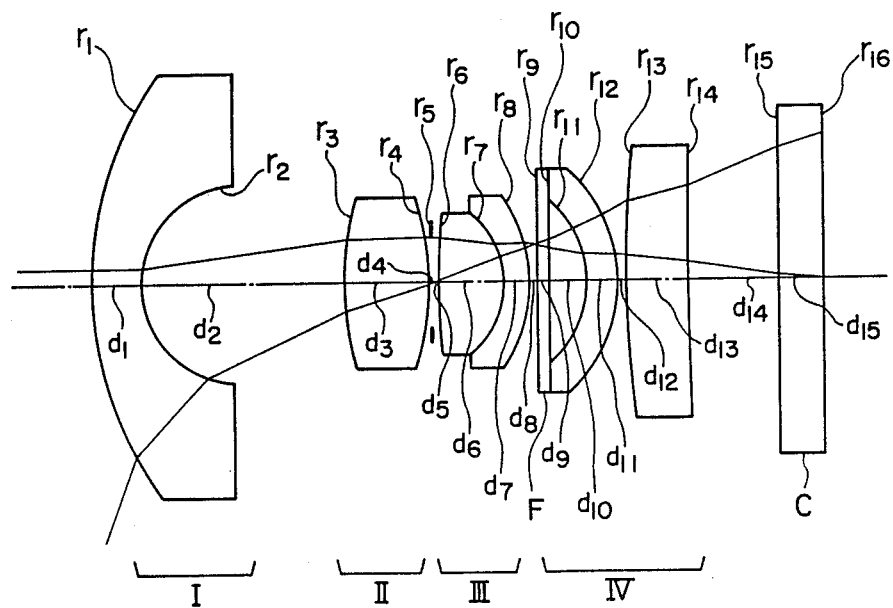
Figure 20:
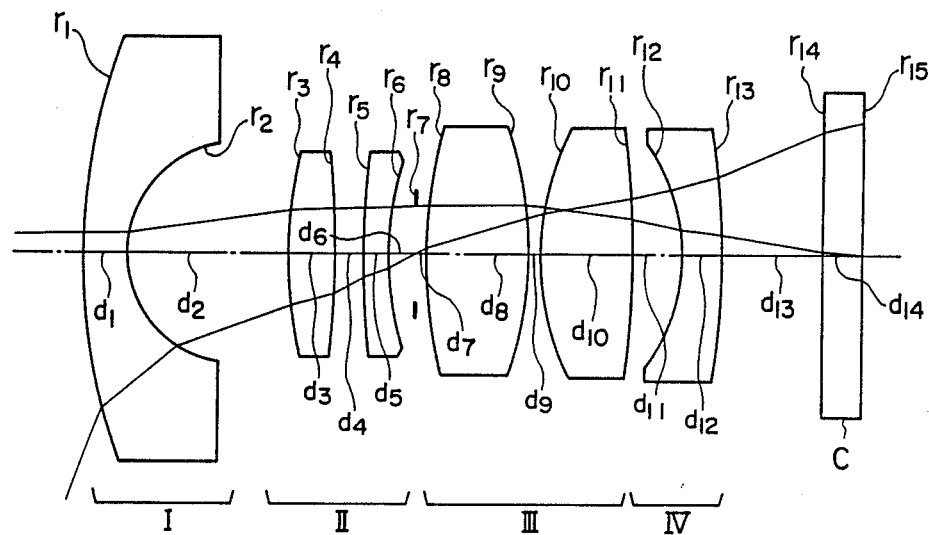
Figure 21:
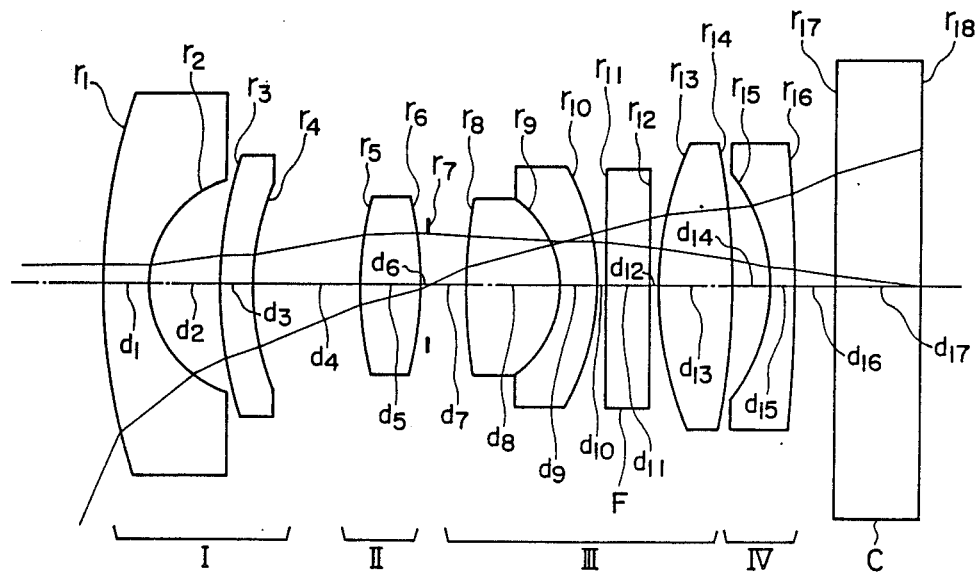
Figure 22:
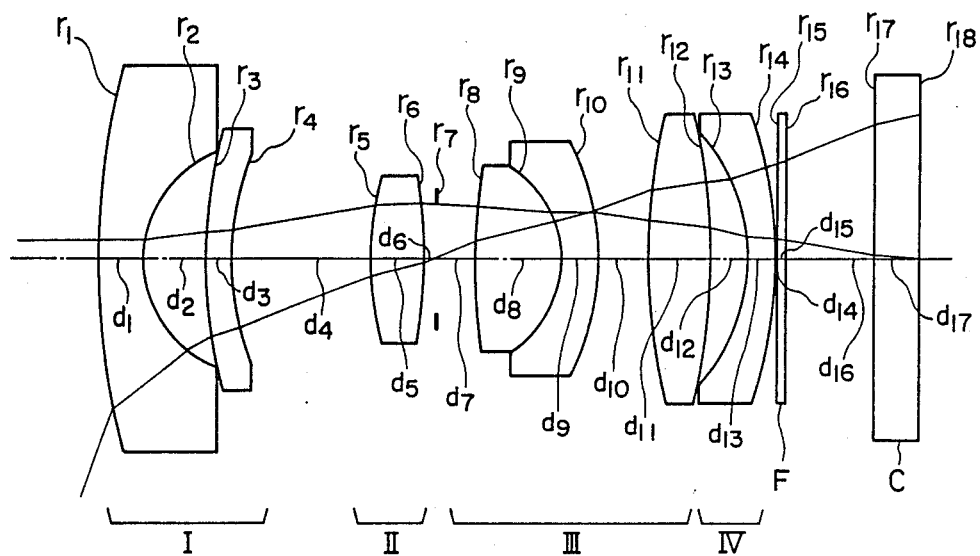

Now, preferred embodiments of the objective for an endoscope according to the present invention are shown below.

| Embodiment 1 |
|---|
| $f = 1$, $F_{No} = 3.018$, $2\omega = 100.926°$ |
| $IH = 0.9184$ |

| | | | |
|---|---|---|---|
| $r_1 = 4.4097$ | | | |
| $d_1 = 0.2877$ | | $n_1 = 1.88300$ | $\nu_1 = 40.78$ |
| $r_2 = 0.7457$ | | | |
| $d_2 = 1.0472$ | | | |
| $r_3 = 2.0242$ | | | |
| $d_3 = 0.3049$ | | $n_2 = 1.74100$ | $\nu_2 = 52.68$ |
| $r_4 = \infty$ | | | |
| $d_4 = 0.3510$ | | | |
| $r_5 = \infty$ | | | |
| $d_5 = 0.3049$ | | $n_3 = 1.74100$ | $\nu_3 = 52.68$ |
| $r_6 = -2.0242$ | | | |
| $d_6 = 0.0575$ | | | |
| $r_7 = \infty$ (aperture stop) | | | |
| $d_7 = 0.0575$ | | | |
| $r_8 = 1.6116$ | | | |
| $d_8 = 0.5696$ | | $n_4 = 1.51633$ | $\nu_4 = 64.15$ |
| $r_9 = -1.0213$ | | | |
| $d_9 = 0.2301$ | | $n_5 = 1.80518$ | $\nu_5 = 25.43$ |
| $r_{10} = -2.1617$ | | | |
| $d_{10} = 0.0575$ | | | |
| $r_{11} = \infty$ | | | |
| $d_{11} = 0.2877$ | | $n_6 = 1.53172$ | $\nu_6 = 48.90$ |
| $r_{12} = \infty$ | | | |
| $d_{12} = 0.3625$ | | | |
| $r_{13} = -0.8009$ | | | |
| $d_{13} = 0.2301$ | | $n_7 = 1.72825$ | $\nu_7 = 28.46$ |
| $r_{14} = -1.3705$ | | | |
| $d_{14} = 0.3855$ | | | |
| $r_{15} = \infty$ | | | |
| $d_{15} = 0.5754$ | | $n_8 = 1.51633$ | $\nu_8 = 64.15$ |
| $r_{16} = \infty$ | | | |

$|h_1/f_1| = 0.6308$, $1.15|h_4/f_4| = 0.1670$
$f_2 = 1.567$, $f_1 = -1.055$, $f_{23} = 1.179$
$f_a/f_b = 2.732/2.526 = 1.082$, $R_2 = 2.024$
$R_2' = -2.024$, $R_3 = 1.612$

| Embodiment 2 |
|---|
| $f = 1$, $F_{No} = 3.102$, $2\omega = 100.03°$ |
| $IH = 0.9142$ |

| | | | |
|---|---|---|---|
| $r_1 = 3.6033$ | | | |
| $d_1 = 0.2864$ | | $n_1 = 1.88300$ | $\nu_1 = 40.78$ |
| $r_2 = 0.7446$ | | | |
| $d_2 = 1.0439$ | | | |
| $r_3 = 1.9155$ | | | |
| $d_3 = 0.3136$ | | $n_2 = 1.74100$ | $\nu_2 = 52.68$ |
| $r_4 = 13.9967$ | | | |
| $d_4 = 0.3855$ | | | |
| $r_5 = -13.9967$ | | | |
| $d_5 = 0.3136$ | | $n_3 = 1.74100$ | $\nu_3 = 52.68$ |
| $r_6 = -1.9155$ | | | |
| $d_6 = 0.0573$ | | | |
| $r_7 = \infty$ (aperture stop) | | | |
| $d_7 = 0.0573$ | | | |
| $r_8 = 1.3927$ | | | |
| $d_8 = 0.6192$ | | $n_4 = 1.51633$ | $\nu_4 = 64.15$ |
| $r_9 = -0.9683$ | | | |
| $d_9 = 0.2291$ | | $n_5 = 1.80518$ | $\nu_5 = 25.43$ |
| $r_{10} = -1.9872$ | | | |
| $d_{10} = 0.0573$ | | | |
| $r_{11} = \infty$ | | | |
| $d_{11} = 0.2864$ | | $n_6 = 1.53172$ | $\nu_6 = 48.90$ |
| $r_{12} = \infty$ | | | |
| $d_{12} = 0.3023$ | | | |
| $r_{13} = -0.8271$ | | | |
| $d_{13} = 0.2291$ | | $n_7 = 1.72825$ | $\nu_7 = 28.46$ |
| $r_{14} = -1.4614$ | | | |
| $d_{14} = 0.5727$ | | | |
| $r_{15} = \infty$ | | | |
| $d_{15} = 0.2864$ | | $n_8 = 1.51633$ | $\nu_8 = 64.15$ |
| $r_{16} = \infty$ | | | |

$|h_1/f_1| = 0.6215$, $1.15|h_4/f_4| = 0.1684$
$f_2 = 1.712$, $f_1 = -1.115$, $f_{23} = 1.198$
$f_a/f_b = 2.962/2.196 = 1.349$, $R_2 = 1.9155$

-continued

| Embodiment 2 |
|---|
| $R_2' = -1.9155$, $R_3 = 1.3927$ |

| Embodiment 3 |
|---|
| $f = 1$, $F_{No} = 3.016$, $2\omega = 120.0°$ |
| $IH = 1.0599$ |

| | | | |
|---|---|---|---|
| $r_1 = 5.3227$ | | | |
| $d_1 = 0.3327$ | | $n_1 = 1.88300$ | $\nu_1 = 40.78$ |
| $r_2 = 0.7651$ | | | |
| $d_2 = 0.4657$ | | | |
| $r_3 = \infty$ | | | |
| $d_3 = 0.3327$ | | $n_2 = 1.53172$ | $\nu_2 = 48.90$ |
| $r_4 = \infty$ | | | |
| $d_4 = 0.5089$ | | | |
| $r_5 = 2.3472$ | | | |
| $d_5 = 0.3279$ | | $n_3 = 1.74100$ | $\nu_3 = 52.68$ |
| $r_6 = -8.0069$ | | | |
| $d_6 = 0.2324$ | | | |
| $r_7 = 8.0069$ | | | |
| $d_7 = 0.3279$ | | $n_4 = 1.74100$ | $\nu_4 = 52.68$ |
| $r_8 = -2.3472$ | | | |
| $d_8 = 0.0665$ | | | |
| $r_9 = \infty$ (aperture stop) | | | |
| $d_9 = 0.0665$ | | | |
| $r_{10} = 4.0786$ | | | |
| $d_{10} = 0.5611$ | | $n_5 = 1.51633$ | $\nu_5 = 64.15$ |
| $r_{11} = -0.7418$ | | | |
| $d_{11} = 0.3327$ | | $n_6 = 1.80518$ | $\nu_6 = 25.43$ |
| $r_{12} = -1.2948$ | | | |
| $d_{12} = 0.4657$ | | | |
| $r_{13} = -0.9542$ | | | |
| $d_{13} = 0.3327$ | | $n_7 = 1.72825$ | $\nu_7 = 28.46$ |
| $r_{14} = -1.8356$ | | | |
| $d_{14} = 0.6653$ | | | |
| $r_{15} = \infty$ | | | |
| $d_{15} = 0.3327$ | | $n_8 = 1.51633$ | $\nu_8 = 64.15$ |
| $r_{16} = \infty$ | | | |

$|h_1/f_1| = 0.7424$, $1.15|h_4/f_4| = 0.1797$
$f_2 = 1.389$, $f_1 = -1.048$, $f_{23} = 1.231$
$f_a/f_b = 2.658/2.483 = 1.070$, $R_2 = 2.3472$
$R_2' = -2.3472$, $R_3 = 4.0786$

| Embodiment 4 |
|---|
| $f = 1$, $F_{No} = 3.045$, $2\omega = 100.0°$ |
| $IH = 0.9126$ |

| | | | |
|---|---|---|---|
| $r_1 = 3.3197$ | | | |
| $d_1 = 0.2583$ | | $n_1 = 1.88300$ | $\nu_1 = 40.78$ |
| $r_2 = 0.6814$ | | | |
| $d_2 = 0.8784$ | | | |
| $r_3 = 1.8634$ | | | |
| $d_3 = 0.4254$ | | $n_2 = 1.74100$ | $\nu_2 = 52.68$ |
| $r_4 = 129.9784$ | | | |
| $d_4 = 0.2067$ | | | |
| $r_5 = -61.4126$ | | | |
| $d_5 = 0.4274$ | | $n_3 = 1.74100$ | $\nu_3 = 52.68$ |
| $r_6 = -1.6314$ | | | |
| $d_6 = 0.0572$ | | | |
| $r_7 = \infty$ (aperture stop) | | | |
| $d_7 = 0.0572$ | | | |
| $r_8 = 3.9424$ | | | |
| $d_8 = 0.6651$ | | $n_4 = 1.51633$ | $\nu_4 = 64.15$ |
| $r_9 = -0.5959$ | | | |
| $d_9 = 0.2287$ | | $n_5 = 1.80518$ | $\nu_5 = 25.43$ |
| $r_{10} = -1.1681$ | | | |
| $d_{10} = 0.0517$ | | | |
| $r_{11} = \infty$ | | | |
| $d_{11} = 0.2859$ | | $n_6 = 1.53172$ | $\nu_6 = 48.90$ |
| $r_{12} = \infty$ | | | |
| $d_{12} = 0.4031$ | | | |
| $r_{13} = -3.1629$ | | | |
| $d_{13} = 0.2287$ | | $n_7 = 1.72825$ | $\nu_7 = 28.46$ |
| $r_{14} = 62.5974$ | | | |
| $d_{14} = 0.5718$ | | | |

-continued

Embodiment 4

| | | |
|---|---|---|
| $r_{15} = \infty$ | | |
| $d_{15} = 0.2859$ | $n_8 = 1.51633$ | $\nu_8 = 64.15$ |
| $r_{16} = $ | | |

$|h_1/f_1| = 0.6179$, $1.15\,|h_4/f_4| = 0.1436$
$f_2 = 1.402$, $f_1 = -1.018$, $f_{23} = 1.248$
$f_a/f_b = 2.840/2.255 = 1.259$, $R_2 = 1.8634$
$R_2' = -1.6314$, $R_3 = 3.9424$

Embodiment 5

$f = 1$, $F_{No} = 3.021$, $2\omega = 119.996°$
$IH = 1.0627$

| | | |
|---|---|---|
| $r_1 = 4.0027$ | | |
| $d_1 = 0.3336$ | $n_1 = 1.88300$ | $\nu_1 = 40.78$ |
| $r_2 = 0.8672$ | | |
| $d_2 = 0.5337$ | | |
| $r_3 = \infty$ | | |
| $d_3 = 0.3336$ | $n_2 = 1.53172$ | $\nu_2 = 48.90$ |
| $r_4 = \infty$ | | |
| $d_4 = 0.2763$ | | |
| $r_5 = 3.3266$ | | |
| $d_5 = 0.3885$ | $n_3 = 1.74100$ | $\nu_3 = 52.68$ |
| $r_6 = -5.1676$ | | |
| $d_6 = 0.2001$ | | |
| $r_7 = -1.3143$ | | |
| $d_7 = 0.7465$ | $n_4 = 1.74100$ | $\nu_4 = 52.68$ |
| $r_8 = -1.3763$ | | |
| $d_8 = 0.0667$ | | |
| $r_9 = \infty$ (aperture stop) | | |
| $d_9 = 0.0667$ | | |
| $r_{10} = 1.1237$ | | |
| $d_{10} = 0.9237$ | $n_5 = 1.51633$ | $\nu_5 = 64.15$ |
| $r_{11} = -0.8226$ | | |
| $d_{11} = 0.2668$ | $n_6 = 1.80518$ | $\nu_6 = 25.43$ |
| $r_{12} = -1.4219$ | | |
| $d_{12} = 0.4003$ | | |
| $r_{13} = -0.8672$ | | |
| $d_{13} = 0.3336$ | $n_7 = 1.72825$ | $\nu_7 = 28.46$ |
| $r_{14} = -1.8779$ | | |
| $d_{14} = 0.6671$ | | |
| $r_{15} = \infty$ | | |
| $d_{15} = 0.3336$ | $n_8 = 1.51633$ | $\nu_8 = 64.15$ |
| $r_{16} = \infty$ | | |

$|h_1/f_1| = 0.7648$, $1.15\,|h_4/f_4| = 0.2305$
$f_2 = 2.716$, $f_1 = -1.320$, $f_{23} = 1.231$
$f_a/f_b = 9.543/1.675 = 5.697$, $R_2 = 3.327$
$R_2' = -1.3763$, $R_3 = 1.124$

Embodiment 6

$f = 1$, $F_{No} = 3.058$, $2\omega = 140.0°$
$IH = 1.2009$

| | | |
|---|---|---|
| $r_1 = 6.0196$ | | |
| $d_1 = 0.3762$ | $n_1 = 1.88300$ | $\nu_1 = 40.78$ |
| $r_2 = 1.1110$ | | |
| $d_2 = 1.5577$ | | |
| $r_3 = 2.6673$ | | |
| $d_3 = 1.1023$ | $n_2 = 1.71736$ | $\nu_2 = 29.51$ |
| $r_4 = -6.2168$ | | |
| $d_4 = 0.0405$ | | |
| $r_5 = \infty$ (aperture stop) | | |
| $d_5 = 0.1308$ | | |
| $r_6 = 5.1700$ | | |
| $d_6 = 0.3762$ | $n_3 = 1.69680$ | $\nu_3 = 55.52$ |
| $r_7 = -1745.3945$ | | |
| $d_7 = 0.0967$ | | |
| $r_8 = 9.8513$ | | |
| $d_8 = 0.7515$ | $n_4 = 1.69680$ | $\nu_4 = 55.52$ |
| $r_9 = -0.7846$ | | |
| $d_9 = 0.3010$ | $n_5 = 1.80518$ | $\nu_5 = 25.43$ |
| $r_{10} = -1.2594$ | | |
| $d_{10} = 0.2851$ | | |
| $r_{11} = -1.0047$ | | |
| $d_{11} = 0.2591$ | $n_6 = 1.72825$ | $\nu_6 = 28.46$ |

-continued

Embodiment 6

| | | |
|---|---|---|
| $r_{12} = -1.4804$ | | |
| $d_{12} = 1.0030$ | | |
| $r_{13} = \infty$ | | |
| $d_{13} = 0.3762$ | $n_7 = 1.51633$ | $\nu_7 = 64.15$ |
| $r_{14} = \infty$ | | |

$|h_1/f_1| = 0.7519$, $1.15\,|h_4/f_4| = 0.1387$
$f_2 = 2.744$, $f_1 = -1.600$, $f_{23} = 1.520$
$f_a/f_b = 7.398/1.776 = 4.166$, $R_2 = 2.6673$
$R_2' = -6.2168$, $R_3 = 5.1700$

Embodiment 7

$f = 1$, $F_{No} = 2.996$, $2\omega = 120.82°$
$IH = 1.082$

| | | |
|---|---|---|
| $r_1 = 4.3525$ | | |
| $d_1 = 0.3390$ | $n_1 = 1.88300$ | $\nu_1 = 40.78$ |
| $r_2 = 0.7946$ | | |
| $d_2 = 0.8793$ | | |
| $r_3 = \infty$ | | |
| $d_3 = 0.3390$ | $n_2 = 1.53172$ | $\nu_2 = 48.90$ |
| $r_4 = \infty$ | | |
| $d_4 = 0.1627$ | | |
| $r_5 = 2.5566$ | | |
| $d_5 = 0.4746$ | $n_3 = 1.72825$ | $\nu_3 = 28.46$ |
| $r_6 = -2.5566$ | | |
| $d_6 = 0.1182$ | | |
| $r_7 = \infty$ (aperture stop) | | |
| $d_7 = 0.2585$ | | |
| $r_8 = 4.6183$ | | |
| $d_8 = 0.6183$ | $n_4 = 1.58913$ | $\nu_4 = 60.97$ |
| $r_9 = -0.8237$ | | |
| $d_9 = 0.2712$ | $n_5 = 1.80518$ | $\nu_5 = 25.43$ |
| $r_{10} = -1.6936$ | | |
| $d_{10} = 0.1794$ | | |
| $r_{11} = 2.4014$ | | |
| $d_{11} = 0.4746$ | $n_6 = 1.65830$ | $\nu_6 = 57.33$ |
| $r_{12} = -32.2502$ | | |
| $d_{12} = 0.2936$ | | |
| $r_{13} = -1.2908$ | | |
| $d_{13} = 0.2373$ | $n_7 = 1.80518$ | $\nu_7 = 25.43$ |
| $r_{14} = -7.7878$ | | |
| $d_{14} = 0.3276$ | | |
| $r_{15} = \infty$ | | |
| $d_{15} = 0.6780$ | $n_8 = 1.54869$ | $\nu_8 = 45.55$ |
| $r_{16} = \infty$ | | |

$|h_1/f_1| = 0.4766$, $1.15\,|h_4/f_4| = 0.3672$
$f_2 = 1.827$, $f_1 = -1.152$, $f_{23} = 1.291$
$f_a/f_b = 3.114/1.827 = 1.869$, $R_2 = 2.557$
$R_2' = -2.5566$, $R_3 = 4.618$

Embodiment 8

$f = 1$, $F_{No} = 3.007$, $2\omega = 140.03°$
$IH = 1.1433$

| | | |
|---|---|---|
| $r_1 = 5.7307$ | | |
| $d_1 = 0.3582$ | $n_1 = 1.88300$ | $\nu_1 = 40.78$ |
| $r_2 = 0.9213$ | | |
| $d_2 = 1.5140$ | | |
| $r_3 = 3.4686$ | | |
| $d_3 = 0.4510$ | $n_2 = 1.72342$ | $\nu_2 = 37.95$ |
| $r_4 = -2.7135$ | | |
| $d_4 = 0.4225$ | | |
| $r_5 = \infty$ (aperture stop) | | |
| $d_5 = 0.0335$ | | |
| $r_6 = -1.9941$ | | |
| $d_6 = 0.2149$ | $n_3 = 1.64769$ | $\nu_3 = 33.80$ |
| $r_7 = 10.3571$ | | |
| $d_7 = 0.5806$ | $n_4 = 1.78590$ | $\nu_4 = 44.18$ |
| $r_8 = -2.3442$ | | |
| $d_8 = 0.0116$ | | |
| $r_9 = 2.4393$ | | |
| $d_9 = 0.7777$ | $n_5 = 1.69680$ | $\nu_5 = 55.52$ |
| $r_{10} = -4.4832$ | | |
| $d_{10} = 0.4755$ | | |

4,806,001

15

-continued

Embodiment 8

| | | |
|---|---|---|
| $r_{11} = -1.1857$ | | |
| $d_{11} = 0.3582$ | $n_6 = 1.72825$ | $\nu_6 = 28.46$ |
| $r_{12} = -1.8661$ | | |
| $d_{12} = 0.9316$ | | |
| $r_{13} = \infty$ | | |
| $d_{13} = 0.3582$ | $n_7 = 1.51633$ | $\nu_7 = 64.15$ |
| $r_{14} = \infty$ | | |

$|h_1/f_1| = 0.8187$, $1.15|h_4/f_4| = 0.1215$
$f_2 = 2.171$, $f_1 = -1.288$, $f_{23} = 1.482$
$f_a/f_b = 13.805/2.171 = 6.359$, $R_2 = 3.4686$
$R_2' = -2.7135$, $R_3 = -1.9941$

Embodiment 9

$f = 1$, $F_{No} = 3.109$, $2\omega = 138.27°$
IH = 1.1424

| | | |
|---|---|---|
| $r_1 = 5.7266$ | | |
| $d_1 = 0.3579$ | $n_1 = 1.88300$ | $\nu_1 = 40.78$ |
| $r_2 = 0.8615$ | | |
| $d_2 = 1.6801$ | | |
| $r_3 = 1.7123$ | | |
| $d_3 = 0.8102$ | $n_2 = 1.71300$ | $\nu_2 = 53.84$ |
| $r_4 = -3.5156$ | | |
| $d_4 = 0.0039$ | | |
| $r_5 = \infty$ (aperture stop) | | |
| $d_5 = 0.0659$ | | |
| $r_6 = 2.4711$ | | |
| $d_6 = 0.6563$ | $n_3 = 1.51633$ | $\nu_3 = 64.15$ |
| $r_7 = -0.7133$ | | |
| $d_7 = 0.2863$ | $n_4 = 1.80518$ | $\nu_4 = 25.43$ |
| $r_8 = -1.2246$ | | |
| $d_8 = 0.0636$ | | |
| $r_9 = \infty$ | | |
| $d_9 = 0.1034$ | $n_5 = 1.53172$ | $\nu_5 = 48.90$ |
| $r_{10} = \infty$ | | |
| $d_{10} = 0.1720$ | | |
| $r_{11} = -0.9620$ | | |
| $d_{11} = 0.2147$ | $n_6 = 1.72825$ | $\nu_6 = 28.46$ |
| $r_{12} = -2.5078$ | | |
| $d_{12} = 0.0517$ | | |
| $r_{13} = 7.1019$ | | |
| $d_{13} = 0.5011$ | $n_7 = 1.51633$ | $\nu_7 = 64.15$ |
| $r_{14} = -19.3899$ | | |
| $d_{14} = 0.7158$ | | |
| $r_{15} = \infty$ | | |
| $d_{15} = 0.3579$ | $n_8 = 1.51633$ | $\nu_8 = 64.15$ |
| $r_{16} = \infty$ | | |

$|h_1/f_1| = 0.8129$, $1.15|h_4/f_4| = 0.2031$
$f_2 = 1.726$, $f_1 = -1.189$, $f_{23} = 1.262$
$f_a/f_b = 10.132/1.726 = 5.870$, $R_2 = 1.712$
$R_2' = -3.5156$, $R_3 = 2.471$

Embodiment 10

$f = 1$, $F_{No} = 3.085$, $2\omega = 139.536°$
IH = 1.2073

| | | |
|---|---|---|
| $r_1 = 3.1833$ | | |
| $d_1 = 0.3782$ | $n_1 = 1.88300$ | $\nu_1 = 40.78$ |
| $r_2 = 0.8334$ | | |
| $d_2 = 1.7146$ | | |
| $r_3 = 2.4300$ | | |
| $d_3 = 0.7182$ | $n_2 = 1.71300$ | $\nu_2 = 53.84$ |
| $r_4 = -2.2325$ | | |
| $d_4 = 0.0250$ | | |
| $r_5 = \infty$ (aperture stop) | | |
| $d_5 = 0.0546$ | | |
| $r_6 = 7.1362$ | | |
| $d_6 = 0.5463$ | $n_3 = 1.51633$ | $\nu_3 = 64.15$ |
| $r_7 = -0.7591$ | | |
| $d_7 = 0.2185$ | $n_4 = 1.80518$ | $\nu_4 = 25.43$ |
| $r_8 = -1.2930$ | | |
| $d_8 = 0.0672$ | | |
| $r_9 = \infty$ | | |
| $d_9 = 0.1092$ | $n_5 = 1.53172$ | $\nu_5 = 48.90$ |

16

-continued

Embodiment 10

| | | |
|---|---|---|
| $r_{10} = \infty$ | | |
| $d_{10} = 0.3020$ | | |
| $r_{11} = -0.8880$ | | |
| $d_{11} = 0.2731$ | $n_6 = 1.72825$ | $\nu_6 = 28.46$ |
| $r_{12} = -1.1927$ | | |
| $d_{12} = 0.0546$ | | |
| $r_{13} = 10.5247$ | | |
| $d_{13} = 0.5295$ | $n_7 = 1.51633$ | $\nu_7 = 64.15$ |
| $r_{14} = 117.0536$ | | |
| $d_{14} = 0.7564$ | | |
| $r_{15} = \infty$ | | |
| $d_{15} = 0.3782$ | $n_8 = 1.51633$ | $\nu_8 = 64.15$ |
| $r_{16} = \infty$ | | |

$|h_1/f_1| = 0.8008$, $1.15|h_4/f_4| = 0.0561$
$f_2 = 1.744$, $f_1 = -1.383$, $f_{23} = 1.335$
$f_a/f_b = 22.360/1.744 = 12.821$, $R_2 = 2.430$
$R_2' = -2.2325$, $R_3 = 7.136$

Embodiment 11

$f = 1$, $F_{No} = 3.044$, $2\omega = 140.082°$
IH = 1.0969

| | | |
|---|---|---|
| $r_1 = 5.4983$ | | |
| $d_1 = 0.3436$ | $n_1 = 1.88300$ | $\nu_1 = 40.78$ |
| $r_2 = 0.8851$ | | |
| $d_2 = 1.3387$ | | |
| $r_3 = 3.1007$ | | |
| $d_3 = 0.4124$ | $n_2 = 1.72342$ | $\nu_2 = 37.95$ |
| $r_4 = -6.9867$ | | |
| $d_4 = 0.2456$ | | |
| $r_5 = 6.4144$ | | |
| $d_5 = 0.2062$ | $n_3 = 1.69680$ | $\nu_3 = 55.52$ |
| $r_6 = 2.4882$ | | |
| $d_6 = 0.2368$ | | |
| $r_7 = \infty$ (aperture stop) | | |
| $d_7 = 0.0860$ | | |
| $r_8 = 3.4511$ | | |
| $d_8 = 0.8753$ | $n_4 = 1.65830$ | $\nu_4 = 57.33$ |
| $r_9 = -2.8298$ | | |
| $d_9 = 0.0932$ | | |
| $r_{10} = 2.2130$ | | |
| $d_{10} = 0.7745$ | $n_5 = 1.69680$ | $\nu_5 = 55.52$ |
| $r_{11} = -6.8452$ | | |
| $d_{11} = 0.4152$ | | |
| $r_{12} = -1.5863$ | | |
| $d_{12} = 0.3436$ | $n_6 = 1.72825$ | $\nu_6 = 28.46$ |
| $r_{13} = -5.3578$ | | |
| $d_{13} = 0.8408$ | | |
| $r_{14} = \infty$ | | |
| $d_{14} = 0.3436$ | $n_7 = 1.51633$ | $\nu_7 = 64.15$ |
| $r_{15} = \infty$ | | |

$|h_1/f_1| = 0.8288$, $1.15|h_4/f_4| = 0.2126$
$f_2 = 5.060$, $f_1 = -1.238$, $f_{23} = 1.513$
$f_a/f_b = 3.020/2.487 = 1.214$, $R_2 = 3.1007$
$R_2' = 2.4882$, $R_3 = 3.4511$

Embodiment 12

$f = 1$, $F_{No} = 3.027$, $2\omega = 132.72°$
IH = 1.1757

| | | |
|---|---|---|
| $r_1 = 5.1635$ | | |
| $d_1 = 0.3690$ | $n_1 = 1.88300$ | $\nu_1 = 40.78$ |
| $r_2 = 0.9388$ | | |
| $d_2 = 0.6126$ | | |
| $r_3 = 3.8306$ | | |
| $d_3 = 0.2583$ | $n_2 = 1.77250$ | $\nu_2 = 49.66$ |
| $r_4 = 2.2149$ | | |
| $d_4 = 0.9078$ | | |
| $r_5 = 2.8179$ | | |
| $d_5 = 0.5166$ | $n_3 = 1.72825$ | $\nu_3 = 28.46$ |
| $r_6 = -2.8179$ | | |
| $d_6 = 0.0590$ | | |
| $r_7 = \infty$ (aperture stop) | | |
| $d_7 = 0.3247$ | | |

-continued

Embodiment 12

| | | |
|---|---|---|
| $r_8 = 4.9768$ | | |
| $d_8 = 0.8119$ | $n_4 = 1.58913$ | $\nu_4 = 60.97$ |
| $r_9 = -0.8827$ | | |
| $d_9 = 0.2952$ | $n_5 = 1.80518$ | $\nu_5 = 25.43$ |
| $r_{10} = -2.0002$ | | |
| $d_{10} = 0.0738$ | | |
| $r_{11} = \infty$ | | |
| $d_{11} = 0.3690$ | $n_6 = 1.53172$ | $\nu_6 = 48.90$ |
| $r_{12} = \infty$ | | |
| $d_{12} = 0.0738$ | | |
| $r_{13} = 3.0482$ | | |
| $r_{13} = 0.6274$ | $n_7 = 1.65160$ | $\nu_7 = 58.52$ |
| $r_{14} = -5.5591$ | | |
| $d_{14} = 0.3026$ | | |
| $r_{15} = -1.5381$ | | |
| $d_{15} = 0.2214$ | $n_8 = 1.84666$ | $\nu_8 = 23.78$ |
| $r_{16} = -11.0629$ | | |
| $d_{16} = 0.3247$ | | |
| $r_{17} = \infty$ | | |
| $d_{17} = 0.7381$ | $n_9 = 1.54869$ | $\nu_9 = 45.55$ |
| $r_{18} = \infty$ | | |

$|h_1/f_1| = 0.7425$, $1.15|h_4/f_4| = 0.3957$
$f_2 = 2.012$, $f_1 = -1.031$, $f_{23} = 1.588$
$f_a/f_b = 3.650/2.012 = 1.814$, $R_2 = 2.8179$
$R_2' = -2.8179$, $R_3 = 4.9768$

Embodiment 13

$f = 1$, $F_{No} = 3.012$  $2\omega = 140.0°$
IH = 1.197

| | | |
|---|---|---|
| $r_1 = 5.9912$ | | |
| $d_1 = 0.3750$ | $n_1 = 1.88300$ | $\nu_1 = 40.78$ |
| $r_2 = 0.9537$ | | |
| $d_2 = 0.5250$ | | |
| $r_3 = 3.7795$ | | |
| $d_3 = 0.2250$ | $n_2 = 1.88300$ | $\nu_2 = 40.78$ |
| $r_4 = 2.2136$ | | |
| $d_4 = 1.1585$ | | |
| $r_5 = 2.5094$ | | |
| $d_5 = 0.4591$ | $n_3 = 1.72825$ | $\nu_3 = 28.46$ |
| $r_6 = -3.7450$ | | |
| $d_6 = 0.1125$ | | |
| $r_7 = \infty$ (aperture stop) | | |
| $d_7 = 0.3134$ | | |
| $r_8 = 4.7584$ | | |
| $d_8 = 0.7459$ | $n_4 = 1.58913$ | $\nu_4 = 60.97$ |
| $r_9 = -0.8785$ | | |
| $d_9 = 0.3000$ | $n_5 = 1.80518$ | $\nu_5 = 25.43$ |
| $r_{10} = -2.0123$ | | |
| $d_{10} = 0.4069$ | | |
| $r_{11} = 5.0897$ | | |
| $d_{11} = 0.5250$ | $n_6 = 1.65830$ | $\nu_6 = 57.33$ |
| $r_{12} = -4.6412$ | | |
| $d_{12} = 0.3298$ | | |
| $r_{13} = -1.4135$ | | |
| $d_{13} = 0.2250$ | $n_7 = 1.80518$ | $\nu_7 = 25.43$ |
| $r_{14} = -3.4758$ | | |
| $d_{14} = 0.0088$ | | |
| $r_{15} = \infty$ | | |
| $d_{15} = 0.0750$ | $n_8 = 1.51633$ | $\nu_8 = 64.15$ |
| $r_{16} = \infty$ | | |
| $d_{16} = 0.7500$ | | |
| $r_{17} = \infty$ | | |
| $d_{17} = 0.3750$ | $n_9 = 1.51633$ | $\nu_9 = 64.15$ |
| $r_{18} = \infty$ | | |

$|h_1/f_1| = 0.8141$, $1.15|h_4/f_4| = 0.2636$
$f_2 = 2.129$, $f_1 = -1.002$, $f_{23} = 1.636$
$f_a/f_b = 3.768/2.129 = 1.770$, $R_2 = 1.5094$
$R_2' = -3.7450$, $R_3 = 4.7584$

Embodiment 14

$f = 1$, $F_{No} = 3.001$,  $2\omega = 120.832°$
IH = 1.2267

| | | |
|---|---|---|
| $r_1 = 5.9125$ (aspherical surface) | | |
| $d_1 = 0.3843$ | $n_1 = 1.88300$ | $\nu_1 = 40.78$ |
| $r_2 = 0.8298$ | | |
| $d_2 = 0.9897$ | | |
| $r_3 = \infty$ | | |
| $d_3 = 0.3843$ | $n_2 = 1.53172$ | $\nu_2 = 48.90$ |
| $r_4 = \infty$ | | |
| $d_4 = 0.1845$ | | |
| $r_5 = 2.9048$ | | |
| $d_5 = 0.5380$ | $n_3 = 1.72825$ | $\nu_3 = 28.46$ |
| $r_6 = -2.9283$ | | |
| $d_6 = 0.1313$ | | |
| $r_7 = \infty$ (aperture stop) | | |
| $d_7 = 0.2910$ | | |
| $r_8 = 5.4055$ | | |
| $d_8 = 0.7010$ | $n_4 = 1.58913$ | $\nu_4 = 60.97$ |
| $r_9 = -0.9380$ | | |
| $d_9 = 0.3075$ | $n_5 = 1.80518$ | $\nu_5 = 25.43$ |
| $r_{10} = -1.8953$ | | |
| $d_{10} = 0.2034$ | | |
| $r_{11} = 2.6198$ | | |
| $d_{11} = 0.5380$ | $n_6 = 1.65830$ | $\nu_6 = 57.33$ |
| $r_{12} = -11.3821$ | | |
| $d_{12} = 0.3328$ | | |
| $r_{13} = -1.2309$ (aspherical surface) | | |
| $d_{13} = 0.2690$ | $n_7 = 1.80518$ | $\nu_7 = 25.43$ |
| $r_{14} = -3.6160$ | | |
| $d_{14} = 0.3714$ | | |
| $r_{15} = \infty$ | | |
| $d_{15} = 0.7686$ | $n_8 = 1.54869$ | $\nu_8 = 45.55$ |
| $r_{16} = \infty$ | | |

$|h_1/f_1| = 0.8266$, $1.15|h_4/f_4| = 0.3411$
$f_2 = 2.083$, $f_1 = -1.133$, $f_{23} = 1.452$
$f_a/f_b = 3.285/2.083 = 1.577$, $R_2 = 2.9048$
$R_2' = -2.9283$, $R_3 = 5.4055$
Coefficients of aspherical surfaces
(1st lens surface)   $P = 1$, $E = 0.22631 \times 10^{-1}$
(13th lens surface)  $P = 1$

Embodiment 15

$f = 1$, $F_{No} = 3.004$,  $2\omega = 120.07°$
IH = 2.4366

| | | |
|---|---|---|
| $r_1 = 6.3333$ (aspherical surface) | | |
| $d_1 = 0.3818$ | $n_1 = 1.88300$ | $\nu_1 = 40.78$ |
| $r_2 = 0.8893$ (aspherical surface) | | |
| $d_2 = 1.8084$ | | |
| $r_3 = 1.8590$ | | |
| $d_3 = 0.9825$ | $n_2 = 1.71300$ | $\nu_2 = 53.84$ |
| $r_4 = -3.8279$ | | |
| $d_4 = 0.0042$ | | |
| $r_5 = \infty$ (aperture stop) | | |
| $d_5 = 0.0767$ | | |
| $r_6 = 2.7250$ | | |
| $d_6 = 0.7392$ | $n_3 = 1.51633$ | $\nu_3 = 64.15$ |
| $r_7 = -0.7605$ | | |
| $d_7 = 0.3054$ | $n_4 = 1.80518$ | $\nu_4 = 25.43$ |
| $r_8 = -1.3061$ | | |
| $d_8 = 0.3156$ | | |
| $r_9 = -1.0055$ | | |
| $d_9 = 0.2290$ | $n_5 = 1.72825$ | $\nu_5 = 28.46$ |
| $r_{10} = -2.2630$ | | |
| $d_{10} = 0.0552$ | | |
| $r_{11} = 7.1359$ | | |
| $d_{11} = 0.5346$ | $n_6 = 1.51633$ | $\nu_6 = 64.15$ |
| $r_{12} = -8.5566$ (aspherical surface) | | |
| $d_{12} = 0.7636$ | | |
| $r_{13} = \infty$ | | |
| $d_{13} = 0.3818$ | $n_7 = 1.51633$ | $\nu_7 = 64.15$ |
| $r_{14} = \infty$ | | |

$|h_1/f_1| = 0.9051$, $1.15|h_4/f_4| = 0.1536$
$f_2 = 1.891$, $f_1 = -1.212$, $f_{23} = 1.404$
$f_a/f_b = 7.624/1.891 = 4.032$, $R_2 = 1.8590$
$R_2' = -3.8279$, $R_3 = 2.7250$
(Coefficients of aspherical surfaces)
(1st lens surface)   $P = 0$, $E = 0.15726 \times 10^{-1}$
(2nd lens surface)   $P = 1$, -continued

Embodiment 15

(12th lens surface) P = 1

Embodiment 16

$f = 1$, $N_{No} = 2.998$, $2\omega = 120.796°$
IH = 1.2469

| | | |
|---|---|---|
| $r_1 = 5.9663$ (aspherical surface) | | |
| $d_1 = 0.3906$ | $n_1 = 1.88300$ | $\nu_1 = 40.78$ |
| $r_2 = 0.8272$ | | |
| $d_2 = 1.0070$ | | |
| $r_3 = \infty$ | | |
| $d_3 = 0.3906$ | $n_2 = 1.53172$ | $\nu_2 = 48.90$ |
| $r_4 = \infty$ | | |
| $d_4 = 0.1875$ | | |
| $r_5 = 3.0194$ | | |
| $d_5 = 0.5469$ | $n_3 = 1.72825$ | $\nu_3 = 28.46$ |
| $r_6 = -2.9267$ | | |
| $d_6 = 0.1334$ | | |
| $r_7 = \infty$ (aperture stop) | | |
| $d_7 = 0.2955$ | | |
| $r_8 = 5.6257$ | | |
| $d_8 = 0.7125$ | $n_4 = 1.58913$ | $\nu_4 = 60.97$ |
| $r_9 = -0.9698$ | | |
| $d_9 \quad 0.3125$ | $n_5 = 1.80518$ | $\nu_5 = 25.43$ |
| $r_{10} = -1.9298$ | | |
| $d_{10} = 0.2068$ | | |
| $r_{11} = 2.5655$ | | |
| $d_{11} = 0.5469$ | $n_6 = 1.65830$ | $\nu_6 = 57.33$ |
| $r_{12} = -12.9642$ | | |
| $d_{12} = 0.3383$ | | |
| $r_{13} = -1.2924$ (aspherical surface) | | |
| $d_{13} = 0.2734$ | $n_7 = 1.80518$ | $\nu_7 = 25.43$ |
| $r_{14} = -4.2008$ | | |
| $d_{14} = 0.3775$ | | |
| $r_{15} = \infty$ | | |
| $d_{15} = 0.7813$ | $n_8 = 1.54869$ | $\nu_8 = 45.55$ |
| $r_{16} = \infty$ | | |

$|h_1/f_1| = 0.8444$, $1.15|h_4/f_4| = 0.3481$
$f_2 = 2.123$, $f_1 = -1.128$, $f_{23} = 1.469$
$f_a/f_b = 3.358/2.123 = 1.582$, $R_2 = 3.0194$
$R_2' = -2.9267$, $R_3 = 5.6257$
(coefficients of aspherical surfaces)
(1st lens surface)   P = 1, E = 0.24015 × 10⁻¹
(13th lens surface)  P = 1, E = -0.12297 × 10⁻¹

$\left|\dfrac{A_F}{A_R}\right| = 5.124$

Embodiment 17

$f = 1$, $F_{No} = 3.030$, $2\omega = 99.99°$
IH = 1.1466

| | | |
|---|---|---|
| $r_1 = 6.0105$ | | |
| $d_1 = 0.3592$ | $n_1 = 1.88300$ | $\nu_1 = 40.78$ |
| $r_2 = 0.8194$ (aspherical surface) | | |
| $d_2 = 0.7184$ | | |
| $r_3 = 9.2577$ | | |
| $d_3 = 0.3592$ | $n_2 = 1.53172$ | $\nu_2 = 48.90$ |
| $r_4 = -30.2947$ | | |
| $d_4 = 0.3879$ | | |
| $r_5 = 2.6624$ | | |
| $d_5 = 0.5029$ | $n_3 = 1.72825$ | $\nu_3 = 28.46$ |
| $r_6 = -3.7679$ | | |
| $d_6 = 0.1252$ | | |
| $r_7 = \infty$ (aperture stop) | | |
| $d_7 = 0.2740$ | | |
| $r_8 = 4.8937$ | | |
| $d_8 = 0.6552$ | $n_4 = 1.58913$ | $\nu_4 = 60.97$ |
| $r_9 = -0.8923$ | | |
| $d_9 = 0.2874$ | $n_5 = 1.80518$ | $\nu_5 = 25.43$ |
| $r_{10} = -1.5847$ | | |
| $d_{10} = 0.1901$ | | |
| $r_{11} = 2.5445$ | | |

-continued

Embodiment 17

| | | |
|---|---|---|
| $d_{11} = 0.5029$ | $n_6 = 1.65830$ | $\nu_6 = 57.33$ |
| $r_{12} = -34.1731$ | | |
| $d_{12} = 0.3000$ | | |
| $r_{13} = -1.3263$ | | |
| $d_{13} = 0.2514$ | $n_7 = 1.80518$ | $\nu_7 = 25.43$ |
| $r_{14} = -7.5450$ (aspherical surface) | | |
| $d_{14} = 0.3471$ | | |
| $r_{15} = \infty$ | | |
| $d_{15} = 0.7184$ | $n_8 = 1.54869$ | $\nu_8 = 45.55$ |
| $r_{16} = \infty$ | | |

$|h_1/f_1| = 0.4335$, $1.15|h_4/f_4| = 0.3286$
$f_2 = 1.989$, $f_1 = -1.110$, $f_{23} = 1.406$
$f_a/f_b = 13.378/2.215 = 6.048$, $R_2 = 9.2577$
$R_2' = -3.7679$, $R_3 = 4.894$
coefficients of aspherical surfaces
(2nd lens surface)   P = 0, E = 0.51666 × 10⁻¹
                     F = 0.13710
(14th lens surface)  P = 0, E = 0.17323

$\left|\dfrac{A_F}{A_R}\right| = 1.808$

Embodiment 18

$f = 1$, $F_{No} = 3.008$, $2\omega = 129.582°$
IH = 1.2449

| | | |
|---|---|---|
| $r_1 = 7.0922$ (aspherical surface) | | |
| $d_1 = 0.3901$ | $n_1 = 1.88300$ | $\nu_1 = 40.78$ |
| $r_2 = 0.9320$ (aspherical surface) | | |
| $d_2 = 1.8376$ | | |
| $r_3 = 1.9116$ | | |
| $d_3 = 0.9886$ | $n_2 = 1.71300$ | $\nu_2 = 53.84$ |
| $r_4 = -3.8101$ | | |
| $d_4 = 0.0043$ | | |
| $r_5 = \infty$ (aperture stop) | | |
| $d_5 = 0.0800$ | | |
| $r_6 = 2.9288$ | | |
| $d_6 = 0.7605$ | $n_3 = 1.51633$ | $\nu_3 = 64.15$ |
| $r_7 = -0.7899$ | | |
| $d_7 = 0.3121$ | $n_4 = 1.80518$ | $\nu_4 = 25.43$ |
| $r_8 = -1.3346$ | | |
| $d_8 = 0.3051$ | | |
| $r_9 = -1.0142$ | | |
| $d_9 = 0.2340$ | $n_5 = 1.72825$ | $\nu_5 = 28.46$ |
| $r_{10} = -2.2485$ | | |
| $d_{10} = 0.0564$ | | |
| $r_{11} = 6.3079$ | | |
| $d_{11} = 0.5462$ | $n_6 = 1.51633$ | $\nu_6 = 64.15$ |
| $r_{12} = -6.2050$ (aspherical surface) | | |
| $d_{12} = 0.7803$ | | |
| $r_{13} = \infty$ | | |
| $d_{13} = 0.3901$ | $n_7 = 1.51633$ | $\nu_7 = 64.15$ |
| $r_{14} = \infty$ | | |

$|h_1/f_1| = 0.8950$, $1.15|h_4/f_4| = 0.1226$
$f_2 = 1.924$, $f_1 = -1.252$ $f_{23} = 1.435$
$f_a/f_b = 6.150/1.924 = 3.196$, $R_2 = 1.9116$
$R_2' = -3.8101$, $R_3 = 2.9288$
coefficients of aspherical surfaces
(1st lens surface)   P = 0, E = 0.12860 × 10⁻¹
(2nd lens surface)   P = 1
(12th lens surface)  P = 1, E = 0.29866 × 10⁻¹

$\left|\dfrac{A_F}{A_R}\right| = 1.50$

Embodiment 19

$f = 1$, $F_{No} = 2.996$, $2\omega = 110.0°$
IH = 1.2040

| | | |
|---|---|---|
| $r_1 = 3.9397$ (aspherical surface) | | |
| $d_1 = 0.3772$ | $n_1 = 1.88300$ | $\nu_1 = 40.78$ |
| $r_2 = 0.7949$ | | |

-continued

Embodiment 19

| | | |
|---|---|---|
| $d_2 = 0.6186$ | | |
| $r_3 = 6.9234$ | | |
| $d_3 = 0.2640$ | $n_2 = 1.77250$ | $\nu_2 = 49/66$ |
| $r_4 = 4.1093$ | | |
| $d_4 = 0.9559$ | | |
| $r_5 = 2.7606$ | | |
| $d_5 = 0.5281$ | $n_3 = 1.72825$ | $\nu_3 = 28.46$ |
| $r_6 = -2.2016$ | | |
| $d_6 = 0.0754$ | | |
| $r_7 =$ (aperture stop) | | |
| $d_7 = 0.3167$ | | |
| $r_8 = 17.2715$ | | |
| $d_8 = 0.8298$ | $n_4 = 1.58913$ | $\nu_4 = 60.97$ |
| $r_9 = -0.8495$ | | |
| $d_9 = 0.3018$ | $n_5 = 1.80518$ | $\nu_5 = 25.43$ |
| $r_{10} = -2.4692$ | | |
| $d_{10} = 0.0754$ | | |
| $r_{11} = \infty$ | | |
| $d_{11} = 0.3772$ | $n_6 = 1.53172$ | $\nu_6 = 48.90$ |
| $r_{12} = \infty$ | | |
| $d_{12} = 0.0754$ | | |
| $r_{13} = 2.1704$ | | |
| $d_{13} = 0.6312$ | $n_7 = 1.65160$ | $\nu_7 = 58.52$ |
| $r_{14} = -23.8501$ | | |
| $d_{14} = 0.3103$ | | |
| $r_{15} = -1.5651$ | | |
| $d_{15} = 0.2263$ | $n_8 = 1.84666$ | $\nu_8 = 23.78$ |
| $r_{16} = -5.0483$ (aspherical surface) | | |
| $d_{16} = 0.3163$ | | |
| $r_{17} = \infty$ | | |
| $d_{17} = 0.7544$ | $n_9 = 1.54869$ | $\nu_9 = 45.55$ |
| $r_{18} = \infty$ | | |

$|h_1/f_1| = 0.7355$, $1.15|h_4/f_4| = 0.3202$
$f_2 = 1.761$, $f_1 = -1.033$, $f_{23} = 1.642$
$f_a/f_b = 8.594/1.761 = 4.880$ $R_2 = 2.7606$
$R_2' = -2.2016$, $R_3 = 17.2715$
coefficients of aspherical surfaces
(1st lens surface)   $P = 1$, $E = 0.25038 \times 10^{-1}$
                     $F = 0.45776 \times 10^{-2}$
(16th lens surface)  $P = 1$, $E = 0.23705 \times 10^{-1}$ $$\left|\frac{A_F}{A_R}\right| = 2.9838$$

Embodiment 20

$f = 1$, $F_{No} = 3.035$, $2\omega = 140.02°$
IH = 1.6295

| | | |
|---|---|---|
| $r_1 = 5.8908$ | | |
| $d_1 = 0.5105$ | $n_1 = 1.88300$ | $\nu_1 = 40.78$ |
| $r_2 = 1.5830$ (aspherical surface) | | |
| $d_2 = 2.1049$ | | |
| $r_3 = 7.1003$ | | |
| $d_3 = 0.7497$ | $n_2 = 1.72342$ | $\nu_2 = 37.95$ |
| $r_4 = -6.1767$ | | |
| $d_4 = 0.0056$ | | |
| $r_5 = \infty$ (aperture spot) | | |
| $d_5 = 0.1188$ | | |
| $r_6 = 12.6805$ | | |
| $d_6 = 0.9930$ | $n_3 = 1.65830$ | $\nu_3 = 57.33$ |
| $r_7 = -1.2573$ | | |
| $d_7 = 0.4084$ | $n_4 = 1.80518$ | $\nu_4 = 25.43$ |
| $r_8 = -2.0394$ | | |
| $d_8 = 0.2964$ | | |
| $r_9 = -1.4831$ | | |
| $d_9 = 0.3063$ | $n_5 = 1.84666$ | $\nu_5 = 23.78$ |
| $r_{10} = -1.6611$ | | |
| $d_{10} = 0.1532$ | | |
| $r_{11} = 8.1827$ | | |
| $d_{11} = 0.7147$ | $n_6 = 1.51633$ | $\nu_6 = 64.15$ |
| $r_{12} = -1.8839$ (aspherical surface) | | |
| $d_{12} = 1.0291$ | | |
| $r_{13} = \infty$ | | |
| $d_{13} = 0.5105$ | $n_7 = 1.51633$ | $\nu_7 = 64.15$ |
| $r_{14} = \infty$ | | |

$|h_1/f_1| = 0.6747$, $1.15|h_4/f_4| = 0.3865$

-continued

Embodiment 20

$f_2 = 4.677$, $f_1 = -2.596$, $f_{23} = 2.168$
$f_a/f_b = 4.677/3.039 = 1.539$, $R_2 = 7.01003$
$R_2' = -6.1767$, $R_3 = 12.6805$
coefficients of aspherical surfaces
(2nd lens surface)   $P = 1$, $E = 0.59267 \times 10^{-1}$
                     $F = -0.29531 \times 10^{-1}$
(12th lens surface)  $P = 1$, $E = 0.10652$
$Q_h = 1.1459$

Embodiment 21

$f = 1$, $F_{No} = 3.032$, $2\omega = 140.0°$
IH = 1.4229

| | | |
|---|---|---|
| $r_1 = 5.6068$ | | |
| $d_1 = 0.4458$ | $n_1 = 1.88300$ | $\nu_1 = 40.78$ |
| $r_2 = 1.2801$ (aspherical surface) | | |
| $d_2 = 2.0273$ | | |
| $r_3 = 3.6331$ | | |
| $d_3 = 0.7592$ | $n_2 = 1.72342$ | $\nu_2 = 37.95$ |
| $r_4 = -5.0124$ | | |
| $d_4 = 0.0049$ | | |
| $r_5 = \infty$ (aperture stop) | | |
| $d_5 = 0.1026$ | | |
| $r_6 = 7.4259$ | | |
| $d_6 = 0.8539$ | $n_3 = 1.65830$ | $\nu_3 = 57.33$ |
| $r_7 = -1.1844$ | | |
| $d_7 = 0.3566$ | $n_4 = 1.80518$ | $\nu_4 = 25.43$ |
| $r_8 = -1.7581$ | | |
| $d_8 = 0.3181$ | | |
| $r_9 = -1.2303$ | | |
| $d_9 = 0.2675$ | $n_5 = 1.84666$ | $\nu_5 = 23.78$ |
| $r_{10} = -1.6302$ | | |
| $d_{10} = 0.1337$ | | |
| $r_{11} = 50.6667$ | | |
| $d_{11} = 0.6241$ | $n_6 = 1.51633$ | $\nu_6 = 64.15$ |
| $r_{12} = -2.1201$ (aspherical surface) | | |
| $d_{12} = 0.8985$ | | |
| $r_{13} = \infty$ | | |
| $d_{13} = 0.4458$ | $n_7 = 1.51633$ | $\nu_7 = 64.15$ |
| $r_{14} = \infty$ | | |

$|h_1/f_1| = 0.7323$, $1.15|h_4/f_4| = 0.1542$
$f_2 = 3.023$, $f_1 = -1.974$, $f_{23} = 1.662$
$f_a/f_b = 3.957/2.439 = 1.622$, $R_2 = 3.6331$
$R_2' = -5.0124$, $R_3 = 7.4259$
Coefficients of aspherical surfaces
(2nd surface)   $P = 1$, $E = 0.61335 \times 10^{-1}$
                $F = -0.39851 \times 10^{-1}$
(12th surface)  $P = 1$, $E = 0.10463$
$Q_h = 1.3035$

Embodiments 22

$f = 1$, $F_{No} = 3.033$, $2\omega = 140.01°$
IH = 1.4387

| | | |
|---|---|---|
| $r_1 = 4.1525$ | | |
| $d_1 = 0.4507$ | $n_1 = 1.88300$ | $\nu_1 = 40.78$ |
| $r_2 = 1.2907$ (aspherical surface) | | |
| $d_2 = 1.9824$ | | |
| $r_3 = 6.0185$ | | |
| $d_3 = 0.6489$ | $n_2 = 1.72342$ | $\nu_2 = 37.95$ |
| $r_4 = -5.3701$ | | |
| $d_4 = 0.0050$ | | |
| $r_5 = \infty$ (aperture stop) | | |
| $d_5 = 0.0988$ | | |
| $r_6 = 9.8733$ | | |
| $d_6 = 0.7706$ | $n_3 = 1.65830$ | $\nu_3 = 57.33$ |
| $r_7 = -2.1176$ | | |
| $d_7 = 0.3606$ | $n_4 = 1.80518$ | $\nu_4 = 25.43$ |
| $r_8 = -1.7128$ | | |
| $d_8 = 0.3216$ | | |
| $r_9 = -1.6356$ | | |
| $d_9 = 0.2704$ | $n_5 = 1.84666$ | $\nu_5 = 23.78$ |
| $r_{10} = -1.6634$ (aspherical surface) | | |
| $d_{10} = 0.1352$ | | |

-continued

Embodiments 22

$r_{11} = -3.0982$
$d_{11} = 0.6310$ $\quad n_6 = 1.51633 \quad \nu_6 = 64.15$
$r_{12} = -1.5977$ (aspherical surface)
$d_{12} = 0.9086$
$r_{13} = \infty$
$d_{13} = 0.4507$ $\quad n_7 = 1.51633 \quad \nu_7 = 64.15$
$r_{14} = \infty$ $|h_1/f_1| = 0.6803, \quad 1.15|h_4/f_4| = 0.1969$
$f_2 = 4.019, \quad f_1 = -2.290, \quad f_{23} = 1.664$
$f_a/f_b = 33.391/2.198 = 15.192, \quad R_2 = 6.0185$
$R_2' = -5.3701, \quad R_3 = 9.8733$
coefficients of aspherical surfaces
(2nd lens surface) $P = 1, E = 0.64518 \times 10^{-1}$
$\quad F = -0.38100 \times 10^{-1}$
(10th lens surface) $P = 1, E = 0.10921$
(12th lens surface) $P = 1, E = 0.82721 \times 10^{-2}$
$Q_h = 1.3030$ In respective embodiments shown in the above, reference symbols r1, r2, . . . respectively represent radii of curvature of respective lens surfaces, reference symbols d1, d2, . . . respectively represent thicknesses of respective lenses and airspaces between respective lenses, reference symbols n1, n2, . . . respectively represent refractive indices of respective lenses, and reference symbols ν1, ν2, . . . respectively represent Abbe's numbers of respective lenses. Out of coefficients of aspherical surface, those which are not shown in the numerical data are zero.

Embodiments 1 through 22 shown in the above respectively have lens configurations as shown in FIGS. 10 through 31. Out of them, each of Embodiments 14 through 22 is arranged as a lens system comprising aspherical lens components, and the coefficients of aspherical surface etc. are shown in the numerical data thereof. Embodiments 16 through 19 respectively fulfill the condition (17), and Embodiments 20 through 22 respectively fulfill the condition (22).

Besides, Embodiments 16 through 19 are respectively arranged to further fulfill the condition (15), and the lens systems illustrated by Embodiments 16 through 19 are respectively arranged that both of distortion and curvature of field are corrected favourably.

Embodiments 14 through 22 are respectively arranged that the lens system is provided with aspherical surfaces therein in the state that either the surface on the object side of at least one of lens components constituting the front subsystem located in front of the aperture stop S has such portions whose curvature becomes gradually stronger as they are farther from the optical axis or the surface on the image side of at least one lens components constituting the front subsystem located in front of the aperture stop S has such portions whose curvature becomes gradually weaker as they are farther from the optical axis, or in the state that either the surface on the object side of at least one of lens components constituting the rear subsystem located in rear of the aperture stop S has such portions whose curvature becomes gradually weaker as they are farther from the optical axis or the surface on the image side of at least one of lens components constituting the rear subsystem located in rear of the aperture stop S has such portions whose curvature becomes gradually stronger as they are farther from the optical axis, Embodiments 14 through 22 being thereby arranged that it is possible to correct distortion and curvature of field favourably.

Figure 26:
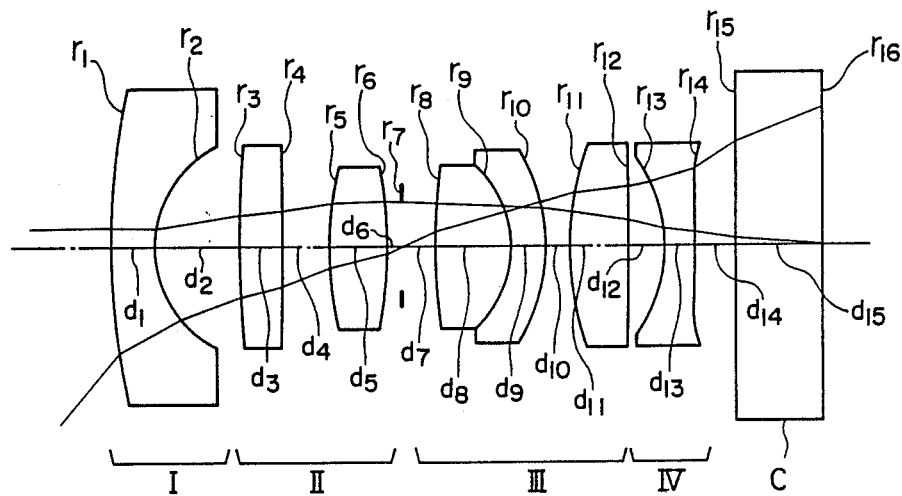
Figure 27:
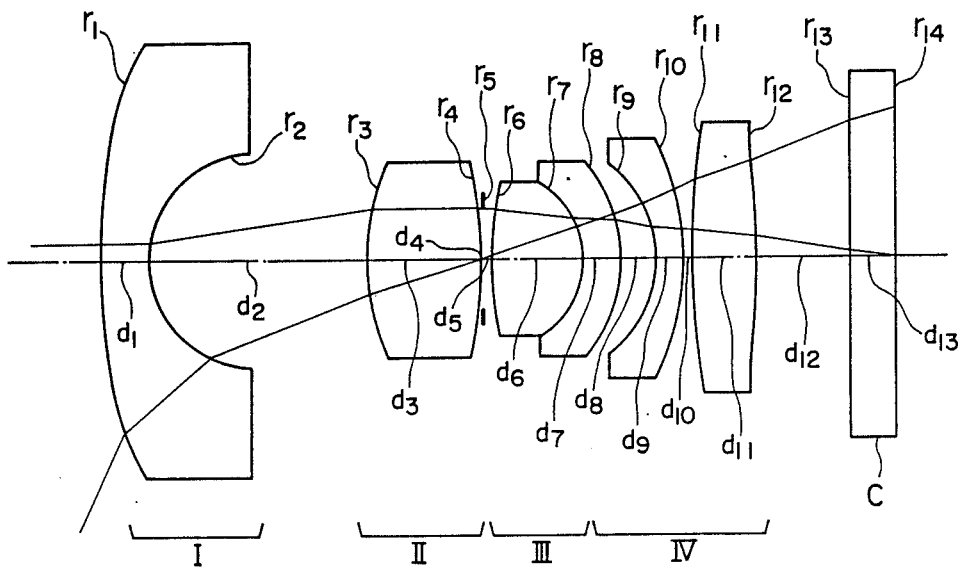
Figure 28:
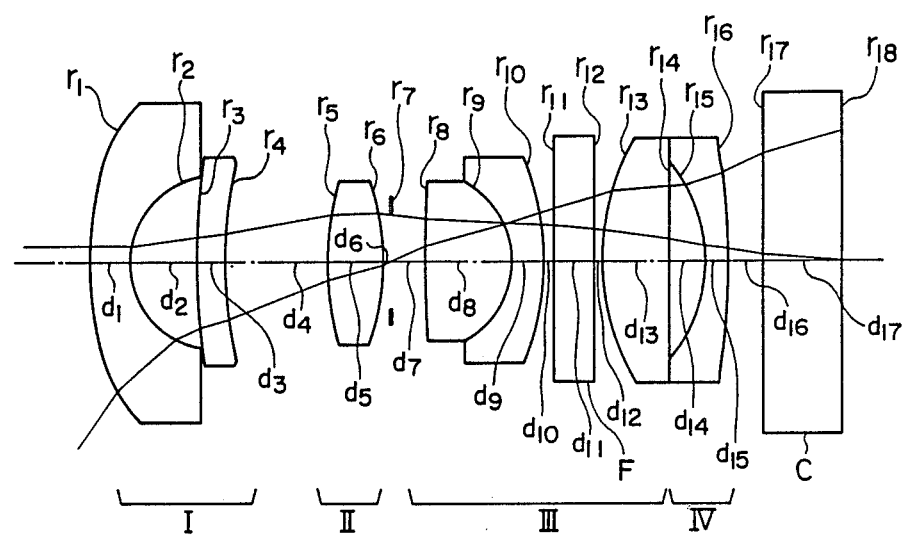
Figure 29:
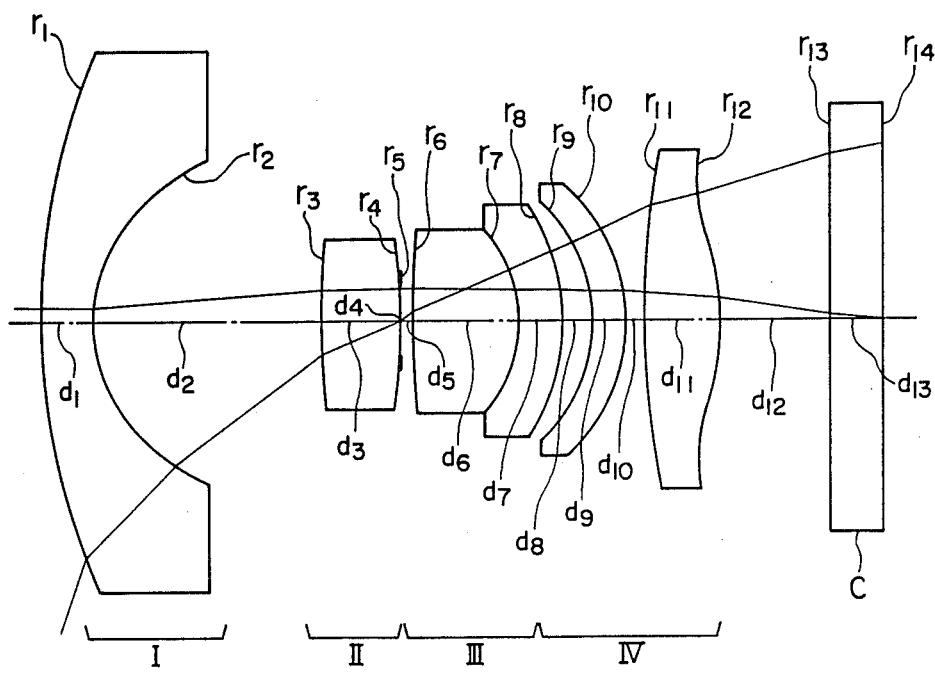
Figure 30:
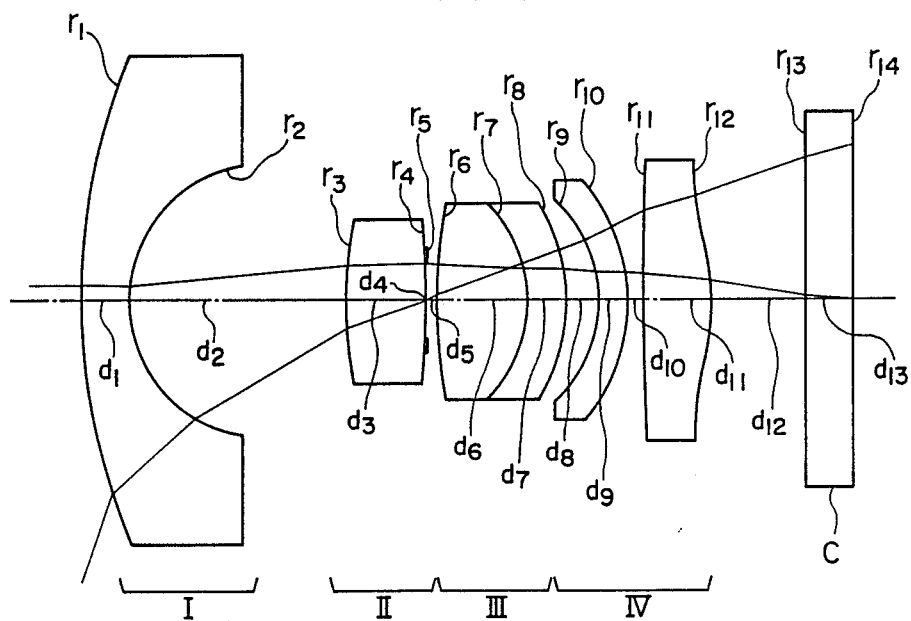
Figure 31:
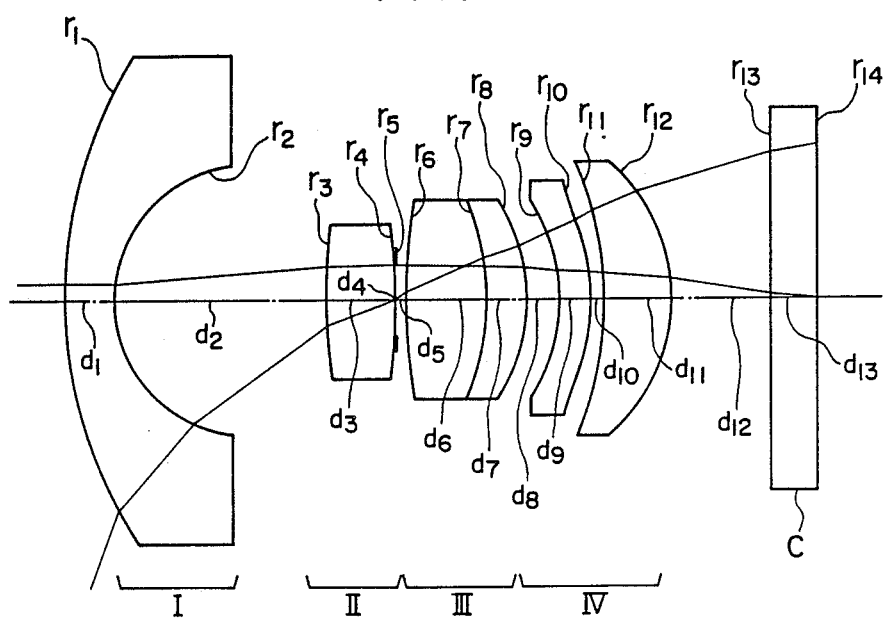
Figure 32:
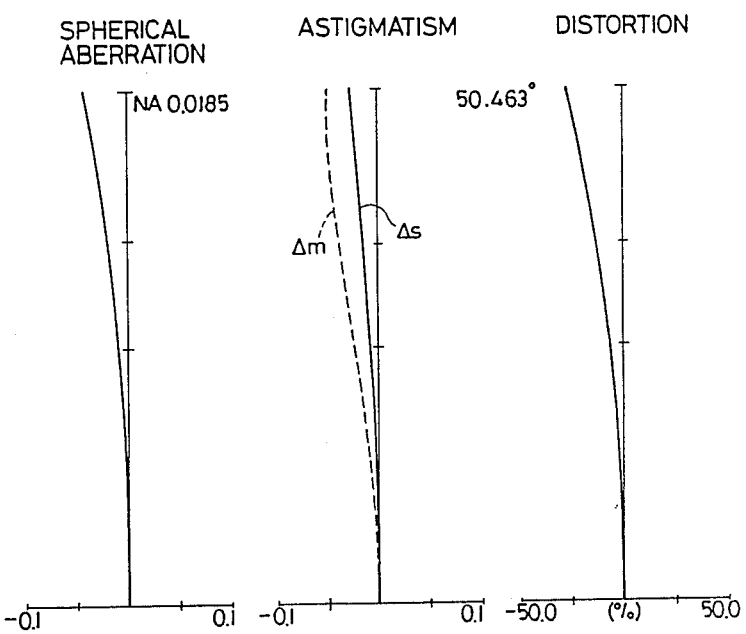
FIGS. 32 through 53 respectively show graphs illustrating aberration curves of Embodiments 1 through 22 of the present invention.
Figure 33:
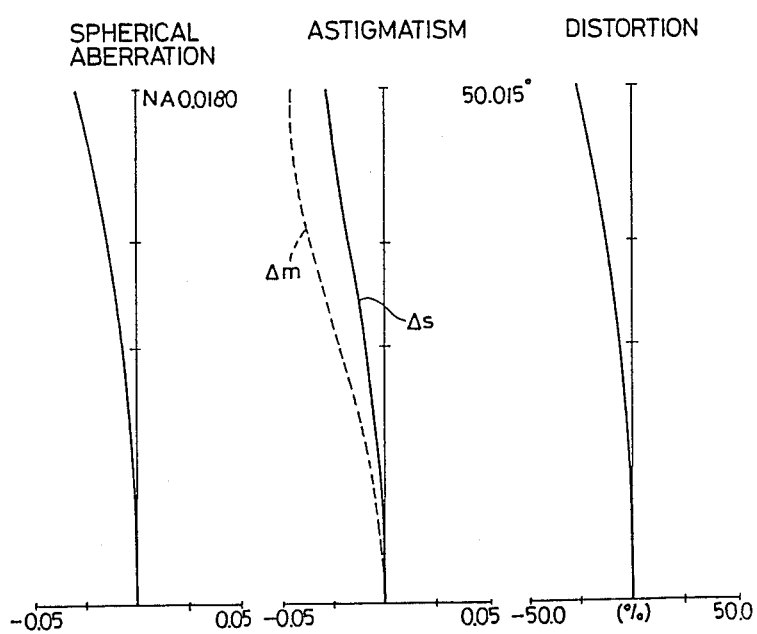
Figure 34:
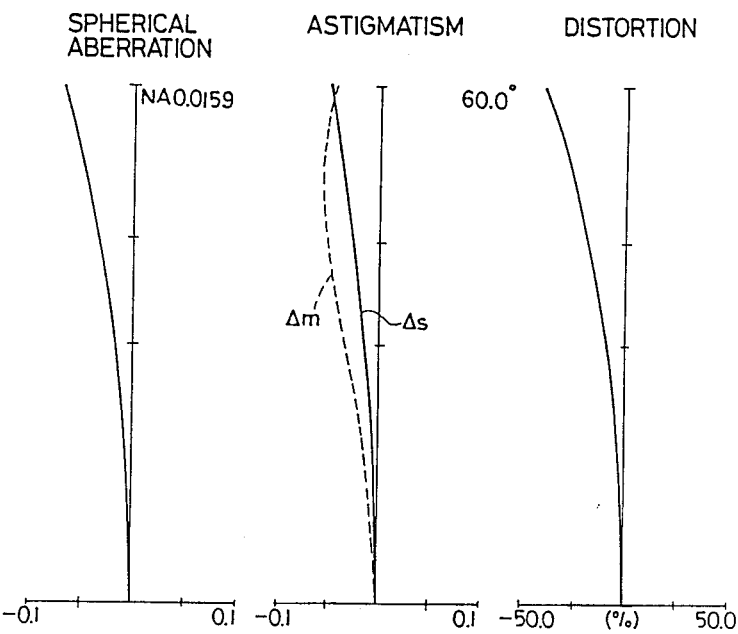
Figure 35:
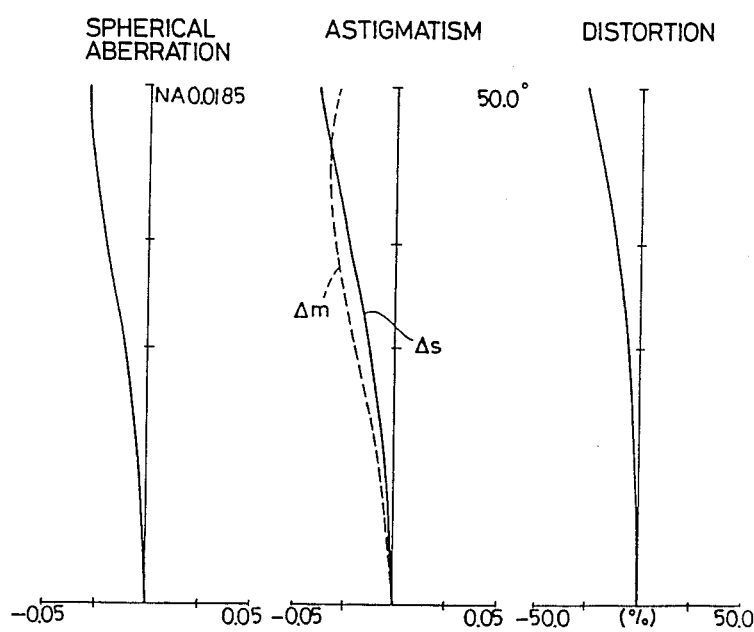
Figure 36:
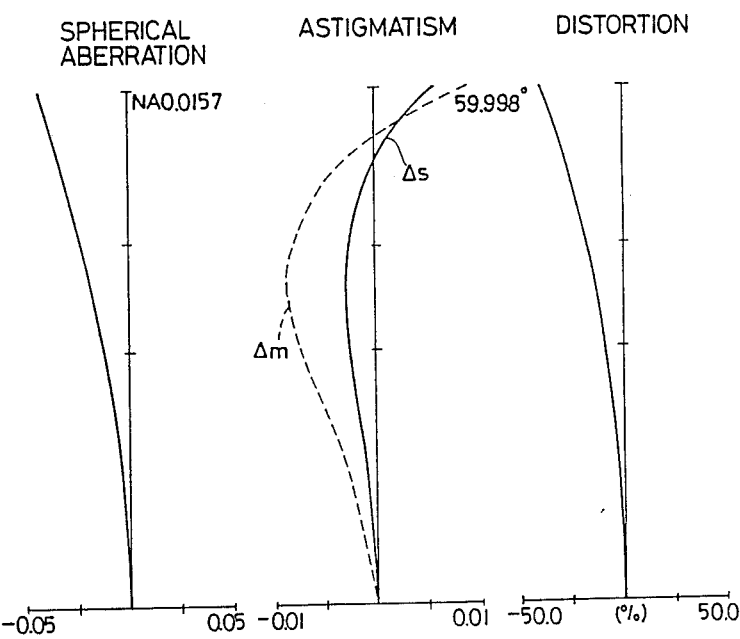
Figure 37:
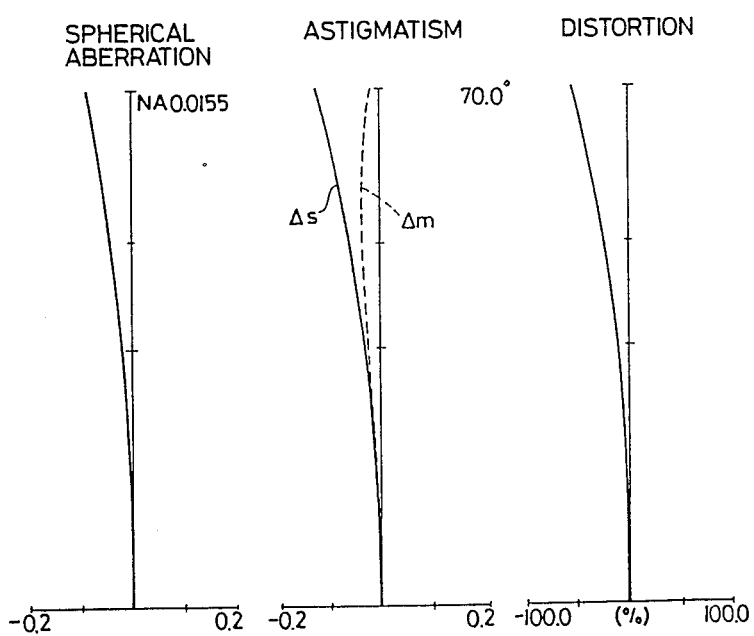
Figure 38:
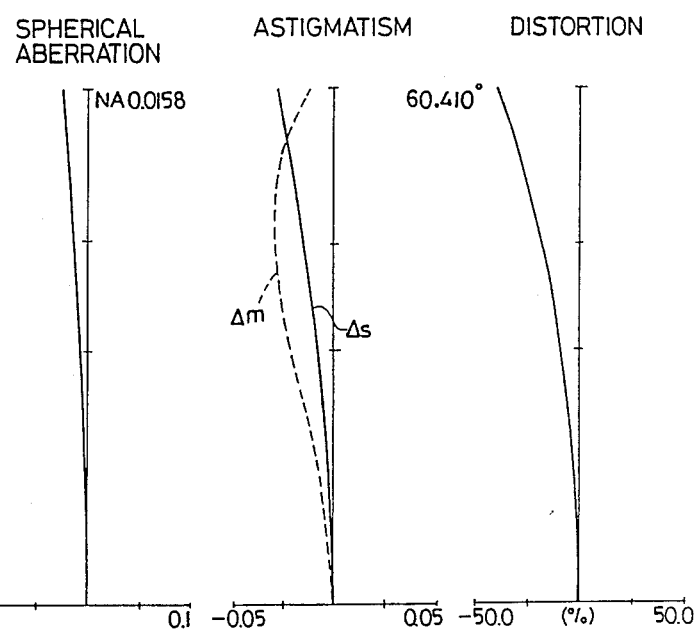
Figure 39:
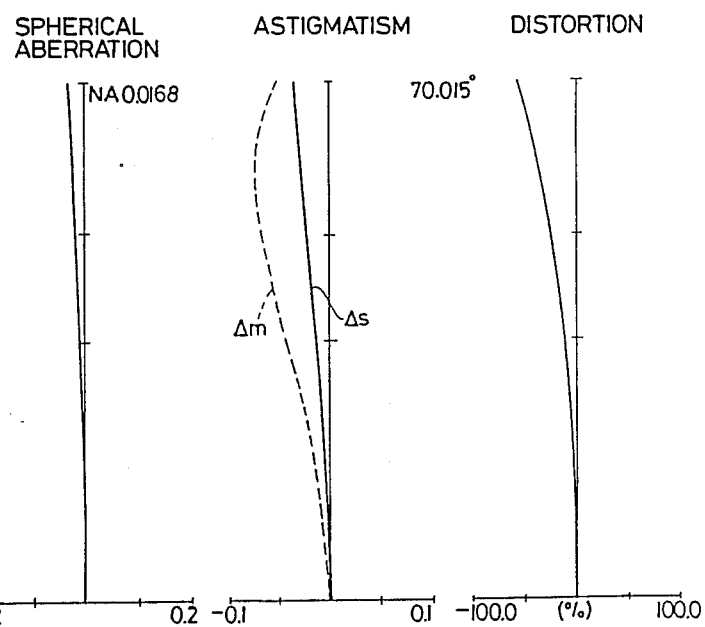
Figure 40:
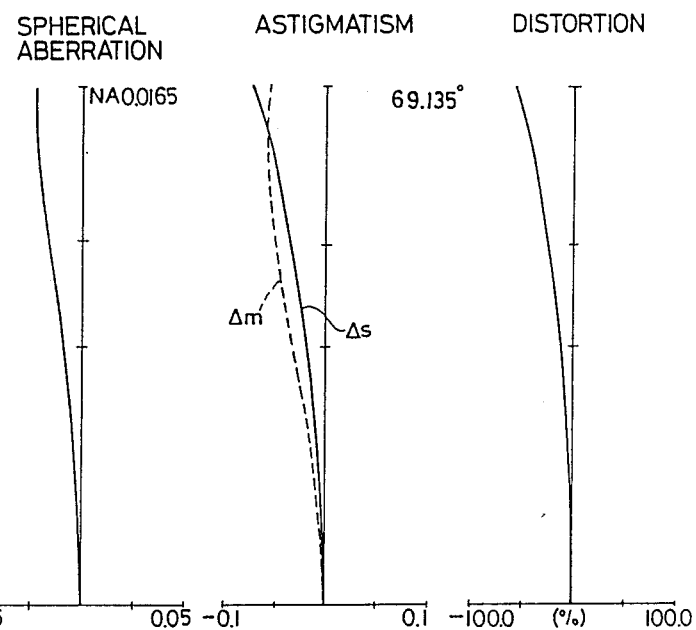
Figure 41:
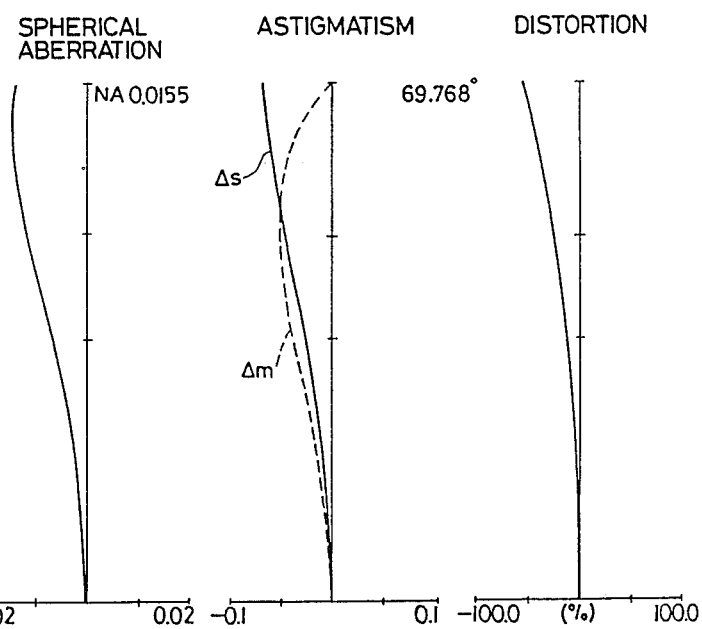
Figure 42:
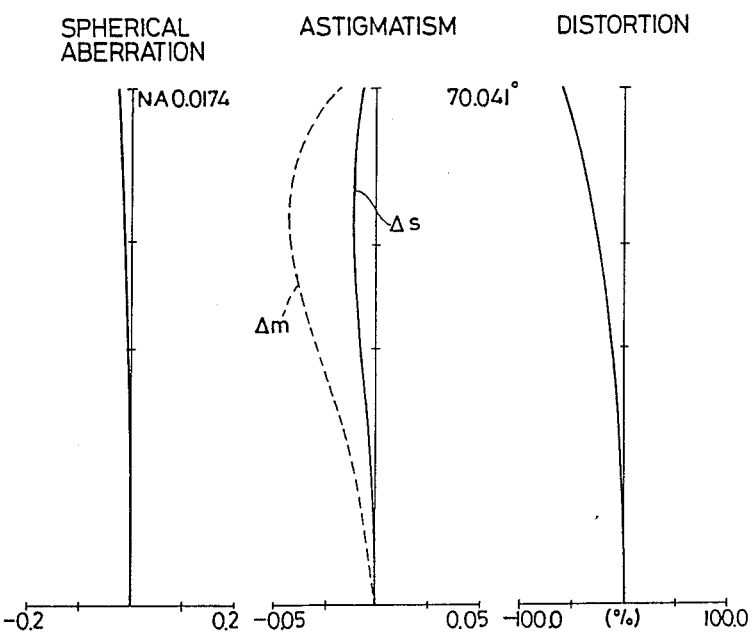
Figure 43:
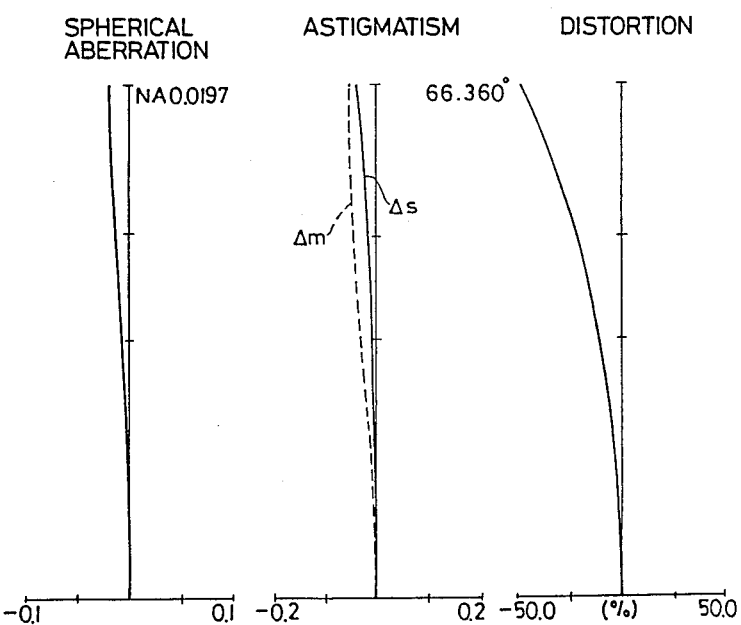
Figure 44:
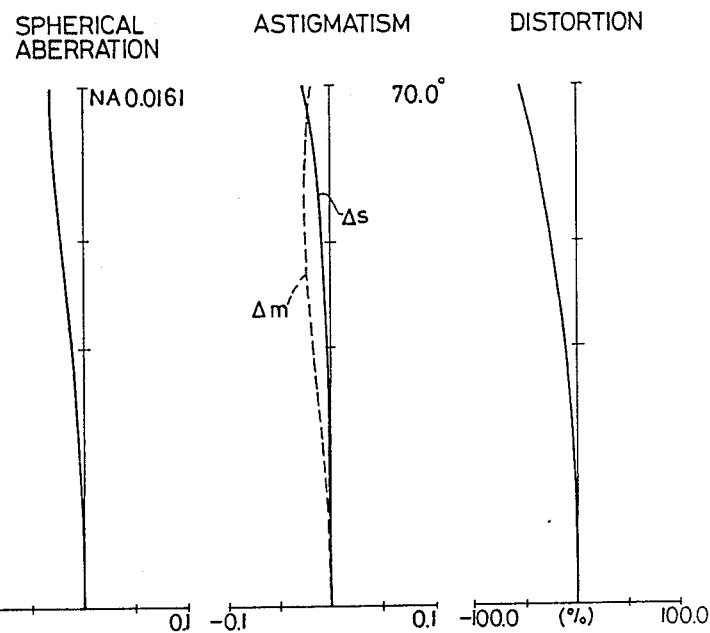
Figure 45:
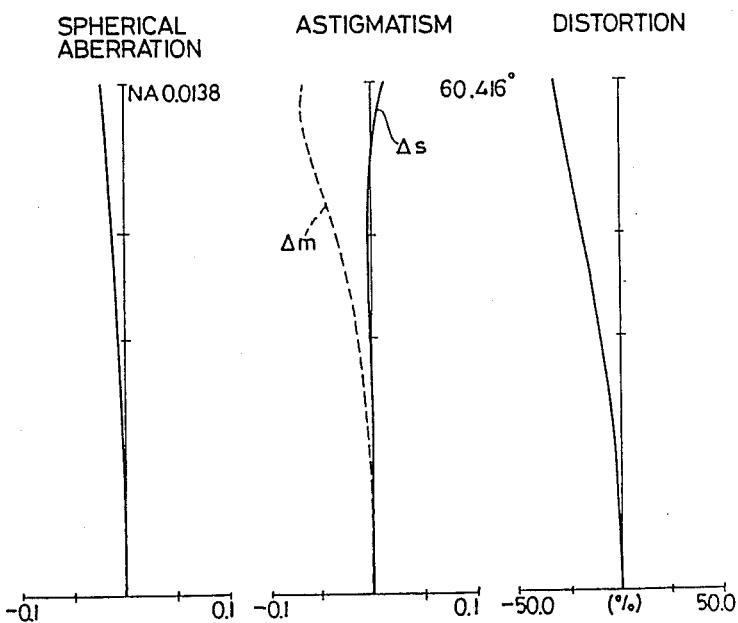
Figure 46:
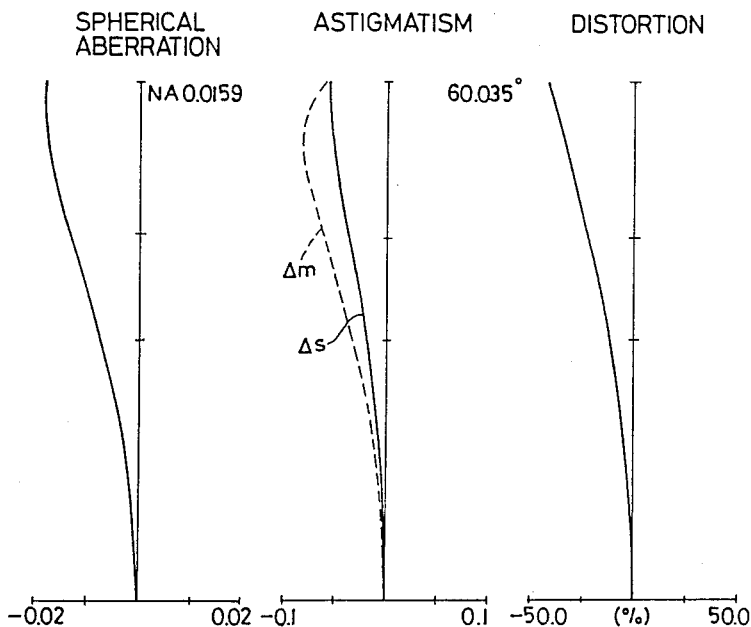
Figure 47:
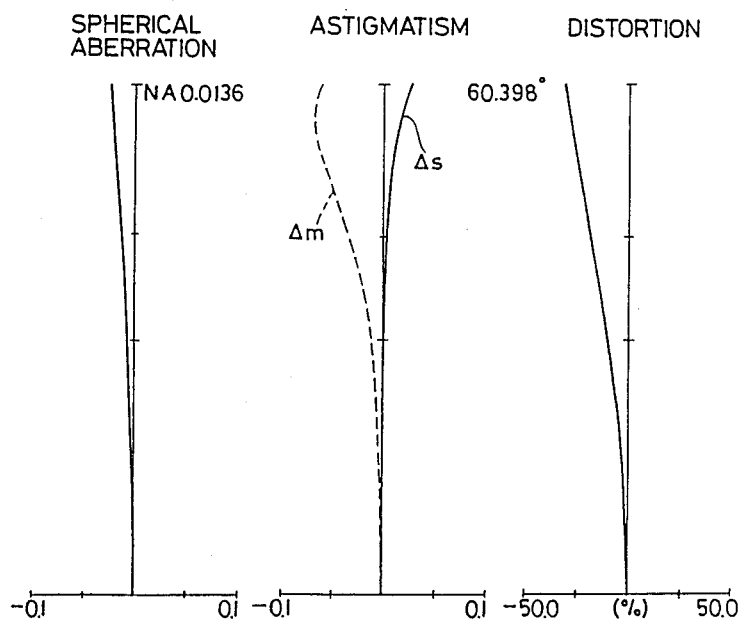
Figure 48:
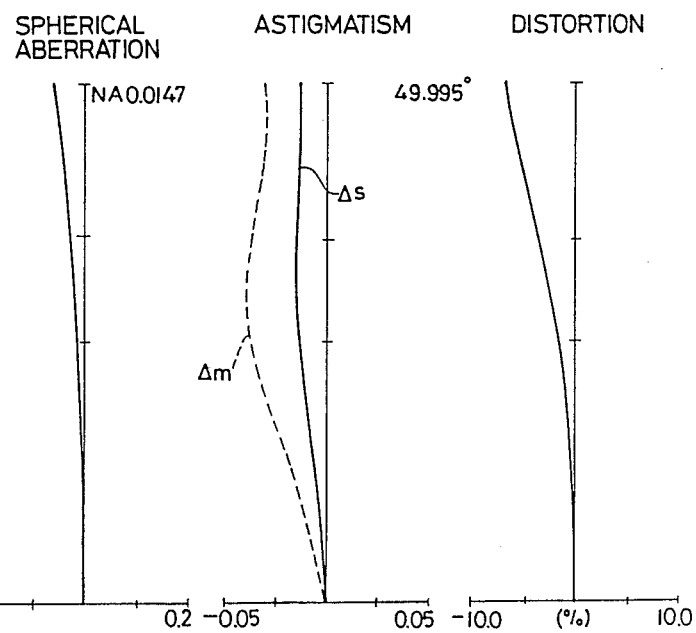
Figure 49:
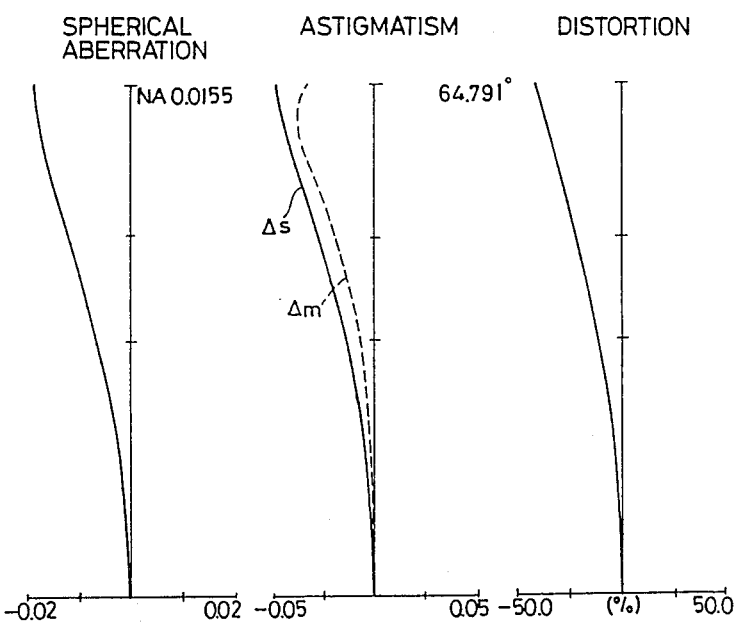
Figure 50:
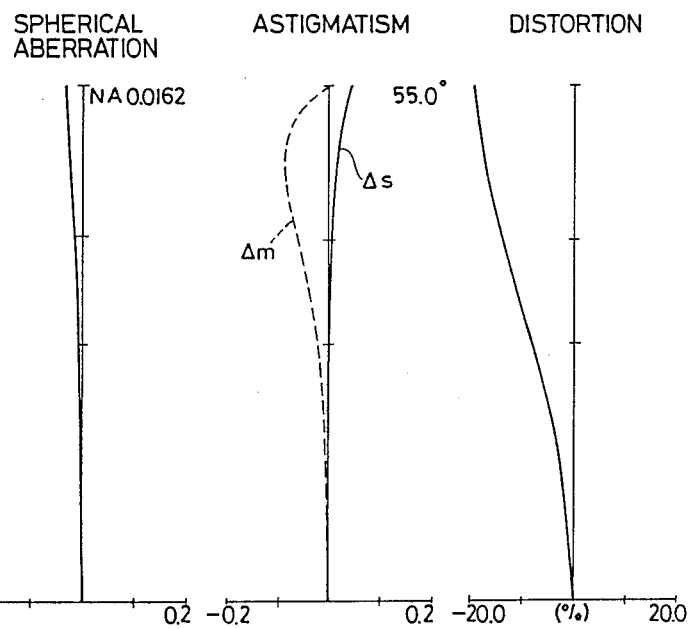
Figure 51:
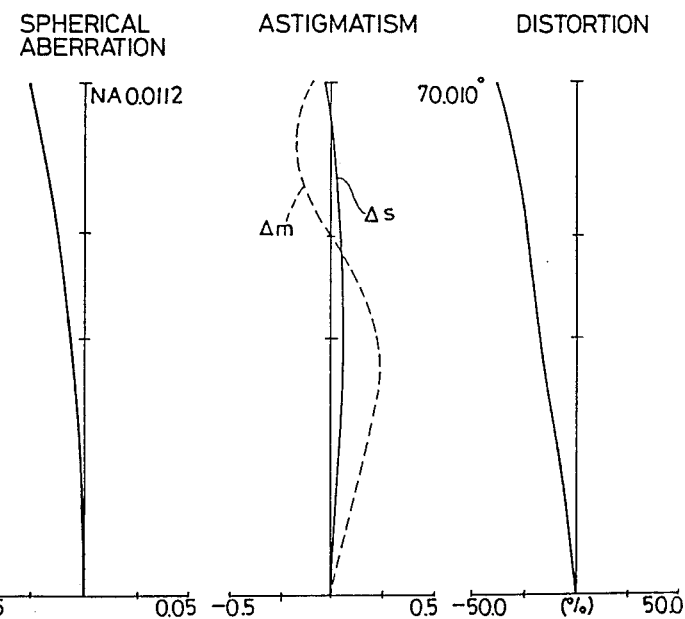
Figure 52:
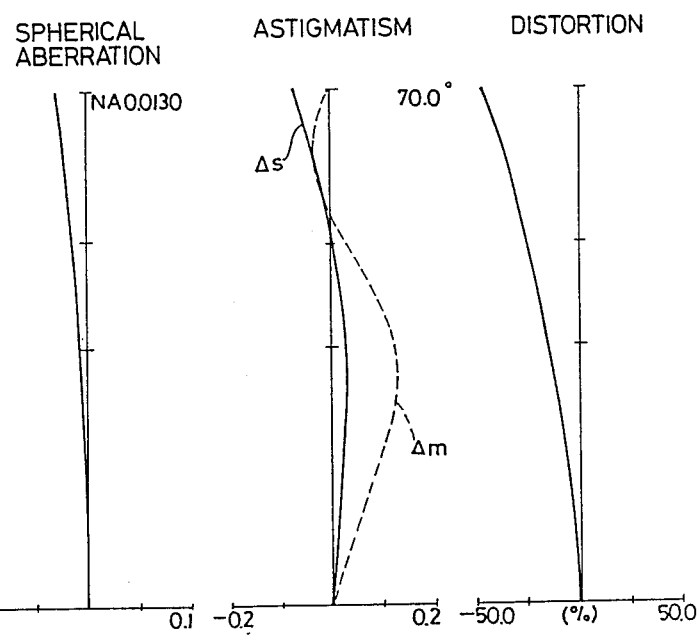
Figure 53:
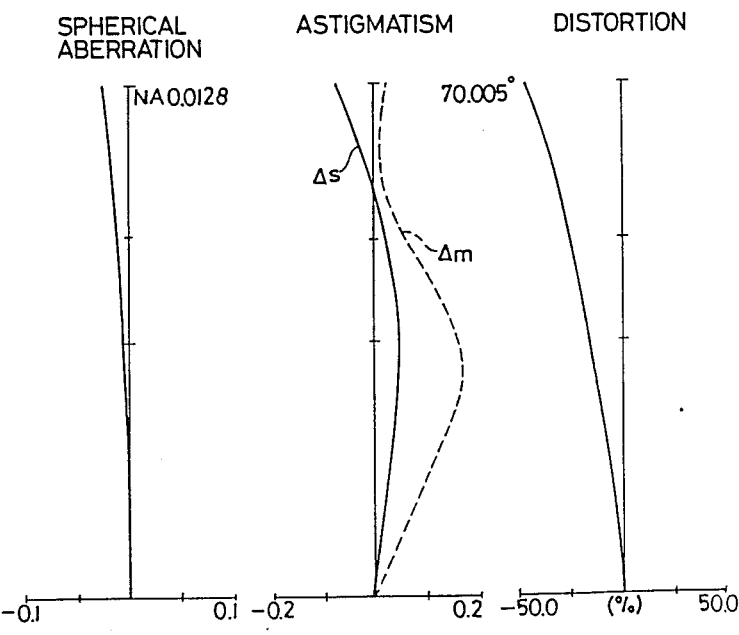

For example, in case of the objective for an endoscope illustrated by Embodiment 17 shown in FIG. 26, the second surface thereof is formed that its curvature becomes gradually weaker toward its portion farther from the optical axis, and the thirteenth surface thereof is formed that its curvature becomes gradually stronger toward its position farther from the optical axis.

Figure 23:
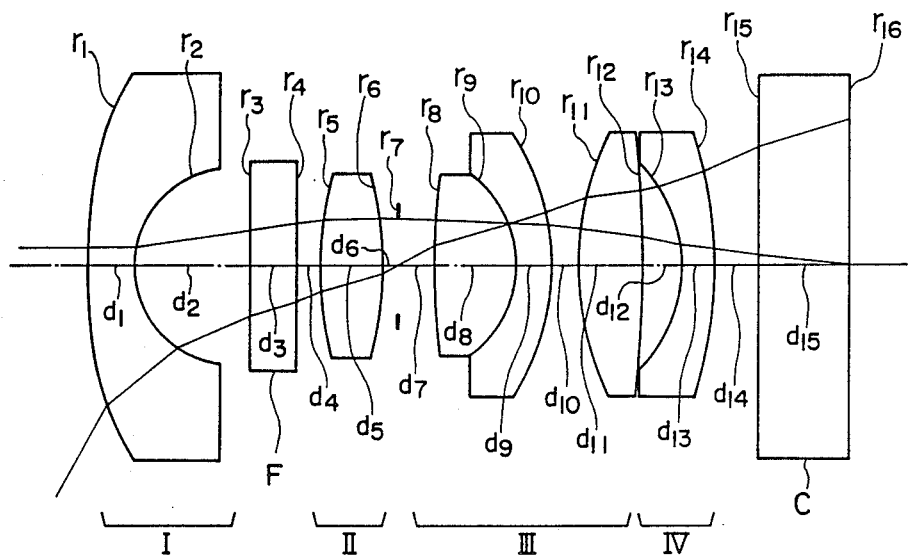
Figure 24:
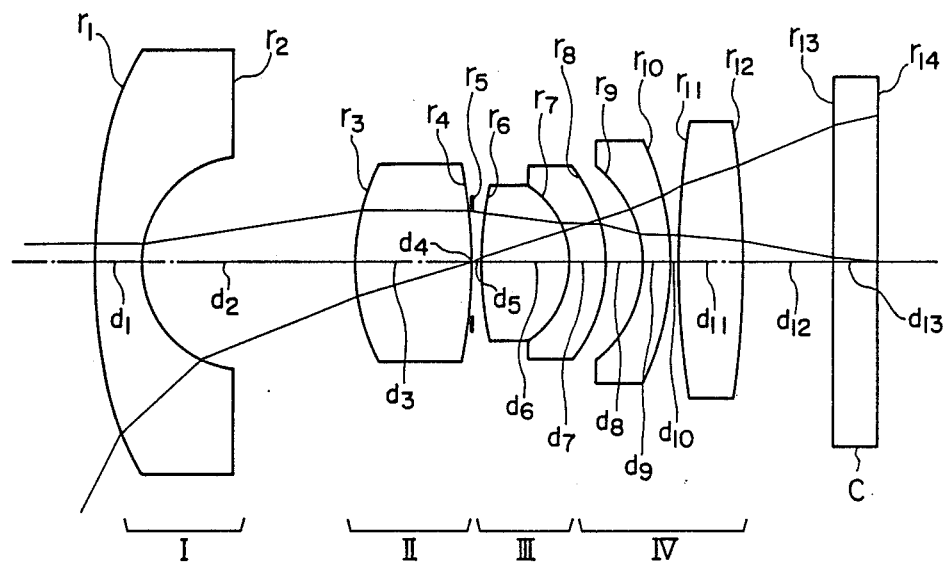
Figure 25:
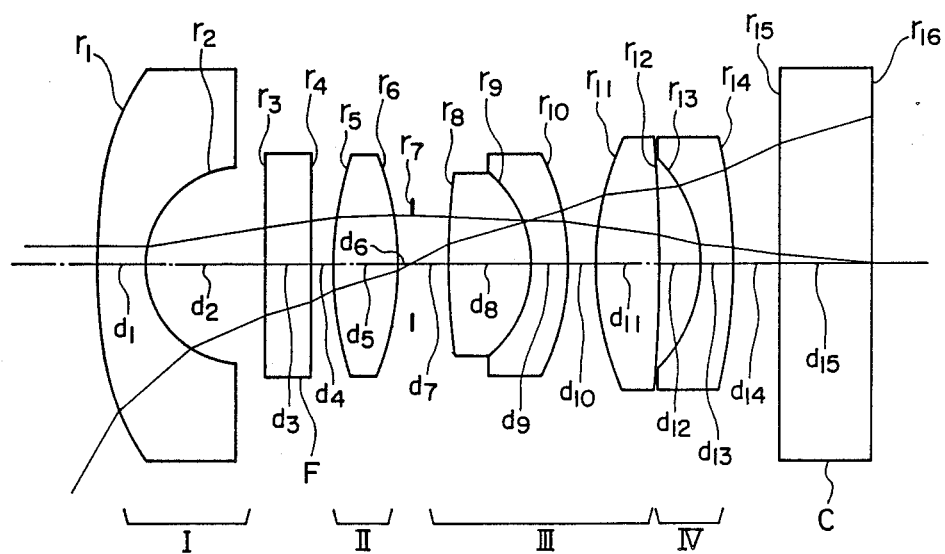

In case of the objective for an endoscope illustrated by Embodiment 14 shown in FIG. 23, the aspherical surface provided in the front subsystem is adopted for the surface on the object side of a lens component therein, and said aspherical surface is formed so as to at least have such portions whose curvature becomes gradually stronger as they are farther from the optical axis. Besides, in case of the objective for an endoscope illustrated by Embodiment 15 shown in FIG. 24, another aspherical surface is adopted also for the surface on the image side of a lens component in the front subsystem, and said aspherical surface is formed so as to at least have such portions whose curvature becomes gradually weaker as they are farther from the optical axis.

In preferred embodiments described so far, the plane-parallel plate F which is located at a position between the front end of the first lens unit I and rear end of the fourth lens unit IV is a filter for eliminating the rays of such wavelengths, i.e., infrared rays, that are not used for observation by a solid-state image pick-up device. Said filter may be arranged as any of an interference filter, absorption filter, and absorption filter provided with a coating. Said filter may be arranged also as a member which attenuates the rays of such wavelengths that are not used for observation, for example, a filter which attenuates the beam of helium-neon laser, which is used as the guide beam of YAG laser. Furthermore, the plane-parallel palte C which is located in rear of the fourth lens unit IV is a dust-preventing glass for the solid-state image pick-up device.

Aberration curves of preferred embodiments described so far as shown in FIGS. 32 through 53.

We claim:

1. An objective for an endoscope comprising, in the order from the object side, a first lens having a negative refractive power, a second lens unit having positive refractive power, a third lens unit having positive refractive power, an aperture stop arranged between the front end of said second lens unit and rear end of said third lens unit, and a fourth lens unit comprising a lens component having a concave surface on the object side, said objective for an endoscope being arranged to comprise at least three positive lens components including a cemented doublet and respectively located at positions between the front end of said second lens unit and rear end of said fourth lens unit.

2. An objective for an endoscope according to claim 1 fulfilling the condition (1) shown below:

$$|h_1/f_1| > 1.15|h_4/f_4| \qquad (1)$$

where, reference symbol $h_1$ represents the mean value of heights of principal rays on respective surfaces of said first lens unit, reference symbol $h_4$ represents the mean value of heights of principal rays on respective surfaces of said fourth lens unit, reference symbol $f_1$ represents the focal length of said first lens unit, and reference symbol $f_4$ represents the focal length of said fourth lens unit.

3. An objective for an endoscope according to claim 2 further fulfilling the condition (2) shown below:

$$f_2 < 9f \quad (2)$$

where, reference symbol $f_2$ represents the focal length of said second lens unit, and reference symbol $f$ represents the focal length of the lens system as a whole.

4. An objective for an endoscope according to claim 3 further fulfilling the conditions (3), (4), (5) and (6) shown below:

$$|f_1| < 5f \quad (3)$$

$$|f_{23}| < 4.5f \quad (4)$$

$$|f_a/f_b| < 30 \quad (5)$$

$$R_2 > 0 \quad (6)$$

where, reference symbol $f_{23}$ represents the total focal length of said second and third lens units, reference symbols $f_a$ and $f_b$ respectively represent the largest value and smallest value out of the focal lengths of said at least three positive lens components including a cemented doublet which are respectively arranged at positions between the front end of said second lens unit and rear end of said fourth lens unit, and reference symbol $R_2$ represents the radius of curvature of the foremost surface of said second lens unit.

5. An objective for an endoscope according to claim 4 further fulfilling the conditions (7) and (8) shown below:

$$-R_2' \leq 15f \quad (7)$$

$$R_3 \leq 30f \quad (8)$$

where, reference symbol $R_2'$ represents the radius of curvature of the rearmost surface of said second lens unit, and reference symbol $R_3$ represents the radius of curvature of the foremost surface o said third lens unit.

6. An objective for an endoscope according to claim 5 having the following numerical data:

| $f = 1$, $F_{No} = 3.018$, $2\omega = 100.926°$ $IH = 0.9184$ | | | |
|---|---|---|---|
| $r_1 = 4.4097$ | | | |
| $d_1 = 0.2877$ | $n_1 = 1.88300$ | $\nu_1 = 40.78$ | |
| $r_2 = 0.7457$ | | | |
| $d_2 = 1.0472$ | | | |
| $r_3 = 2.0242$ | | | |
| $d_3 = 0.3049$ | $n_2 = 1.74100$ | $\nu_2 = 52.68$ | |
| $r_4 = \infty$ | | | |
| $d_4 = 0.3510$ | | | |
| $r_5 = \infty$ | | | |
| $d_5 = 0.3049$ | $n_3 = 1.74100$ | $\nu_3 = 52.68$ | |
| $r_6 = -2.0242$ | | | |
| $d_6 = 0.0575$ | | | |
| $r_7 = \infty$ (aperture stop) | | | |
| $d_7 = 0.0575$ | | | |
| $r_8 = 1.6116$ | | | |
| $d_8 = 0.5696$ | $n_4 = 1.51633$ | $\nu_4 = 64.15$ | |
| $r_9 = -1.0213$ | | | |
| $d_9 = 0.2301$ | $n_5 = 1.80518$ | $\nu_5 = 25.43$ | |
| $r_{10} = -2.1617$ | | | |
| $d_{10} = 0.0575$ | | | |
| $r_{11} = \infty$ | | | |
| $d_{11} = 0.2877$ | $n_6 = 1.53172$ | $\nu_6 = 48.90$ | |
| $r_{12} = \infty$ | | | |
| $d_{12} = 0.3625$ | | | |
| $r_{13} = -0.8009$ | | | |
| $d_{13} = 0.2301$ | $n_7 = 1.72825$ | $\nu_7 = 28.46$ | |
| $r_{14} = -1.3705$ | | | |
| $d_{14} = 0.3855$ | | | |
| $r_{15} = \infty$ | | | |
| $d_{15} = 0.5754$ | $n_8 = 1.51633$ | $\nu_8 = 64.15$ | |
| $r_{16} = \infty$ | | | |
| $|h_1/f_1| = 0.6308$, $1.15|h_4/f_4| = 0.1670$ $f_2 = 1.567$, $f_1 = -1.055$, $f_{23} = 1.179$ $f_a/f_b = 2.732/2.526 = 1.082$, $R_2 = 2.024$ $R_2' = -2.024$, $R_3 = 1.612$ | | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

7. An objective for an endoscope according to claim 5 having the following numerical data:

| $f = 1$, $F_{No} = 3.102$, $2\omega = 100.03°$ $IH = 0.9142$ | | | |
|---|---|---|---|
| $r_1 = 3.6033$ | | | |
| $d_1 = 0.2864$ | $n_1 = 1.88300$ | $\nu_1 = 40.78$ | |
| $r_2 = 0.7446$ | | | |
| $d_2 = 1.0439$ | | | |
| $r_3 = 1.9155$ | | | |
| $d_3 = 0.3136$ | $n_2 = 1.74100$ | $\nu_2 = 52.68$ | |
| $r_4 = 13.9967$ | | | |
| $d_4 = 0.3855$ | | | |
| $r_5 = -13.9967$ | | | |
| $d_5 = 0.3136$ | $n_3 = 1.74100$ | $\nu_3 = 52.68$ | |
| $r_6 = -1.9155$ | | | |
| $d_6 = 0.0573$ | | | |
| $r_7 = \infty$ (aperture stop) | | | |
| $d_7 = 0.0573$ | | | |
| $r_8 = 1.3927$ | | | |
| $d_8 = 0.6192$ | $n_4 = 1.51633$ | $\nu_4 = 64.15$ | |
| $r_9 = -0.9683$ | | | |
| $d_9 = 0.2291$ | $n_5 = 1.80518$ | $\nu_5 = 25.43$ | |
| $r_{10} = -1.9872$ | | | |
| $d_{10} = 0.0573$ | | | |
| $r_{11} = \infty$ | | | |
| $d_{11} = 0.2864$ | $n_6 = 1.53172$ | $\nu_6 = 48.90$ | |
| $r_{12} = \infty$ | | | |
| $d_{12} = 0.3023$ | | | |
| $r_{13} = -0.8271$ | | | |
| $d_{13} = 0.2291$ | $n_7 = 1.72825$ | $\nu_7 = 28.46$ | |
| $r_{14} = -1.4614$ | | | |
| $d_{14} = 0.5727$ | | | |
| $r_{15} = \infty$ | | | |
| $d_{15} = 0.2864$ | $n_8 = 1.51633$ | $\nu_8 = 64.15$ | |
| $r_{16} = \infty$ | | | |
| $|h_1/f_1| = 0.6215$, $1.15|h_4/f_4| = 0.1684$ $f_2 = 1.712$, $f_1 = -1.115$, $f_{23} = 1.198$ $f_a/f_b = 2.962/2.196 = 1.349$, $R_2 = 1.9155$ $R_2' = -1.9155$, $R_3 = 1.3927$ | | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

8. An objective for an endoscope according to claim 5 having the following numerical data:

| $f = 1$, $F_{No} = 3.016$, $2\omega = 120.0°$ $IH = 1.0599$ |
|---|

-continued

| | | |
|---|---|---|
| $r_1 = 5.3227$ | | |
| $d_1 = 0.3327$ | $n_1 = 1.88300$ | $\nu_1 = 40.78$ |
| $r_2 = 0.7651$ | | |
| $d_2 = 0.4657$ | | |
| $r_3 = \infty$ | | |
| $d_3 = 0.3327$ | $n_2 = 1.53172$ | $\nu_2 = 48.90$ |
| $r_4 = \infty$ | | |
| $d_4 = 0.5089$ | | |
| $r_5 = 2.3472$ | | |
| $d_5 = 0.3279$ | $n_3 = 1.74100$ | $\nu_3 = 52.68$ |
| $r_6 = -8.0069$ | | |
| $d_6 = 0.2324$ | | |
| $r_7 = 8.0069$ | | |
| $d_7 = 0.3279$ | $n_4 = 1.74100$ | $\nu_4 = 52.68$ |
| $r_8 = -2.3472$ | | |
| $d_8 = 0.0665$ | | |
| $r_9 = \infty$ (aperture stop) | | |
| $d_9 = 0.0665$ | | |
| $r_{10} = 4.0786$ | | |
| $d_{10} = 0.5611$ | $n_5 = 1.51633$ | $\nu_5 = 64.15$ |
| $r_{11} = -0.7418$ | | |
| $d_{11} = 0.3327$ | $n_6 = 1.80518$ | $\nu_6 = 25.43$ |
| $r_{12} = -1.2948$ | | |
| $d_{12} = 0.4657$ | | |
| $r_{13} = -0.9542$ | | |
| $d_{13} = 0.3327$ | $n_7 = 1.72825$ | $\nu_7 = 28.46$ |
| $r_{14} = -1.8356$ | | |
| $d_{14} = 0.6653$ | | |
| $r_{15} = \infty$ | | |
| $d_{15} = 0.3327$ | $n_8 = 1.51633$ | $\nu_8 = 64.15$ |
| $r_{16} = \infty$ | | |

$|h_1/f_1| = 0.7424$, $1.15|h_4/f_4| = 0.1797$
$f_2 = 1.389$, $f_1 = -1.048$, $f_{23} = 1.231$
$f_a/f_b = 2.658/2.483 = 1.070$, $R_2 = 2.3472$
$R_2' = -2.3472$, $R_3 = 4.0786$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

9. An objective for an endoscope according to claim 5 having the following numerical data:

| $f = 1$, $F_{No} = 3.045$, $2\omega = 100.0°$ | | |
|---|---|---|
| IH = 0.9126 | | |
| $r_1 = 3.3197$ | | |
| $d_1 = 0.2583$ | $n_1 = 1.88300$ | $\nu_1 = 40.78$ |
| $r_2 = 0.6814$ | | |
| $d_2 = 0.8784$ | | |
| $r_3 = 1.8634$ | | |
| $d_3 = 0.4254$ | $n_2 = 1.74100$ | $\nu_2 = 52.68$ |
| $r_4 = 129.9784$ | | |
| $d_4 = 0.2067$ | | |
| $r_5 = -61.4126$ | | |
| $d_5 = 0.4274$ | $n_3 = 1.74100$ | $\nu_3 = 52.68$ |
| $r_6 = -1.6314$ | | |
| $d_6 = 0.0572$ | | |
| $r_7 = \infty$ (aperture stop) | | |
| $d_7 = 0.0572$ | | |
| $r_8 = 3.9424$ | | |
| $d_8 = 0.6651$ | $n_4 = 1.51633$ | $\nu_4 = 64.15$ |
| $r_9 = -0.5959$ | | |
| $d_9 = 0.2287$ | $n_5 = 1.80518$ | $\nu_5 = 25.43$ |
| $r_{10} = -1.1684$ | | |
| $d_{10} = 0.0517$ | | |
| $r_{11} = \infty$ | | |
| $d_{11} = 0.2859$ | $n_6 = 1.53172$ | $\nu_6 = 48.90$ |
| $r_{12} = \infty$ | | |
| $d_{12} = 0.4031$ | | |
| $r_{13} = -3.1629$ | | |
| $d_{13} = 0.2287$ | $n_7 = 1.72825$ | $\nu_7 = 28.46$ |
| $r_{14} = 62.5974$ | | |
| $d_{14} = 0.5718$ | | |
| $r_{15} = \infty$ | | |
| $d_{15} = 0.2859$ | $n_8 = 1.51633$ | $\nu_8 = 64.15$ |
| $r_{16} = \infty$ | | |

$|h_1/f_1| = 0.6179$, $1.15|h_4/f_4| = 0.1436$
$f_2 = 1.402$, $f_1 = -1.018$, $f_{23} = 1.248$
$f_a/f_b = 2.840/2.255 = 1.259$, $R_2 = 1.8634$
$R_2' = -1.6314$, $R_3 = 3.9424$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's number of respective lenses.

10. An objective for an endoscope according to claim 5 having the following numerical data:

| $f = 1$, $F_{No} = 3.021$ $2\omega = 119.996°$ | | |
|---|---|---|
| IH = 1.0627 | | |
| $r_1 = 4.0027$ | | |
| $d_1 = 0.3336$ | $n_1 = 1.88300$ | $\nu_1 = 40.78$ |
| $r_2 = 0.8672$ | | |
| $d_2 = 0.5337$ | | |
| $r_3 = \infty$ | | |
| $d_3 = 0.3336$ | $n_2 = 1.53172$ | $\nu_2 = 48.90$ |
| $r_4 = \infty$ | | |
| $d_4 = 0.2763$ | | |
| $r_5 = 3.3266$ | | |
| $d_5 = 0.3885$ | $n_3 = 1.74100$ | $\nu_3 = 52.68$ |
| $r_6 = -5.1676$ | | |
| $d_6 = 0.2001$ | | |
| $r_7 = -1.3143$ | | |
| $d_7 = 0.7465$ | $n_4 = 1.74100$ | $\nu_4 = 52.68$ |
| $r_8 = -1.3763$ | | |
| $d_8 = 0.0667$ | | |
| $r_9 = \infty$ (aperture stop) | | |
| $d_9 = 0.0667$ | | |
| $r_{10} = 1.1237$ | | |
| $d_{10} = 0.9237$ | $n_5 = 1.51633$ | $\nu_5 = 64.15$ |
| $r_{11} = -0.8226$ | | |
| $d_{11} = 0.2668$ | $n_6 = 1.80518$ | $\nu_6 = 25.43$ |
| $r_{12} = -1.4219$ | | |
| $d_{12} = 0.4003$ | | |
| $r_{13} = -0.8672$ | | |
| $d_{13} = 0.3336$ | $n_7 = 1.72825$ | $\nu_7 = 28.46$ |
| $r_{14} = -1.8779$ | | |
| $d_{14} = 0.6671$ | | |
| $r_{15} = \infty$ | | |
| $d_{15} = 0.3336$ | $n_8 = 1.51633$ | $\nu_8 = 64.15$ |
| $r_{16} = \infty$ | | |

$|h_1/f_1| = 0.7648$, $1.15|h_4/f_4| = 0.2305$
$f_2 = 2.716$, $f_1 = -1.320$, $f_{23} = 1.231$
$f_a/f_b = 9.543/1.675 = 5.697$, $R_2 = 3.327$
$R_2' = -1.3763$, $R_3 = 1.124$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

11. An objective for an endoscope according to claim 5 having the following numerical data:

| f = 1, | $F_{No}$ = 3.058 | 2ω = 140.0° |
|---|---|---|
| | IH = 1.2009 | |

| | | |
|---|---|---|
| $r_1$ = 6.0196 | | |
| $d_1$ = 0.3762 | $n_1$ = 1.88300 | $v_1$ = 40.78 |
| $r_2$ = 1.1110 | | |
| $d_2$ = 1.5577 | | |
| $r_3$ = 2.6673 | | |
| $d_3$ = 1.1023 | $n_2$ = 1.71736 | $v_2$ = 29.51 |
| $r_4$ = −6.2168 | | |
| $d_4$ = 0.0405 | | |
| $r_5$ = ∞ (aperture stop) | | |
| $d_5$ = 0.1308 | | |
| $r_6$ = 5.1700 | | |
| $d_6$ = 0.3762 | $n_3$ = 1.69680 | $v_3$ = 55.52 |
| $r_7$ = −1745.3945 | | |
| $d_7$ = 0.0967 | | |
| $r_8$ = 9.8513 | | |
| $d_8$ = 0.7515 | $n_4$ = 1.69680 | $v_4$ = 55.52 |
| $r_9$ = −0.7846 | | |
| $d_9$ = 0.3010 | $n_5$ = 1.80518 | $v_5$ = 25.43 |
| $r_{10}$ = −1.2594 | | |
| $d_{10}$ = 0.2851 | | |
| $r_{11}$ = −1.0047 | | |
| $d_{11}$ = 0.2591 | $n_6$ = 1.72825 | $v_6$ = 28.46 |
| $r_{12}$ = −1.4804 | | |
| $d_{12}$ = 1.0030 | | |
| $r_{13}$ = ∞ | | |
| $d_{13}$ = 0.3762 | $n_7$ = 1.51633 | $v_7$ = 64.15 |
| $r_{14}$ = ∞ | | |

$|h_1/f_1|$ = 0.7519, 1.15$|h_4/f_4|$ = 0.1387
$f_2$ = 2.744, $f_1$ = −1.600, $f_{23}$ = 1.520
$f_a/f_b$ = 7.398/1.776 = 4.166, $R_2$ = 2.6673
$R_2'$ = −6.2168, $R_3$ = 5.1700 where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $v_1$, $v_2$, ... respectively represent Abbe's numbers of respective lenses.

12. An objective for an endoscope according to claim 5 having the following numerical data:

| f = 1, | $F_{No}$ = 2.996, | 2ω = 120.82° |
|---|---|---|
| | IH = 1.082 | |

| | | |
|---|---|---|
| $r_1$ = 4.3525 | | |
| $d_1$ = 0.3390 | $n_1$ = 1.88300 | $v_1$ = 40.78 |
| $r_2$ = 0.7946 | | |
| $d_2$ = 0.8793 | | |
| $r_3$ = ∞ | | |
| $d_3$ = 0.3390 | $n_2$ = 1.53172 | $v_2$ = 48.90 |
| $r_4$ = ∞ | | |
| $d_4$ = 0.1627 | | |
| $r_5$ = 2.5566 | | |
| $d_5$ = 0.4746 | $n_3$ = 1.72825 | $v_3$ = 28.46 |
| $r_6$ = −2.5566 | | |
| $d_6$ = 0.1182 | | |
| $r_7$ = ∞ (aperture stop) | | |
| $d_7$ = 0.2585 | | |
| $r_8$ = 4.6183 | | |
| $d_8$ = 06183 | $n_4$ = 1.58913 | $v_4$ = 60.97 |
| $r_9$ = −0.8237 | | |
| $d_9$ = 0.2712 | $n_5$ = 1.80518 | $v_5$ = 25.43 |
| $r_{10}$ = −1.6936 | | |
| $d_{10}$ = 0.1794 | | |
| $r_{11}$ = 2.4014 | | |
| $d_{11}$ = 0.4746 | $n_6$ = 1.65830 | $v_6$ = 57.33 |
| $r_{12}$ = −32.2502 | | |
| $d_{12}$ = 0.2936 | | |
| $r_{13}$ = −1.2908 | | |
| $d_{13}$ = 0.2373 | $n_7$ = 1.80518 | $v_7$ = 25.43 |
| $r_{14}$ = −7.7878 | | |
| $d_{14}$ = 0.3276 | | |
| $r_{15}$ = ∞ | | |
| $d_{15}$ = 0.6780 | $n_8$ = 1.54869 | $v_8$ = 45.55 |
| $r_{16}$ = ∞ | | |

$|h_1/f_1|$ = 0.4766, 1.15$|h_4/f_4|$ = 0.3672
$f_2$ = 1.827, $f_1$ = −1.152, $f_{23}$ = 1.291
$f_a/f_b$ = 3.414/1.827 = 1.869, $R_2$ = 2.557
$R_2'$ = −2.5566, $R_3$ = 4.168 where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $v_1$, $v_2$, ... respectively represent Abbe's numbers of respective lenses.

13. An objective for an endoscope according to claim 5 having the following numerical data:

| f = 1, | $f_{No}$ = 3.007 | 2ω = 140.03° |
|---|---|---|
| | IH = 1.1433 | |

| | | |
|---|---|---|
| $r_1$ = 5.7307 | | |
| $d_1$ = 0.3582 | $n_1$ = 1.88300 | $v_1$ = 40.78 |
| $r_2$ = 0.9213 | | |
| $d_2$ = 1.5140 | | |
| $r_3$ = 3.4686 | | |
| $d_3$ = 0.4510 | $n_2$ = 1.72342 | $v_2$ = 37.95 |
| $r_4$ = −2.7135 | | |
| $d_4$ = 0.4225 | | |
| $r_5$ = ∞ (aperture stop) | | |
| $d_5$ = 0.0335 | | |
| $r_6$ = −1.9941 | | |
| $d_6$ = 0.2149 | $n_3$ = 1.64769 | $v_3$ = 33.80 |
| $r_7$ = 10.3571 | | |
| $d_7$ = 0.5806 | $n_4$ = 1.78590 | $v_4$ = 44.18 |
| $r_8$ = −2.3442 | | |
| $d_8$ = 0.0116 | | |
| $r_9$ = 2.4393 | | |
| $d_9$ = 0.7777 | $n_5$ = 1.69680 | $v_5$ = 55.52 |
| $r_{10}$ = −4.4832 | | |
| $d_{10}$ = 0.4755 | | |
| $r_{11}$ = −1.1857 | | |
| $d_{11}$ = 0.3582 | $n_6$ = 1.72825 | $v_6$ = 28.46 |
| $r_{12}$ = −1.8661 | | |
| $d_{12}$ = 0.9316 | | |
| $r_{13}$ = ∞ | | |
| $d_{13}$ = 0.3582 | $n_7$ = 1.51633 | $v_7$ = 64.15 |
| $r_{14}$ = ∞ | | |

$|h_1/f_1|$ = 0.8187, 1.15$|h_4/f_4|$ = 0.1215
$f_2$ = 2.171, $f_1$ = −1.288, $f_{23}$ = 1.482
$f_a/f_b$ = 13.805/2.171 = 6.359, $R_2$ = 3.4686
$R_2'$ = −2.7135, $R_3$ = −1.9941 where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $v_1$, $v_2$, ... respectively represent Abbe's numbers of respective lenses.

14. An objective for an endoscope according to claim 5 having the following numerical data:

| f = 140 1, | $F_{No}$ = 3.109, | 2ω = 138.27° |
|---|---|---|
| | IH = 1.1424 | |

| | | |
|---|---|---|
| $r_1$ = 5.7266 | | |
| $d_1$ = 0.3579 | $n_1$ = 1.88300 | $v_1$ = 40.78 |
| $r_2$ = 0.8615 | | |

-continued

| | | |
|---|---|---|
| $d_2 = 1.6801$ | | |
| $r_3 = 1.7123$ | | |
| $d_3 = 0.8102$ | $n_2 = 1.71300$ | $\nu_2 = 53.84$ |
| $r_4 = -3.5156$ | | |
| $d_4 = 0.0039$ | | |
| $r_5 = \infty$ (aperture stop) | | |
| $d_5 = 0.0659$ | | |
| $r_6 = 2.4711$ | | |
| $d_6 = 0.6563$ | $n_3 = 1.51633$ | $\nu_3 = 64.15$ |
| $r_7 = -0.7133$ | | |
| $d_7 = 0.2863$ | $n_4 = 1.80518$ | $\nu_4 = 25.43$ |
| $r_8 = -1.2246$ | | |
| $d_8 = 0.0636$ | | |
| $r_9 = \infty$ | | |
| $d_9 = 0.1034$ | $n_5 = 1.53172$ | $\nu_5 = 48.90$ |
| $r_{10} = \infty$ | | |
| $d_{10} = 0.1720$ | | |
| $r_{11} = -0.9620$ | | |
| $d_{11} = 0.2147$ | $n_6 = 1.72825$ | $\nu_6 = 28.46$ |
| $r_{12} = -2.5078$ | | |
| $d_{12} = 0.0517$ | | |
| $r_{13} = 7.1019$ | | |
| $d_{13} = 0.5011$ | $n_7 = 1.51633$ | $\nu_7 = 64.15$ |
| $r_{14} = -19.3899$ | | |
| $d_{14} = 0.7158$ | | |
| $r_{15} = \infty$ | | |
| $d_{15} = 0.3579$ | $n_8 = 1.51633$ | $\nu_8 = 64.15$ |
| $r_{16} = \infty$ | | |

$|h_1/f_1| = 0.8129$, $1.15|h_4/f_4| = 0.2031$
$f_2 = 1.726$, $f_1 = -1.189$  $f_{23} = 1.262$
$f_a/f_b = 10.132/1.726 = 5.870$, $R_2 = 1.712$
$R_2' = -3.5156$, $R_3 = 2.471$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's number of respective lenses.

15. An objective for an endoscope according to claim 5 having the following numerical data:

$f = 1$,  $F_{No} = 3.085$,  $2\omega = 139.536°$
$IH = 1.2073$

| | | |
|---|---|---|
| $r_1 = 3.1833$ | | |
| $d_1 = 0.3782$ | $n_1 = 1.88300$ | $\nu_1 = 40.78$ |
| $r_2 = 0.8334$ | | |
| $d_2 = 1.7146$ | | |
| $r_3 = 2.4300$ | | |
| $d_3 = 0.7182$ | $n_2 = 1.71300$ | $\nu_2 = 53.84$ |
| $r_4 = -2.2325$ | | |
| $d_4 = 0.0250$ | | |
| $r_5 = \infty$ (aperture stop) | | |
| $d_5 = 0.0546$ | | |
| $r_6 = 7.1362$ | | |
| $d_6 = 0.5463$ | $n_3 = 1.51633$ | $\nu_3 = 64.15$ |
| $r_7 = -0.7591$ | | |
| $d_7 = 0.2185$ | $n_4 = 1.80518$ | $\nu_4 = 25.43$ |
| $r_8 = -1.2930$ | | |
| $d_8 = 0.0672$ | | |
| $r_9 = \infty$ | | |
| $d_9 = 0.1092$ | $n_5 = 1.53172$ | $\nu_5 = 48.90$ |
| $r_{10} = \infty$ | | |
| $d_{10} = 0.3020$ | | |
| $r_{11} = -0.8880$ | | |
| $d_{11} = 0.2731$ | $n_6 = 1.72825$ | $\nu_6 = 28.46$ |
| $r_{12} = -1.1927$ | | |
| $d_{12} = 0.0546$ | | |
| $r_{13} = 10.5247$ | | |
| $d_{13} = 0.5295$ | $n_7 = 1.51633$ | $\nu_7 = 64.15$ |
| $r_{14} = 117.0536$ | | |
| $d_{14} = 0.7564$ | | |
| $r_{15} = \infty$ | | |
| $d_{15} = 0.3782$ | $n_8 = 1.51633$ | $\nu_8 = 64.15$ |
| $r_{16} = \infty$ | | |

$|h_1/f_4| = 0.8008$, $1.15|h_4/f_4| = 0.0561$
$f_2 = 1.744$, $f_1 = -1.383$, $f_{23} = 1.335$
$f_a/f_b = 22.360/1.744 = 12.821$, $R_2 = 2.430$
$R_2' = -2.2325$, $R_3 = 7.136$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

16. An objective for an endoscope according to claim 5 having the following numerical data:

$f = 1$,  $F_{No} = 3.044$,  $2\omega = 140.082°$
$IH = 1.0969$

| | | |
|---|---|---|
| $r_1 = 5.4983$ | | |
| $d_1 = 0.3436$ | $n_1 = 1.88300$ | $\nu_1 = 40.78$ |
| $r_2 = 0.8851$ | | |
| $d_2 = 1.3387$ | | |
| $r_3 = 3.1007$ | | |
| $d_3 = 0.4124$ | $n_2 = 1.72342$ | $\nu_2 = 37.95$ |
| $r_4 = -6.9867$ | | |
| $d_4 = 0.2456$ | | |
| $r_5 = 6.4144$ | | |
| $d_5 = 0.2062$ | $n_3 = 1.6980$ | $\nu_3 = 55.52$ |
| $r_6 = 2.4882$ | | |
| $d_6 = 0.2368$ | | |
| $r_7 = \infty$ (aperture stop) | | |
| $d_7 = 0.0860$ | | |
| $r_8 = 3.4511$ | | |
| $d_8 = 0.8753$ | $n_4 = 1.65830$ | $\nu_4 = 57.33$ |
| $r_9 = -2.8298$ | | |
| $d_9 = 0.0932$ | | |
| $r_{10} = 2.2130$ | | |
| $d_{10} = 0.7745$ | $n_5 = 1.6980$ | $\nu_5 = 55.52$ |
| $r_{11} = -6.8452$ | | |
| $d_{11} = 0.4152$ | | |
| $r_{12} = -1.5863$ | | |
| $d_{12} = 0.3436$ | $n_6 = 1.72825$ | $\nu_6 = 28.46$ |
| $r_{13} = -5.3578$ | | |
| $d_{13} = 0.8408$ | | |
| $r_{14} = \infty$ | | |
| $d_{14} = 0.3436$ | $n_7 = 1.51633$ | $\nu_7 = 64.15$ |
| $r_{15} = \infty$ | | |

$|h_1/f_1| = 0.8288$, $1.15|h_4/f_4| = 0.2126$
$f_2 = 5.060$, $f_1 = -1.238$, $f_{23} = 1.513$
$f_a/f_b = 3.020/2.487 = 1.214$. $R_2 = 3.1007$
$R_2' = 2.4882$, $R_3 = 3.4511$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

17. An objective for an endoscope according to claim 5 having the following numerical data:

$f = 1$,  $F_{No} = 3.027$,  $2\omega = 132.72$
$IH = 1.1757$

| | | |
|---|---|---|
| $r_1 = 5.1635$ | | |
| $d_1 = 0.3690$ | $n_1 = 1.88300$ | $\nu_1 = 40.78$ |
| $r_2 = 0.9388$ | | |

-continued

| | | |
|---|---|---|
| $d_2 = 0.6126$ | | |
| $r_3 = 3.8306$ | | |
| $d_3 = 0.2583$ | $n_2 = 1.77250$ | $\nu_2 = 49.66$ |
| $r_4 = 2.2149$ | | |
| $d_4 = 0.9078$ | | |
| $r_5 = 2.8179$ | | |
| $d_5 = 0.5166$ | $n_3 = 1.72825$ | $\nu_3 = 28.46$ |
| $r_6 = -2.8179$ | | |
| $d_6 = 0.0590$ | | |
| $r_7 = \infty$ (aperture stop) | | |
| $d_7 = 0.3247$ | | |
| $r_8 = 4.9768$ | | |
| $d_8 = 0.8119$ | $n_4 = 1.58913$ | $\nu_4 = 60.97$ |
| $r_9 = -0.8827$ | | |
| $d_9 = 0.2952$ | $n_5 = 1.80518$ | $\nu_5 = 25.43$ |
| $r_{10} = -2.0002$ | | |
| $d_{10} = 0.0738$ | | |
| $r_{11} = \infty$ | | |
| $d_{11} = 0.3690$ | $n_6 = 1.53172$ | $\nu_6 = 48.90$ |
| $r_{12} = \infty$ | | |
| $d_{12} = 0.0738$ | | |
| $r_{13} = 3.0482$ | | |
| $d_{13} = 0.6274$ | $n_7 = 1.65160$ | $\nu_7 = 58.52$ |
| $r_{14} = -5.5591$ | | |
| $d_{14} = 0.3026$ | | |
| $r_{15} = -1.5381$ | | |
| $d_{15} = 0.2214$ | $n_8 = 1.84666$ | $\nu_8 = 23.78$ |
| $r_{16} = -11.0629$ | | |
| $d_{16} = 0.3247$ | | |
| $r_{17} = \infty$ | | |
| $d_{17} = 0.7381$ | $n_9 = 1.54869$ | $\nu_9 = 45.55$ |
| $r_{18} = \infty$ | | |

$|h_1/f_1| = 0.7425$, $1.15|h_4/f_4| = 0.3957$
$f_2 = 2.012$, $f_1 = -1.031$, $f_{23} = 1.588$
$f_a/f_b = 3.650/2.012 = 1.814$, $R_2 = 2.8179$
$R_2' = -2.8179$, $R_3 = 4.9768$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

18. An objective for an endoscope according to claim 5 having the following numerical data:

| $f = 1$, $F_{No} = 3.012$ | $2\omega = 140.0°$ | |
|---|---|---|
| | IH = 1.197 | |
| $r_1 = 5.9912$ | | |
| $d_1 = 0.3750$ | $n_1 = 1.88300$ | $\nu_1 = 40.78$ |
| $r_2 = 0.9537$ | | |
| $d_2 = 0.5250$ | | |
| $r_3 = 3.7795$ | | |
| $d_3 = 0.2250$ | $n_2 = 1.88300$ | $\nu_2 = 40.78$ |
| $r_4 = 2.2136$ | | |
| $d_4 = 1.1585$ | | |
| $r_5 = 2.5094$ | | |
| $d_5 = 0.4591$ | $n_3 = 1.72825$ | $\nu_3 = 28.46$ |
| $r_6 = -3.7450$ | | |
| $d_6 = 0.1125$ | | |
| $r_7 = \infty$ (aperture stop) | | |
| $d_7 = 0.3134$ | | |
| $r_8 = 4.7584$ | | |
| $d_8 = 0.7459$ | $n_4 = 1.58913$ | $\nu_4 = 60.97$ |
| $r_9 = -0.8785$ | | |
| $d_9 = 0.3000$ | $n_5 = 1.80518$ | $\nu_5 = 25.43$ |
| $r_{10} = -2.0123$ | | |
| $d_{10} = 0.4069$ | | |
| $r_{11} = 5.0897$ | | |
| $d_{11} = 0.5250$ | $n_6 = 1.65830$ | $\nu_6 = 57.33$ |
| $r_{12} = -4.6412$ | | |
| $d_{12} = 0.3298$ | | |
| $r_{13} = -1.4135$ | | |
| $d_{13} = 0.2250$ | $n_7 = 1.80518$ | $\nu_7 = 25.43$ |
| $r_{14} = -3.4758$ | | |
| $d_{14} = 0.0088$ | | |
| $r_{15} = \infty$ | | |
| $d_{15} = 0.0750$ | $n_8 = 1.51633$ | $\nu_8 = 64.15$ |
| $r_{16} = \infty$ | | |
| $d_{16} = 0.7500$ | | |
| $r_{17} = \infty$ | | |
| $d_{17} = 0.3750$ | $n_9 = 1.51633$ | $\nu_9 = 64.15$ |
| $r_{18} = \infty$ | | |

$|h_1/f_1| = 0.8141$, $1.15|h_4/f_4| = 0.2636$
$f_2 = 2.129$, $f_1 = -1.002$, $f_{23} = 1.636$
$f_a/f_b = 3.768/2.129 = 1.770$, $R_2 = 2.5094$
$R_2' = -3.7450$, $R_3 = 4.7584$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

19. An objective for an endoscope according to claim 1 wherein at least one aspherical surface is provided in at least one of a front subsystem located in front of said aperture stop and a rear subsystem located in rear of said aperture stop.

20. An objective for an endoscope according to claim 19 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \frac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference sumbol P represents a parameter representing the shape of said aspherical surface, and reference symbols B, E, F, G, ... respectively represent the coefficients of aspherical surface of the second order, fourth order, sixth order, eighth order and so on,
and wherein said objective for an endoscope has the following numerical data:

| $f = 1$, $F_{No} = 3.001$ | $2\omega = 120.832°$ | |
|---|---|---|
| | IH = 1.2267 | |
| $r_1 = 5.9125$ (aspherical surface) | | |
| $d_1 = 0.3843$ | $n_1 = 1.88300$ | $\nu_1 = 40.78$ |
| $r_2 = 0.8298$ | | |
| $d_2 = 0.9897$ | | |
| $r_3 = \infty$ | | |
| $d_3 = 0.3843$ | $n_2 = 1.53172$ | $\nu_2 = 48.90$ |
| $r_4 = \infty$ | | |
| $d_4 = 0.1845$ | | |
| $r_5 = 2.9048$ | | |
| $d_5 = 0.5380$ | $n_3 = 1.72825$ | $\nu_3 = 28.46$ |
| $r_6 = -2.9283$ | | |
| $d_6 = 0.1313$ | | |
| $r_7 = \infty$ (aperture stop) | | |
| $d_7 = 0.2910$ | | |

-continued

```
r₈ = 5.4055
d₈ = 0.7010                    n₄ = 1.58913   ν₄ = 60.97
r₉ = -0.9380
d₉ = 0.3075                    n₅ = 1.80518   ν₅ = 25.43
r₁₀ = -1.8953
d₁₀ = 0.2034
r₁₁ = 2.6198
d₁₁ = 0.5380                   n₆ = 1.65830   ν₆ = 57.33
r₁₂ = -11.3821
d₁₂ = 0.3328
r₁₃ = -1.2309 (aspherical surface)
d₁₃ = 0.2690                   n₇ = 1.80518   ν₇ = 25.43
r₁₄ = -3.6160
d₁₄ = 0.3714
r₁₅ = ∞
d₁₅ = 0.7686                   n₈ = 1.54869   ν₈ = 45.55
r₁₆ = ∞
```

|h₁/f₁| = 0.8266, 1.15|h₄/f₄| = 0.3411
f₂ = 2.083, f₁ = -1.133, f₂₃ = 1.452
f_a/f_b = 3.285/2.083 = 1.577, R₂ = 2.9048
R₂' = -2.9283, R₃ = 5.4055
coefficients of aspherical surfaces
(1st lens surface)   P = 1, E = 0.22631 × 10⁻¹
(13th lens surface)  P = 1, where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses, of the coefficients of aspherical surface, those which are not shown in the numerical data are zero.

21. An objective for an endoscope according to claim 19 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \frac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on, and wherein said objective for an endoscope has the following numerical data:

```
f = 1, F_No = 3.004, 2ω = 120.07°
IH = 2.4366
```

```
r₁ = 6.3333 (aspherical surface)
d₁ = 0.3818                    n₁ = 1.88300   ν₁ = 40.78
r₂ = 0.8893 (aspherical surface)
d₂ = 1.8084
r₃ = 1.8590
d₃ = 0.9825                    n₂ = 1.71300   ν₂ = 53.84
r₄ = -3.8279
d₄ = 0.0042
```

-continued

```
r₅ = ∞ (aperture stop)
d₅ = 0.0767
r₆ = 2.7250
d₆ = 0.7392                    n₃ = 1.51633   ν₃ = 64.15
r₇ = -0.7605
d₇ = 0.3054                    n₄ = 1.80518   ν₄ = 25.43
r₈ = -1.3061
d₈ = 0.3156
r₉ = -1.0055
d₉ = 0.2290                    n₅ = 1.72825   ν₅ = 28.46
r₁₀ = -2.2630
d₁₀ = 0.0552
r₁₁ = 7.1359
d₁₁ = 0.5346                   n₆ = 1.51633   ν₆ = 64.15
r₁₂ = -8.5566 (aspherical surface)
d₁₂ = 0.7636
r₁₃ = ∞
d₁₃ = 0.3818                   n₇ = 1.51633   ν₇ = 64.15
r₁₄ = ∞
```

|h₁/f₁| = 0.9051, 1.15|h₄/f₄| = 0.1536
f₂ = 1.891, f₁ = -1.212, f₂₃ = 1.404
f_a/f_b = 7.6241/1.891 = 4.032, R₂ = 1.8590
R₂' = -3.8279, R₃ = 2.7250
coefficients of aspherical surfaces
(1st lens surface)   P = 0, E = 0.15726 × 10⁻¹
(2nd lens surface)   P = 1,
(12th lens surface)  P = 1 where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses, of the coefficients of aspherical surface, those which are not shown in the numerical data are zero.

22. An objective for an endoscope according to claim 19 fulfilling the conditions (15) and (17) shown below:

$$A_F \cdot A_R < 0 \tag{15}$$

$$0.01 < |A_F/A_R| < 20 \tag{17}$$

where, $$A_F = \sum_i A_{Fi} \text{ and } A_R = \sum_j A_{Fj}$$

where reference symbol $A_{Fi}$ represents the value obtained when the coefficient of astigmatism A to be caused by the deviation of the aspherical surface, which is formed on ith surface out of respective lens surfaces in said front subsystem, from the spherical surface is divided by F number, and reference symbol $A_{Fj}$ represents the value obtained when the coefficient of astigmatism A to be caused by the deviation of the aspherical surface, which is formed on jth surface out of respective lens surfaces in said rear subsystem, from the spherical surface is divided by F number.

23. An objective for an endoscope according to claim 22 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \frac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on,
and wherein said objective for an endoscope has the following numerical data:

| $f = 1$, $F_{No} = 2.998$, $2\omega = 120.796°$ |  |  |
|---|---|---|
| IH = 1.2469 |  |  |
| $r_1 = 5.9663$ (aspherical surface) |  |  |
| $d_1 = 0.3906$ | $n_1 = 1.88300$ | $\nu_1 = 40.78$ |
| $r_2 = 0.8272$ |  |  |
| $d_2 = 1.0070$ |  |  |
| $r_3 = \infty$ |  |  |
| $d_3 = 0.3906$ | $n_2 = 1.53172$ | $\nu_2 = 48.90$ |
| $r_4 = \infty$ |  |  |
| $d_4 = 0.1875$ |  |  |
| $r_5 = 3.0194$ |  |  |
| $d_5 = 0.5469$ | $n_3 = 1.72825$ | $\nu_3 = 28.46$ |
| $r_6 = -2.9267$ |  |  |
| $d_6 = 0.1334$ |  |  |
| $r_7 = \infty$ (aperture stop) |  |  |
| $d_7 = 0.2955$ |  |  |
| $r_8 = 5.6257$ |  |  |
| $d_8 = 0.7125$ | $n_4 = 1.58913$ | $\nu_4 = 60.97$ |
| $r_9 = -0.9698$ |  |  |
| $d_9 = 0.3125$ | $n_5 = 1.80518$ | $\nu_5 = 25.43$ |
| $r_{10} = -1.9298$ |  |  |
| $d_{10} = 0.2068$ |  |  |
| $r_{11} = 2.5655$ |  |  |
| $d_{11} = 0.5469$ | $n_6 = 1.65830$ | $\nu_6 = 57.33$ |
| $r_{12} = -12.9642$ |  |  |
| $d_{12} = 0.3383$ |  |  |
| $r_{13} = -1.2924$ (aspherical surface) |  |  |
| $d_{13} = 0.2734$ | $n_7 = 1.80518$ | $\nu_7 = 25.43$ |
| $r_{14} = -4.2008$ |  |  |
| $d_{14} = 0.3775$ |  |  |
| $r_{15} = \infty$ |  |  |
| $d_{15} = 0.7813$ | $n_8 = 1.54869$ | $\nu_8 = 45.55$ |
| $r_{16} = \infty$ |  |  |
| $\|h_1/f_1\| = 0.8444$, $1.15\|h_4/f_4\| = 0.3481$ |  |  |
| $f_2 = 2.123$, $f_1 = -1.128$, $f_{23} = 1.469$ |  |  |
| $f_a/f_b = 3.358/2.123 = 1.582$, $R_2 = 3.0194$ |  |  |
| $R_2' = -2.9267$, $R_3 = 5.6257$ |  |  |
| coefficients of aspherical surfaces |  |  |
| (1st lens surface) | $P = 1$, $E = 0.24015 \times 10^{-1}$ |  |
| (13th lens surface) | $P = 1$, $E = -0.12297 \times 10^{-1}$ |  |
| $\left\|\dfrac{A_F}{A_R}\right\| = 5.124$ |  |  | where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses, of the coefficients of aspherical surface, those which are not shown in the numerical data are zero.

24. An objective for an endoscope according to claim 23 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \frac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on,
and wherein said objective for an endoscope has the following numerical data:

| $f = 1$, $F_{No} = 3.030$, $2\omega = 99.99°$ |  |  |
|---|---|---|
| IH = 1.1466 |  |  |
| $r_1 = 6.0105$ |  |  |
| $d_1 = 0.3592$ | $n_1 = 1.88300$ | $\nu_1 = 40.78$ |
| $r_2 = 0.8194$ (aspherical surface) |  |  |
| $d_2 = 0.7184$ |  |  |
| $r_3 = 9.2577$ |  |  |
| $d_3 = 0.3592$ | $n_2 = 1.53172$ | $\nu_2 = 48.90$ |
| $r_4 = -30.2947$ |  |  |
| $d_4 = 0.3879$ |  |  |
| $r_5 = 2.6624$ |  |  |
| $d_5 = 0.5029$ | $n_3 = 1.72825$ | $\nu_3 = 28.46$ |
| $r_6 = -3.7679$ |  |  |
| $d_6 = 0.1252$ |  |  |
| $r_7 = \infty$ (aperture stop) |  |  |
| $d_7 = 0.2740$ |  |  |
| $r_8 = 4.8937$ |  |  |
| $d_8 = 0.6552$ | $n_4 = 1.58913$ | $\nu_4 = 60.97$ |
| $r_9 = -0.8923$ |  |  |
| $d_9 = 0.2874$ | $n_5 = 1.80518$ | $\nu_5 = 25.43$ |
| $r_{10} = -1.5847$ |  |  |
| $d_{10} = 0.1901$ |  |  |
| $r_{11} = 2.5445$ |  |  |
| $d_{11} = 0.5029$ | $n_6 = 1.65830$ | $\nu_6 = 57.33$ |
| $r_{12} = -34.1731$ |  |  |
| $d_{12} = 0.3000$ |  |  |
| $r_{13} = -1.3263$ |  |  |
| $d_{13} = 0.2514$ | $n_7 = 1.80518$ | $\nu_7 = 25.43$ |
| $r_{14} = -7.5450$ (aspherical surface) |  |  |
| $d_{14} = 0.3471$ |  |  |
| $r_{15} = \infty$ |  |  |
| $d_{15} = 0.7184$ | $n_8 = 1.54869$ | $\nu_8 = 45.55$ |
| $r_{16} = \infty$ |  |  |
| $\|h_1/f_1\| = 0.4335$, $1.15\|h_4/f_4\| = 0.3286$ |  |  |
| $f_2 = 1.989$, $f_1 = -1.110$, $f_{23} = 1.406$ |  |  |
| $f_a/f_b = 13.378/2.215 = 6.048$, $R_2 = 9.2577$ |  |  |
| $R_2' = -3.7679$, $R_3 = 4.894$ |  |  |
| coefficients of aspherical surfaces |  |  |
| (2nd lens surface) | $P = 0$, $E = 0.51666 \times 10^{-1}$ |  |
|  | $F = 0.13710$ |  |
| (14th lens surface) | $P = 0$, $E = 0.17323$ |  |
| $\left\|\dfrac{A_F}{A_R}\right\| = 1.808$ |  |  | where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ...

... respectively represent refractive indices of respective lenses, and reference symbols $\nu_1, \nu_2, \ldots$ respectively represent Abbe's numbers of respective lenses, of the coefficients of aspherical surface, those which are not shown in the numerical data are zero.

25. An objective for an endoscope according to claim 23, wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \frac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on, and wherein said objective for an endoscope has the following numerical data:

---

$f = 1$, $F_{No} = 3.008$, $2\omega = 129.582°$
$IH = 1.2449$ $r_1 = 7.0922$ (aspherical surface)
$d_1 = 0.3901$   $n_1 = 1.88300$   $\nu_1 = 40.78$
$r_2 = 0.9320$ (aspherical surface)
$d_2 = 1.8376$
$r_3 = 1.9116$
$d_3 = 0.9886$   $n_2 = 1.71300$   $\nu_2 = 53.84$
$r_4 = -3.8101$
$d_4 = 0.0043$
$r_5 = \infty$ (aperture stop)
$d_5 = 0.0800$
$r_6 = 2.9288$
$d_6 = 0.7605$   $n_3 = 1.51633$   $\nu_3 = 64.15$
$r_7 = -0.7899$
$d_7 = 0.3121$   $n_4 = 1.80518$   $\nu_4 = 25.43$
$r_8 = -1.3346$
$d_8 = 0.3051$
$r_9 = -1.0142$
$d_9 = 0.2340$   $n_5 = 1.72825$   $\nu_5 = 28.46$
$r_{10} = -2.2485$
$d_{10} = 0.0564$
$r_{11} = 6.3079$
$d_{11} = 0.5462$   $n_6 = 1.51633$   $\nu_6 = 64.15$
$r_{12} = -6.2050$ (aspherical surface)
$d_{12} = 0.7803$
$r_{13} = \infty$
$d_{13} = 0.3901$   $n_7 = 1.51633$   $\nu_7 = 64.15$
$r_{14} = \infty$ $|h_1/f_1| = 0.8950$, $1.15|h_4/f_4| = 0.1226$
$f_2 = 1.924$, $f_1 = -1.252$, $f_{23} = 1.435$
$f_a/f_b = 6.150/1.924 = 3.196$, $R_2 = 1.9116$
$R_2' = -3.8101$, $R_3 = 2.9288$
coefficients of aspherical surfaces
(1st lens surface)   $P = 0$, $E = 0.12860 \times 10^{-1}$
(2nd lens surface)   $P = 1$,
(12th lens surface)  $P = 1$, $E = 0.29866 \times 10^{-1}$ $\left|\dfrac{A_F}{A_R}\right| = 1.50$

--- where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses, of the coefficients of aspherical surface, those which are not shown in the numerical data are zero.

26. An objective for an endoscope according to claim 23 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \frac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on, and wherein said objective for an endoscope has the following numerical data:

---

$f = 1$, $F_{No} = 2.996$, $2\omega = 110.0°$
$IH = 1.2040$ $r_1 = 3.9397$ (aspherical surface)
$d_1 = 0.3772$   $n_1 = 1.88300$   $\nu_1 = 40.78$
$r_2 = 0.7949$
$d_2 = 0.6186$
$r_3 = 6.9234$
$d_3 = 0.2640$   $n_2 = 1.77250$   $\nu_2 = 49.66$
$r_4 = 4.1093$
$d_4 = 0.9559$
$r_5 = 2.7606$
$d_5 = 0.5281$   $n_3 = 1.72825$   $\nu_3 = 28.46$
$r_6 = -2.2016$
$d_6 = 0.0754$
$r_7 = \infty$ (aperture stop)
$d_7 = 0.3167$
$r_8 = 17.2715$
$d_8 = 0.8298$   $n_4 = 1.58913$   $\nu_4 = 60.97$
$r_9 = -0.8495$
$d_9 = 0.3018$   $n_5 = 1.80518$   $\nu_5 = 25.43$
$r_{10} = -2.4692$
$d_{10} = 0.0754$
$r_{11} = \infty$
$d_{11} = 0.3772$   $n_6 = 1.53172$   $\nu_6 = 48.90$
$r_{12} = \infty$
$d_{12} = 0.0754$
$r_{13} = 2.1704$
$d_{13} = 0.6412$   $n_7 = 1.65160$   $\nu_7 = 58.52$
$r_{14} = -23.8501$
$d_{14} = 0.3103$
$r_{15} = -1.5651$
$d_{15} = 0.2263$   $n_8 = 1.84666$   $\nu_8 = 23.78$
$r_{16} = -5.0483$ (aspherical surface)
$d_{16} = 0.3163$
$r_{17} = \infty$
$d_{17} = 0.7544$   $n_9 = 1.54869$   $\nu_9 = 45.55$
$r_{18} = \infty$ $|h_1/f_1| = 0.7355$, $1.15|h_4/f_4| = 0.3202$
$f_2 = 1.761$, $f_1 = -1.033$, $f_{23} = 1.642$
$f_a/f_b = 8.594/1.761 = 4.880$, $R_2 = 2.7606$ -continued R$_2'$ = −2.2016, R$_3$ = 17.2715
coefficients of aspherical surfaces
(1st lens surface)   P = 1, E = 0.25038 × 10$^{-1}$
                     F = 0.45776 × 10$^{-2}$
(16th lens surface)  P = 1, E = 0.23705 × 10$^{-1}$ $\left|\dfrac{A_F}{A_R}\right| = 2.9838$ where, reference symbols r$_1$, r$_2$, ... respectively represent radii of curvature of respective lens surfaces, reference symbols d$_1$, d$_2$, ... respectively represent thicknesses of respective lenses and airspaces between respective lenses, reference symbols n$_1$, n$_2$, ... respectively represent refractive indices of respective lenses, and reference symbols $\nu_1$, $\nu_2$, ... respectively represent Abbe's numbers of respective lenses, of the coefficients of aspherical surface, those which are not shown in the numerical data are zero.

27. An objective for an endoscope according to claim 19 fulfilling the condition (22) shown below:

$$0 \leq Q_h < 4 \qquad (22)$$

where, the value of $Q_h$ is obtained by the formula $Q_h = |Q_S/Q_M|$ wherein the value of $Q_S$ is obtained by the formula $Q_S = Q_F + Q_R$ wherein reference symbol $Q_F$ represents the sum of $Q_i$ in said front subsystem, and reference symbol $Q_R$ represents the sum of $Q_i$ in said rear subsystem, the value of $Q_i$ being calculated by the formula $$Q_i = (N_i - N_{i+1})\{\overline{Eh}_i^2 + \overline{Fh}_i^4 + \overline{Gh}_i^6 + \ldots\}$$

wherein reference symbol $N_i$ represents the refractive index of the medium existing on the object side of ith surface, and reference symbol $N_{i+1}$ represents the refractive index of the medium existing on the image side of ith surface, reference symbol $Q_M$ representing either $Q_F$ or $Q_R$ which has the larger absolute value out of them.

28. An objective for an endoscope according to claim 27 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \dfrac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on, and wherein said objective for an endoscope has the following numerical data:

f = 1,  F$_{No}$ = 3.035,  2ω = 140.02°
IH = 1.6295 r$_1$ = 5.8908
d$_1$ = 0.5105           n$_1$ = 1.88300   $\nu_1$ = 40.78
r$_2$ = 1.5830 (aspherical surface)
d$_2$ = 2.1049
r$_3$ = 7.1003
d$_3$ = 0.7497           n$_2$ = 1.72342   $\nu_2$ = 37.95
r$_4$ = −6.1767
d$_4$ = 0.0056
r$_5$ = ∞ (aperture stop)
d$_5$ = 0.1188
r$_6$ = 12.6805
d$_6$ = 0.9930           n$_3$ = 1.65830   $\nu_3$ = 57.33
r$_7$ = −1.2573
d$_7$ = 0.4084           n$_4$ = 1.80518   $\nu_4$ = 25.43
r$_8$ = −2.0394
d$_8$ = 0.2964
r$_9$ = −1.4831
d$_9$ = 0.3063           n$_5$ = 1.84666   $\nu_5$ = 23.78
r$_{10}$ = −1.6611
d$_{10}$ = 0.1532
r$_{11}$ = 8.1827
d$_{11}$ = 0.7147        n$_6$ = 1.51633   $\nu_6$ = 64.15
r$_{12}$ = −1.8839 (aspherical surface)
d$_{12}$ = 1.0291
r$_{13}$ = ∞
d$_{13}$ = 0.5105        n$_7$ = 1.51633   $\nu_7$ = 64.15
r$_{14}$ = ∞

|h$_1$/f$_1$| = 0.6747,  1.15|h$_4$/f$_4$| = 0.3865
f$_2$ = 4.677,  f$_1$ = −2.596,  f$_{23}$ = 2.168
f$_a$/f$_b$ = 4.677/3.039 = 1.539,  R$_2$ = 7.01003 ·
R$_2'$ = −6.1767,  R$_3$ = 12.6805
coefficients of aspherical surfaces
(2nd lens surface)   P = 1, E = 0.59267 × 10$^{-1}$
                     F = −0.29531 × 10$^{-1}$
(12th lens surface)  P = 1, E = 0.10652
Q$_h$ = 1.1459 where, reference symbols r$_1$, r$_2$, ... respectively represent radii of curvature of respective lens surfaces, reference symbols d$_1$, d$_2$, ... respectively represent thicknesses of respective lenses and airspaces between respective lenses, reference symbols n$_1$, n$_2$, ... respectively represent refractive indices of respective lenses, and reference symbols $\nu_1$, $\nu_2$, ... respectively represent Abbe's numbers of respective lenses, of the coefficients of aspherical surface, those which are not shown in the numerical data are zero.

29. An objective for an endoscope according to claim 27 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \dfrac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on, and wherein said objective for an endoscope has the following numerical data:

| f = 1, $F_{No}$ = 3.032, 1ω= 140.0° IH = 1.4229 | | |
|---|---|---|
| $r_1$ = 5.6068 | | |
| $d_1$ = 0.4458 | $n_1$ = 1.88300 | $\nu_1$ = 40.78 |
| $r_2$ = 1.2801 (aspherical surface) | | |
| $d_2$ = 2.0273 | | |
| $r_3$ = 3.6331 | | |
| $d_3$ = 0.7592 | $n_2$ = 1.72342 | $\nu_2$ = 37.95 |
| $r_4$ = −5.0124 | | |
| $d_4$ = 0.0049 | | |
| $r_5$ = ∞ (aperture stop) | | |
| $d_5$ = 0.1026 | | |
| $r_6$ = 7.4259 | | |
| $d_6$ = 0.8539 | $n_3$ = 1.65830 | $\nu_3$ = 57.33 |
| $r_7$ = −1.1844 | | |
| $d_7$ = 0.3566 | $n_4$ = 1.80518 | $\nu_4$ = 25.43 |
| $r_8$ = −1.7581 | | |
| $d_8$ = 0.3181 | | |
| $r_9$ = −1.2303 | | |
| $d_9$ = 0.2675 | $n_5$ = 1.84666 | $\nu_5$ = 23.78 |
| $r_{10}$ = −1.6302 | | |
| $d_{10}$ = 0.1337 | | |
| $r_{11}$ = 50.6667 | | |
| $d_{11}$ = 0.6241 | $n_6$ = 1.51633 | $\nu_6$ = 64.15 |
| $r_{12}$ = −2.1201 (aspherical surface) | | |
| $d_{12}$ = 0.8985 | | |
| $r_{13}$ = ∞ | | |
| $d_{13}$ = 0.4458 | $n_7$ = 1.51633 | $\nu_7$ = 64.15 |
| $r_{14}$ = ∞ | | |
| $\|h_1/f_1\|$ = 0.7323, 1.15$\|h_4/f_4\|$ = 0.1542 | | |
| $f_2$ = 3.023, $f_1$ = −1.974, $f_{23}$ = 1.662 | | |
| $f_a/f_b$ = 3.957/2.439 = 1.622, $R_2$ = 3.6331 | | |
| $R_2'$ = −5.0124, $R_3$ = 7.4259 | | |
| coefficients of aspherical surfaces | | |
| (2nd lens surface) P = 1, E = 0.61335 × $10^{-1}$ | | |
| F = −0.39851 × $10^{-1}$ | | |
| (12th lens surface) P = 1, E = 0.10463 | | |
| $Q_h$ = 1.3035 | | | where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses, of the coefficients of aspherical surface, those which are not shown in the numerical data are zero.

30. An objective for an endoscope according to claim 27 wherein each of said aspherical surfaces has a shape expressed by the formula shown below when the optical axis is designated as the x axis and a straight line, which is perpendicular to the optical axis and which passes the intersecting point between said aspherical surface and optical axis, is designated as the y axis:

$$x = \frac{Cy^2}{1 + \sqrt{1 - PC^2y^2}} + By^2 + Ey^4 + Fy^6 + Gy^8 + \ldots$$

where, reference symbol C represents the inverse number of the radius of curvature of the spherical surface which is in contact with said aspherical surface at a position near the optical axis, reference symbol P represents a parameter representing the shape of said aspherical surface, and reference symbols B, E, F, G, ... respectively represent the coefficients of aspherical surface of the second order, fourth order, sixth order, eighth order and so on, and wherein said objective for an endoscope has the following numerical data:

| f = 1, $F_{No}$ = 3.033, 2ω= 140.01° IH = 1.4387 | | |
|---|---|---|
| $r_1$ = 4.1525 | | |
| $d_1$ = 0.4507 | $n_1$ = 1.88300 | $\nu_1$ = 40.78 |
| $r_2$ = 1.2907 (aspherical surface) | | |
| $d_2$ = 1.9824 | | |
| $r_3$ = 6.0185 | | |
| $d_3$ = 0.6489 | $n_2$ = 1.72342 | $\nu_2$ = 37.95 |
| $r_4$ = −5.3701 | | |
| $d_4$ = 0.0050 | | |
| $r_5$ = ∞ (aperture stop) | | |
| $d_5$ = 0.0988 | | |
| $r_6$ = 9.8733 | | |
| $d_6$ = 0.7706 | $n_3$ = 1.65830 | $\nu_3$ = 57.33 |
| $r_7$ = 2.1176 | | |
| $d_7$ = 0.3606 | $n_4$ = 1.80518 | $\nu_4$ = 25.43 |
| $r_8$ = −1.7128 | | |
| $d_8$ = 0.3216 | | |
| $r_9$ = −1.6356 | | |
| $d_9$ = 0.2704 | $n_5$ = 1.84666 | $\nu_5$ = 23.78 |
| $r_{10}$ = −1.6634 (aspherical surface) | | |
| $d_{10}$ = 0.1352 | | |
| $r_{11}$ = −3.0982 | | |
| $d_{11}$ = 0.6310 | $n_6$ = 1.51633 | $\nu_6$ = 64.15 |
| $r_{12}$ = −1.5977 (aspherical surface) | | |
| $d_{12}$ = 0.9086 | | |
| $r_{13}$ = ∞ | | |
| $d_{13}$ = 0.4507 | $n_7$ = 1.51633 | $\nu_7$ = 64.15 |
| $r_{14}$ = ∞ | | |
| $\|h_1/f_1\|$ = 0.6803, 1.15$\|h_4/f_4\|$ = 0.1969 | | |
| $f_2$ = 4.019, $f_1$ = −2.290, $f_{23}$ = 1.664 | | |
| $f_a/f_b$ = 33.391/2.198 = 15.192, $R_2$ = 6.0185 | | |
| $R_2'$ = −5.3701, $R_3$ = 9.8733 | | |
| coefficients of aspherical surfaces | | |
| (2nd lens surface) P = 1, E = 0.64518 × $10^{-1}$ | | |
| F = −0.38100 × $10^{-1}$ | | |
| (10th lens surface) P = 1, E = 0.10921 | | |
| (12th lens surface) P = 1, E = 0.82721 × $10^{-2}$ | | |
| $Qh$ = 1.3030 | | | where, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, and reference symbols $\nu_1$, $\nu_2$, ... respectively represent Abbe's numbers of respective lenses, of the coefficients of aspherical surface, those which are not shown in the numerical data are zero.

* * * * *